(12) United States Patent
Gillingham et al.

(10) Patent No.: US 8,480,538 B2
(45) Date of Patent: Jul. 9, 2013

(54) ELECTRIC VEHICLE

(75) Inventors: Brian R. Gillingham, Osceola, WI (US); Joel M. Notaro, North Branch, MN (US); Amber P. Malone, Oak Grove, MN (US); Bradley R. Morisch, Lindstrom, MN (US); Joshua J. Leonard, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 13/474,505

(22) Filed: May 17, 2012

(65) Prior Publication Data

US 2012/0226405 A1    Sep. 6, 2012

Related U.S. Application Data

(62) Division of application No. 12/816,052, filed on Jun. 15, 2010, now Pat. No. 8,182,393.

(60) Provisional application No. 61/187,147, filed on Jun. 15, 2009.

(51) Int. Cl.
  *H02P 17/00* (2006.01)
(52) U.S. Cl.
  USPC ..................... 477/8; 477/9; 477/10
(58) Field of Classification Search
  USPC .......................... 477/3, 7–9, 15, 20
  See application file for complete search history.

(56) References Cited

U.S. PATENT DOCUMENTS

| | | | |
|---|---|---|---|
| 3,708,028 A | 1/1973 | Hafer | |
| 5,036,939 A | 8/1991 | Johnson | |
| 6,041,877 A | 3/2000 | Yamada et al. | |
| RE38,012 E | 3/2003 | Ochab | |
| 7,055,454 B1 | 6/2006 | Whiting | |
| 7,134,517 B1 | 11/2006 | Kaiser | |
| 7,560,882 B2 | 7/2009 | Clark | |
| 7,715,968 B2 | 5/2010 | Mori | |
| 7,913,782 B1 | 3/2011 | Foss | |
| 8,007,401 B2 * | 8/2011 | Saito et al. | 477/3 |
| 8,011,461 B2 | 9/2011 | Rodriguez et al. | |
| 8,033,954 B2 * | 10/2011 | Theobald et al. | 477/3 |
| 8,038,573 B2 * | 10/2011 | Kozub et al. | 477/5 |
| 8,075,436 B2 * | 12/2011 | Bachmann | 475/5 |
| 2002/0104704 A1 | 8/2002 | Chang | |
| 2003/0162631 A1 | 8/2003 | Williams | |
| 2004/0134698 A1 | 7/2004 | Yamamoto et al. | |

(Continued)

FOREIGN PATENT DOCUMENTS

| CN | 201211849 Y | 3/2009 |
|---|---|---|
| EP | 1205331 A2 | 5/2002 |

OTHER PUBLICATIONS

European Patent Office, International Search Report for PCT/US2010/038711, mailed on Apr. 6, 2011, 6 pages.

(Continued)

*Primary Examiner* — Ha D Ho
(74) *Attorney, Agent, or Firm* — Faegre Baker Daniels LLP

(57) ABSTRACT

A utility vehicle is disclosed having an electric drive. The drivetrain is comprised of batteries, a motor, a transaxle driven by the motor, a rear differential driven by the transaxle, and a prop shaft which is driven by the transaxle and drives a front differential. The batteries are provided in two groups and are supported on the frame of the vehicle.

9 Claims, 49 Drawing Sheets

U.S. PATENT DOCUMENTS

| | | |
|---|---|---|
| 2006/0231304 A1 | 10/2006 | Severinsky et al. |
| 2007/0050095 A1 | 3/2007 | Nelson |
| 2007/0114080 A1 | 5/2007 | Kaiser et al. |
| 2007/0114081 A1 | 5/2007 | Iwanaka et al. |
| 2007/0251742 A1 | 11/2007 | Adams et al. |
| 2007/0259747 A1 | 11/2007 | Thomas et al. |
| 2008/0308334 A1 | 12/2008 | Leonard |
| 2009/0000849 A1 | 1/2009 | Leonard |
| 2009/0014223 A1 | 1/2009 | Jones et al. |
| 2009/0071737 A1 | 3/2009 | Leonard |
| 2009/0071739 A1 | 3/2009 | Leonard |
| 2009/0091101 A1 | 4/2009 | Leonard |
| 2009/0121518 A1 | 5/2009 | Leonard |
| 2009/0177345 A1 | 7/2009 | Severinsky et al. |
| 2009/0301830 A1 | 12/2009 | Kinsman |
| 2009/0302590 A1 | 12/2009 | Van Bronkhorst |
| 2010/0012412 A1 | 1/2010 | Deckard |
| 2010/0090797 A1 | 4/2010 | Koenig |
| 2010/0155170 A1 | 6/2010 | Melvin |

OTHER PUBLICATIONS

European Patent Office, Written Opinion of the International Searching Authority for PCT/US2010/038711, mailed on Apr. 6, 2011, 8 pages.

All-Terrain Vehicles Magazine, "Bad Boy Partners with G-Force on Project," Jan. 29, 2009, 2 pages, available at http://www.atvmag.com/article.asp?nid=1324, accessed on Jun. 11, 2010.

Trombetta Tympanium, "Bear DC Contractor Specifications," 2003, 2 pages, available at www.trombetta.com.

* cited by examiner

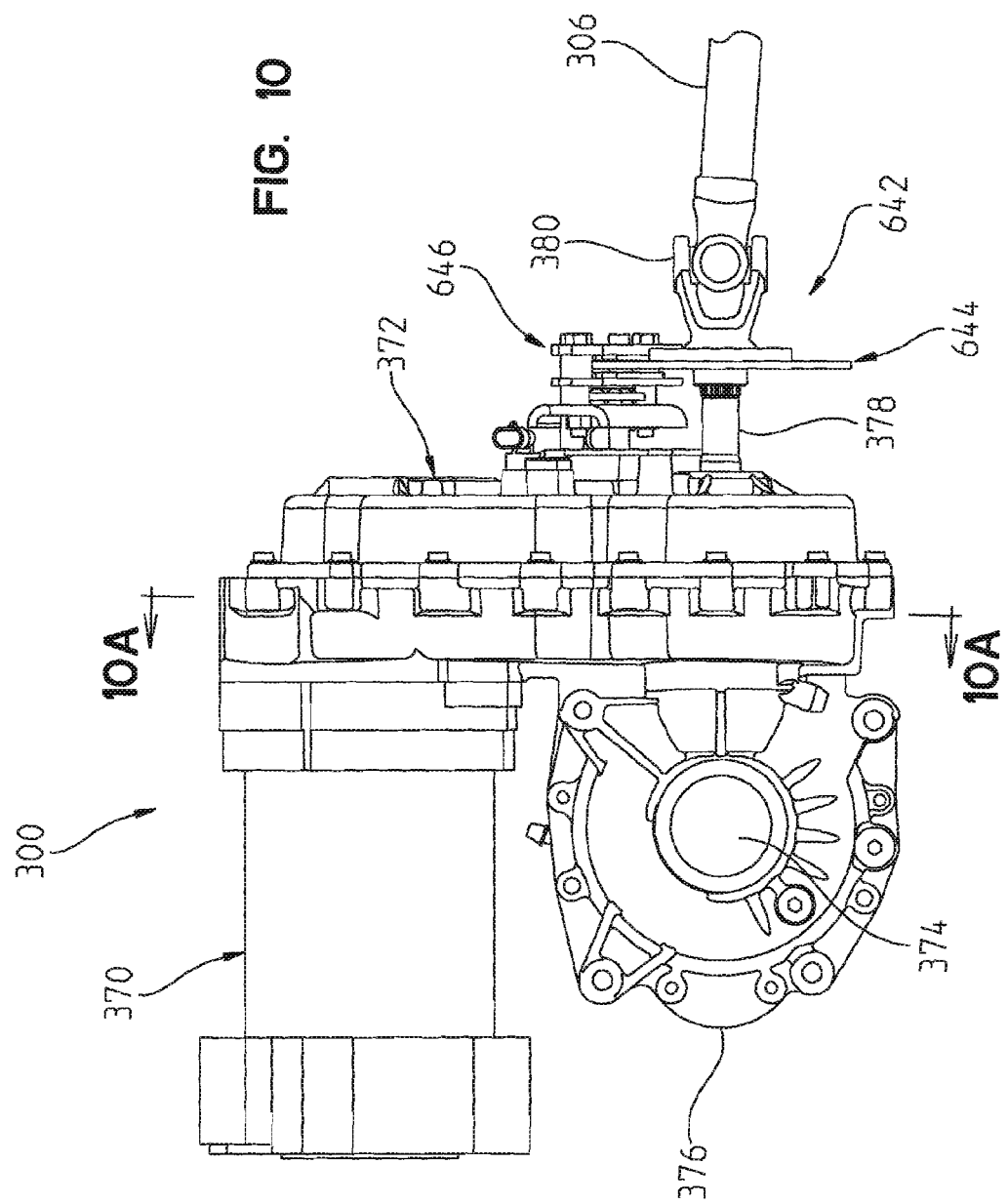

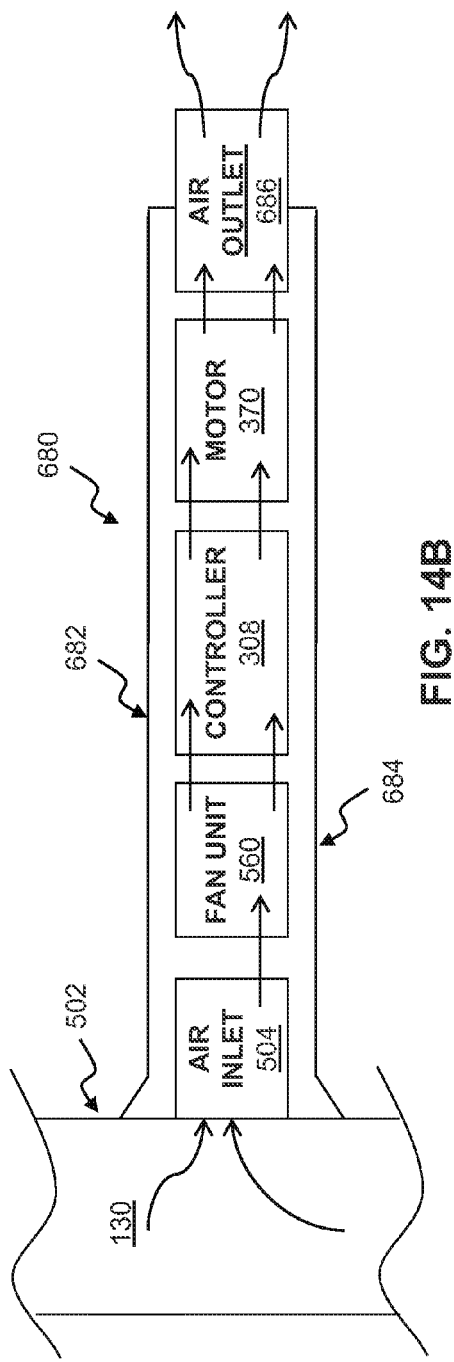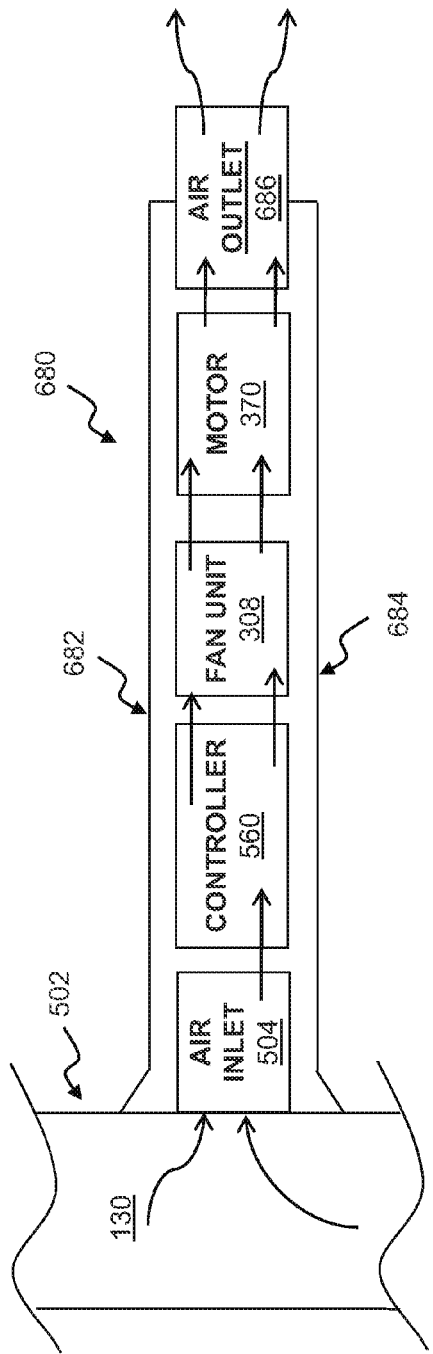

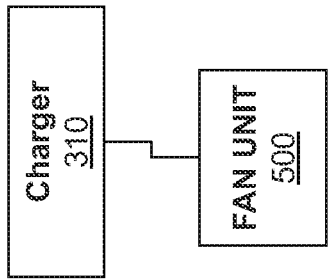
FIG. 14G
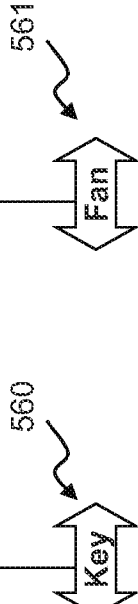
FIG. 14E
FIG. 14D
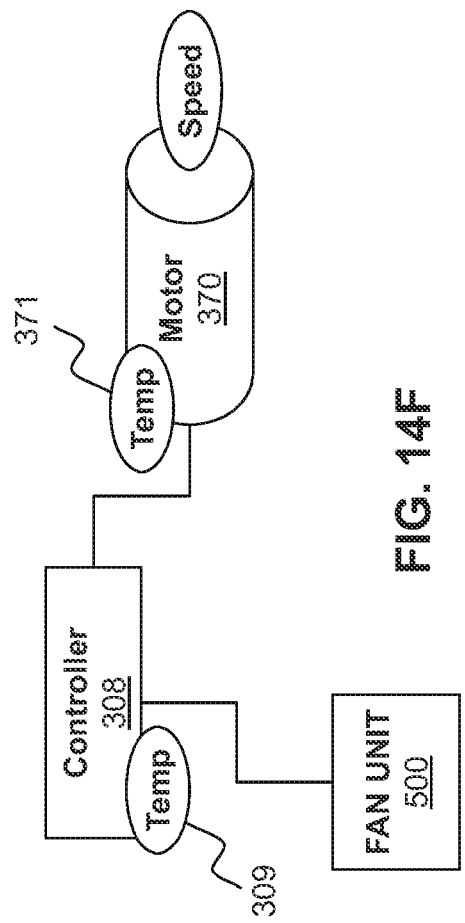
FIG. 14F

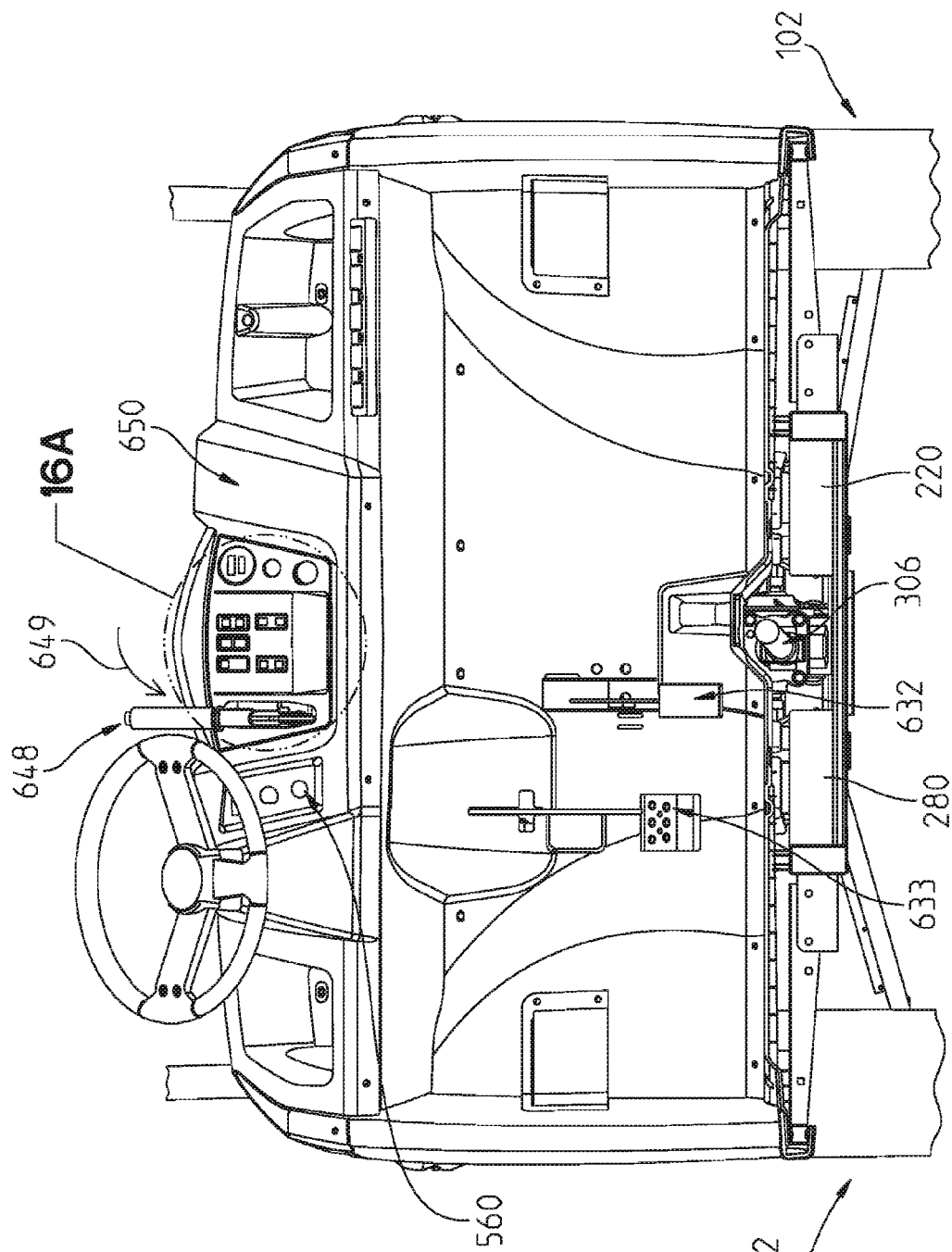

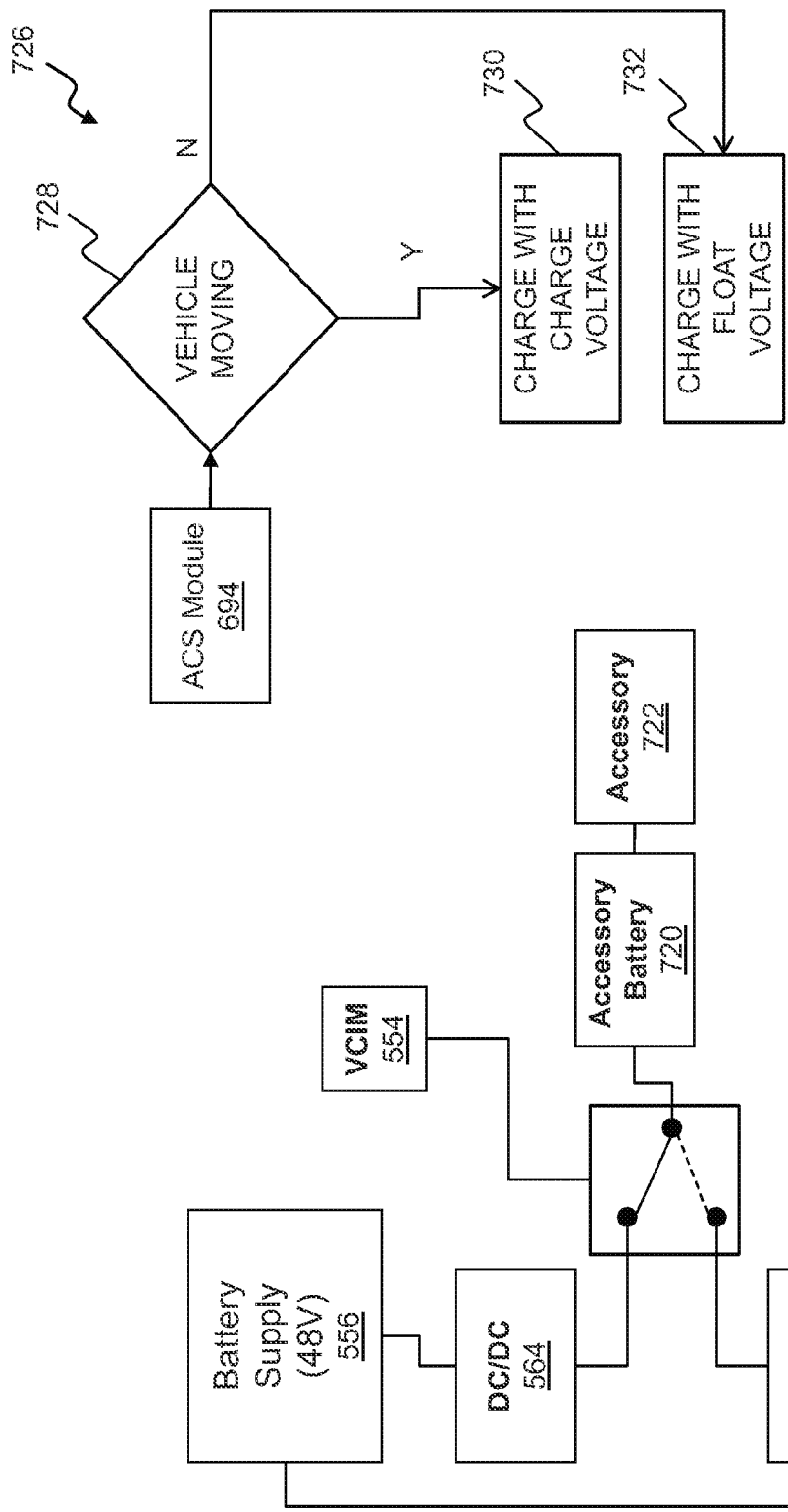

ELECTRIC VEHICLE

RELATED APPLICATIONS

This application is a divisional patent application of U.S. patent application Ser. No. 12/816,052, filed Jun. 15, 2010 titled ELECTRIC VEHICLE, which in turn claims the benefit of U.S. Provisional Patent Application Ser. No. 61/187,147, filed Jun. 15, 2009, titled ELECTRIC VEHICLE, the disclosures of which are expressly incorporated by reference herein.

Reference is made to co-pending U.S. patent application Ser. No. 12/484,921, filed Jun. 15, 2009, the disclosure of which is incorporated herein by reference.

BACKGROUND

The present invention relates to electric vehicles and in particular to electric utility vehicles.

Utility vehicles are known. Traditionally utility vehicles have included an internal combustion engine to power the utility vehicles.

SUMMARY

The present disclosure relates to vehicles, including utility vehicles. The present disclosure relates to utility vehicles having an electric drive train, and more particularly to battery operated vehicles. In an exemplary embodiment of the present disclosure, an electric vehicle is provided. The electric vehicle may be a utility vehicle.

In an exemplary embodiment of the present disclosure, a method of powering an accessory coupled to an electric vehicle is provided. The method comprising the steps of operatively coupling a first DC-to-DC converter to a plurality of batteries which power the operation of the vehicle; operatively coupling a second DC-to-DC converter to the plurality of batteries which power the operation of the vehicle; and based on a condition of the vehicle, selectively coupling an accessory battery to one of a first output voltage of the first DC-to-DC converter and a second output voltage of the second DC-to-DC converter to charge the accessory battery. In an example thereof In another exemplary embodiment of the present disclosure, an electric vehicle having an accessory device coupled thereto is provided. The electric vehicle comprising a frame; a plurality of ground engaging members supporting the frame; an electric motor supported by the frame and operatively coupled to at least one of the plurality of ground engaging members to propel the vehicle; a plurality of batteries supported by the frame; an accessory battery separate from the plurality of batteries and operatively coupled to the accessory to power the accessory; at least one high voltage vehicle component supported by the plurality of ground engaging members and operatively powered by the plurality of batteries; at least one low voltage vehicle component supported by the plurality of ground engaging members and operatively powered by the plurality of batteries; and an electronic controller which charges the accessory battery from the plurality of batteries through a plurality of devices based on a condition of the vehicle.

In yet another exemplary embodiment of the present disclosure, an electric vehicle is provided. The electric vehicle comprising a frame having front and rear ends and a plurality of ground engaging members supporting the frame. The plurality of ground engaging members including a first group positioned adjacent the frame front end and a second group positioned adjacent the frame rear end. The electric vehicle further comprising an electric motor supported by the frame; a front drive system supported by the frame and positioned adjacent the frame front end, the front drive system operatively coupled to the electric motor and to the first group of ground engaging members; a rear drive system supported by the frame and positioned adjacent the frame rear end, the rear drive system being operatively coupled to the electric motor and to the second group of ground engaging members; a plurality of batteries supported by the frame; an accessory battery separate from the plurality of batteries; a sensor monitoring a movement of the vehicle; an electronic controller which controls a provision of power from the plurality of batteries to the electric motor and which monitors the movement of the vehicle; a first DC-to-DC converter operatively coupled to the plurality of batteries, the first DC-to-DC converter having a first output voltage; and a second DC-to-DC converter operatively coupled to the plurality of batteries, the second DC-to-DC converter having a second output voltage, the second output voltage being different from the first output voltage, wherein based on the movement of the vehicle the electronic controller couples the accessory battery to one of the first DC-to-DC converter and the second DC-to-DC converter.

In still another exemplary embodiment of the present disclosure, an electric vehicle is provided. The electric vehicle comprising a frame; a plurality of ground engaging members supporting the frame; an electric motor supported by the frame and operatively coupled to at least one of the plurality of ground engaging members to propel the vehicle; a battery supply supported by the frame, the battery supply being operatively coupled to the electric motor; and a plurality of chargers supported by the frame operatively coupled to the battery supply to charge the battery supply, the plurality of chargers being coupled to the battery supply in parallel.

In yet still another exemplary embodiment of the present disclosure, a method of charging a battery supply of an electric vehicle is provided. The method comprising the steps of: providing at least a first charger and a second charger on board the electric vehicle operatively coupled to the battery supply; connecting a power source to the first charger and the second charger; and charging the battery supply with both the first charger and the second charger when the power source is a first type of power source and with only one of the first charger and the second charger when the power source is a second type of power source.

In a further exemplary embodiment of the present disclosure, an electric vehicle which is charged with a power source is provided. The electric vehicle comprising a frame; a plurality of ground engaging members supporting the frame; an electric motor supported by the frame and operatively coupled to at least one of the plurality of ground engaging members to propel the vehicle; a battery supply supported by the frame, the battery supply being operatively coupled to the electric motor; a plurality of chargers supported by the frame operatively coupled to the battery supply to charge the battery supply. The plurality of chargers including a first charger and a second charger which are coupled to a first connector adapted to be coupled to the power source. The battery supply being charged with both the first charger and the second charger when the power source is a first type of power source and with only one of the first charger and the second charger when the power source is a second type of power source.

In yet a further exemplary embodiment of the present disclosure, an electric vehicle is provided. The electric vehicle comprising a frame; a plurality of ground engaging members supporting the frame; an electric motor supported by the frame and operatively coupled to at least one of the plurality of ground engaging members to propel the vehicle; an electronic controller operatively coupled to the electric motor to control operation of the electric motor; an operator area supported by the frame, the operator area including seating and operator controls, at least a first operator control providing an input to the electronic controller regarding a desired speed of the electric vehicle; a battery supply supported by the frame, the battery supply being operatively coupled to the electric motor; a first differential supported by the frame rearward of the front plane of the seating and operatively coupled to at least one ground engaging member which is rearward of the front plane of the seating, the electric motor being operatively coupled to the first differential; a second differential supported by the frame forward of the front plane of the seating and operatively coupled to at least one ground engaging member which is forward of the front plane of the seating; and a prop shaft coupling the electric motor to the second differential, the prop shaft extending through the battery supply. The electric vehicle has a plurality of wheel drive modes. Each of the wheel drive modes selecting at least one of the plurality of ground engaging members to be operatively coupled to the electric motor. At least one of the plurality of wheel drive modes initially provides power to a first number of ground engaging members, the first number being less than a total number of ground engaging members, and subsequently provides power to a second number of ground engaging members in response to a loss of traction of at least one of the first number of ground engaging members, the second number being greater than the first number.

In still a further exemplary embodiment of the present disclosure, a method of selecting a wheel drive mode of an electric vehicle from a plurality of possible wheel drive modes is provided. Each wheel drive mode selecting at least one of a plurality of ground engaging members to be operatively coupled to an electric motor of the electric vehicle. The method comprising the step of: providing a first input in an operator area of the electric vehicle, the operator area having seating, the first input having a first setting corresponding to a first wheel drive mode, a second setting corresponding to a second wheel drive mode, and a third setting corresponding to a third wheel drive mode. In the first wheel drive mode less than all of the ground engaging members positioned rearward of the front plane of the seating are operatively coupled to the electric motor. In the second wheel drive mode at least a portion of the ground engaging members positioned rearward of the front plane of the seating are operatively coupled to the electric motor. The portion of the ground engaging members including ground engaging members positioned on both sides of a vertical centerline plane of the electric vehicle, all of the at least two ground engaging members being positioned rearward of the front plane of the seating. In the third wheel drive mode a first number of ground engaging members are operatively coupled to the electric motor. The first number being less than a total number of ground engaging members. In response to a loss of traction of at least one of the first number of ground engaging members a second number of ground engaging members are operatively coupled to the electric motor, the second number being greater than the first number. The method further comprising the step of providing a second input in the operator area of the electric vehicle, the second input having a first setting corresponding to a selection of engine braking when the third setting of the first input is selected, wherein the engine braking is provided by altering a driving voltage of the electric motor of the electric vehicle.

In still yet a further exemplary embodiment of the present disclosure, an electric vehicle is provided. The electric vehicle, comprising a frame having front and rear ends; a plurality of ground engaging members supporting the frame, the plurality of ground engaging members including a first group positioned adjacent the frame front end and a second group positioned adjacent the frame rear end; an electric motor supported by the frame; a front drive system supported by the frame and positioned adjacent the frame front end, the front drive system operatively coupled to the electric motor and to the first group of ground engaging members, the electric motor providing power to at least one of the first group of ground engaging members; a rear drive system supported by the frame and positioned adjacent the frame rear end, the rear drive system being operatively coupled to the electric motor and to the second group of ground engaging members, the electric motor providing power to at least one of the second group of ground engaging members; a plurality of batteries supported by the frame; an electronic controller which controls a provision of power from the plurality of batteries to the electric motor; and a throttle input system operatively coupled to the electronic controller to provide an indication of a desired speed for the vehicle. The throttle input system including a throttle input member; at least two sensors each of which provide an indication of a position of the throttle input member; and at least two voltage supplies, a first voltage supply being operatively coupled to a first sensor of the at least two sensors and a second voltage supply being operatively coupled to a second sensor of the at least two sensors.

In yet still a further exemplary embodiment of the present disclosure, an electric vehicle is provided. The electric vehicle, comprising a frame having front and rear ends; a plurality of ground engaging members supporting the frame, the plurality of ground engaging members including a first group positioned adjacent the frame front end and a second group positioned adjacent the frame rear end; an electric motor supported by the frame; a front drive system supported by the frame and positioned adjacent the frame front end, the front drive system operatively coupled to the electric motor and to the first group of ground engaging members, the electric motor providing power to at least one of the first group of ground engaging members; a rear drive system supported by the frame and positioned adjacent the frame rear end, the rear drive system being operatively coupled to the electric motor and to the second group of ground engaging members, the electric motor providing power to at least one of the second group of ground engaging members; a plurality of batteries supported by the frame; an electronic controller which controls a provision of power from the plurality of batteries to the electric motor; and a drive mode input operatively coupled to the electronic controller, the electronic controller operating the electric vehicle in one of a plurality of drive modes based on the drive mode input, wherein in a first drive mode the electronic controller specifies a first amount of engine braking to be applied by the electric motor and in a second drive mode the electronic controller specifies a second amount of engine braking to be applied by the electric motor, the second amount differing from the first amount.

In another embodiment of the present disclosure, method of operating an electric vehicle is provided. The method comprising the steps of requesting a desired speed of the electric vehicle; monitoring a current speed of the electric vehicle; and applying engine braking with an electric drive motor of the vehicle to reduce a current speed of the vehicle to a desired speed, a first amount of engine braking being applied with the electric drive motor when the vehicle is being operated in a first drive mode and a second amount of engine braking being applied with the electric drive motor when the vehicle is being operated in a second drive mode.

In still another exemplary embodiment of the present disclosure, an electric vehicle is provided. The electric vehicle, comprising a frame having front and rear ends; a plurality of ground engaging members supporting the frame, the plurality of ground engaging members including a first group positioned adjacent the frame front end and a second group positioned adjacent the frame rear end; an electric motor supported by the frame; a front drive system supported by the frame and positioned adjacent the frame front end, the front drive system operatively coupled to the electric motor and to the first group of ground engaging members, the electric motor providing power to at least one of the first group of ground engaging members; a rear drive system supported by the frame and positioned adjacent the frame rear end, the rear drive system being operatively coupled to the electric motor and to the second group of ground engaging members, the electric motor providing power to at least one of the second group of ground engaging members; a plurality of batteries supported by the frame; an electronic controller which controls a provision of power from the plurality of batteries to the electric motor including a drive current; and a drive mode input operatively coupled to the electronic controller. The electronic controller operating the electric vehicle in one of a plurality of drive modes based on the drive mode input, wherein in a first drive mode the electronic controller limits the drive current in a first non-linear fashion based on an rpm of the electric motor and in a second drive mode in a second non-linear fashion based on the rpm of the electric motor.

In yet another embodiment of the present disclosure, method of operating an electric vehicle is provided. The method comprising the steps of requesting a desired speed of the electric vehicle; monitoring a current speed of the electric vehicle; and adjusting a drive current of the electric vehicle when the current speed of the electric vehicle is less than the desired speed of the vehicle, the drive current being limited in a non-linear fashion based on an rpm of the electric motor.

In a further embodiment of the present disclosure, a method of operating an electric vehicle is provided. The method comprising the steps of requesting a desired speed of the electric vehicle; monitoring a current speed of the electric vehicle; and adjusting a drive current of the electric vehicle when the current speed of the electric vehicle is less than the desired speed of the vehicle, the drive current being increased until one of the current speed equals the desired speed and a pause in the operation of the drive motor of the electric vehicle is detected.

In still a further exemplary embodiment of the present disclosure, a method of monitoring an electric vehicle is provided. The method comprising the steps of operatively coupling an external monitoring device to a controller of the electric vehicle, the electric vehicle including a rear drive operatively coupled to an electric drive motor to power one or more rear ground engaging members and a front drive operatively coupled to the electric drive motor to power one or more front ground engaging members, the electric motor being positioned rearward of a front plane of side-by-side seating in an operator area of the electric vehicle; monitoring at least one characteristic of the electric motor with the external monitoring device; and sending at least one response curve to the electronic controller from the external monitoring device, the response curve specifying an output characteristic of the electric motor.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 10 shows a side view of the rear portion of the drivetrain;

FIG. 14B illustrates a first representation of a cooling tunnel;

FIG. 14C illustrates a second representation of a cooling tunnel;

FIG. 14D illustrates a first control arrangement for the fan unit of FIG. 14;

FIG. 14E illustrates a second control arrangement for the fan unit of FIG. 14;

FIG. 14F illustrates a third control arrangement for the fan unit of FIG. 14;

FIG. 14G illustrates a fourth control arrangement for the fan unit of FIG. 14;

FIG. 16 illustrates a portion of the vehicle of FIG. 1 along lines 16-16 in FIG. 4;

FIG. 23 illustrates an arrangement for an accessory battery and charging components for charging the accessory battery;

FIG. 24 illustrates a processing sequence for charging the accessory battery;

Corresponding reference characters indicate corresponding parts throughout the several views. Unless stated otherwise the drawings are proportional.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts. Further, although described in the context of an electric vehicle, the embodiments disclosed herein may be implemented as part of a hybrid vehicle.

Figure 1:
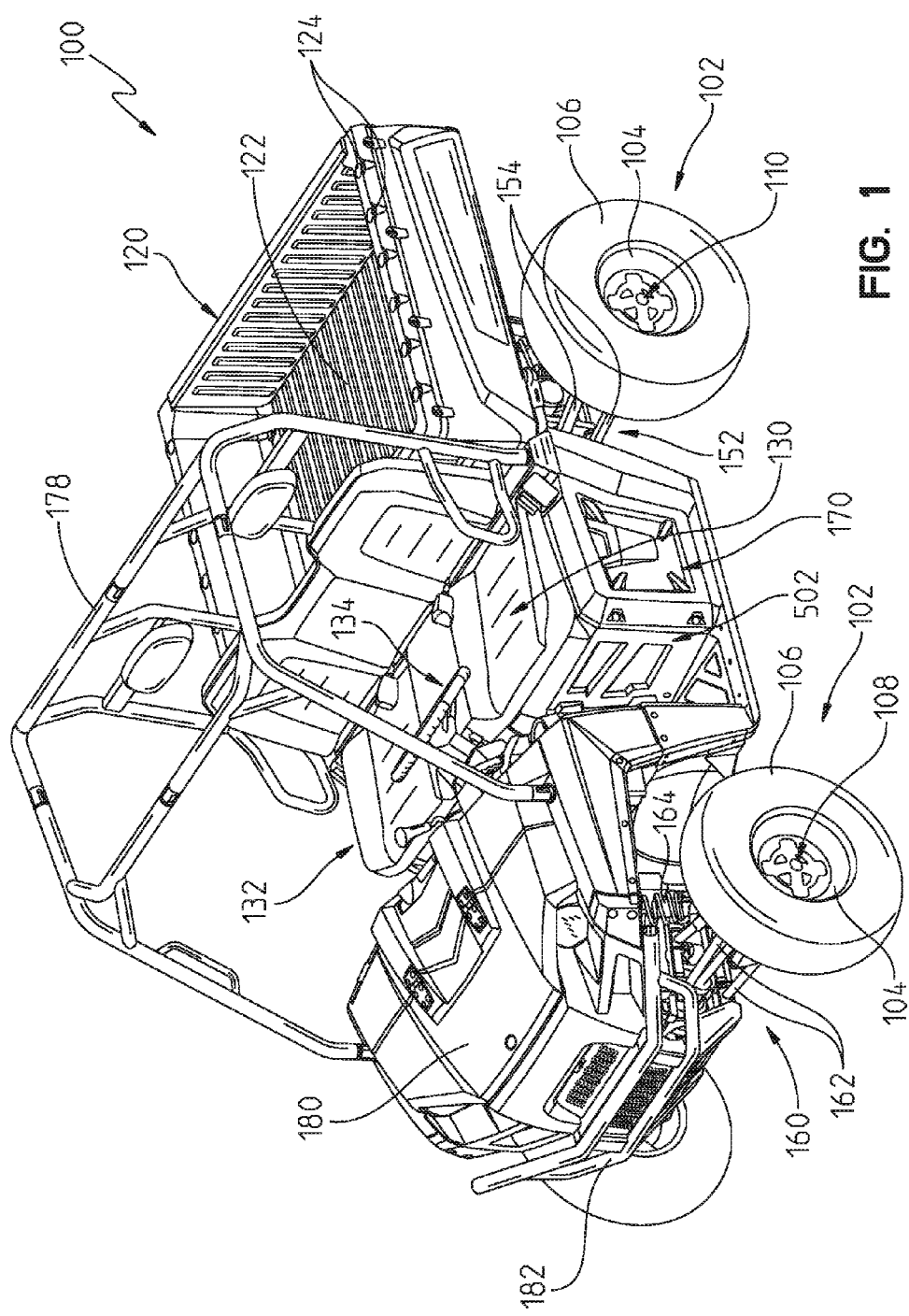
FIG. 1 is a perspective view of an exemplary utility vehicle.

Referring to FIG. 1, an illustrative embodiment of vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

In addition to vehicle 100, the teachings of the present disclosure may be used in combination with the suspension systems, drive configurations, modular sub-sections, power steering units, and other features described in any one of U.S. Provisional Patent Application Ser. No. 60/918,502, titled VEHICLE, filed Mar. 16, 2007; U.S. Provisional Patent Application Ser. No. 60/918,556, titled VEHICLE, filed Mar. 16, 2007; U.S. Provisional Patent Application Ser. No. 60/918,444, titled VEHICLE WITH SPACE UTILIZATION, filed Mar. 16, 2007; U.S. Provisional Patent Application Ser. No. 60/918,356, titled UTILITY VEHICLE HAVING MODULAR COMPONENTS, filed Mar. 16, 2007; U.S. Provisional Patent Application Ser. No. 60/918,500, titled METHOD AND APPARATUS RELATED TO TRANSPORTABILITY OF A VEHICLE, filed Mar. 16, 2007; U.S. Utility patent application Ser. No. 12/050,048, titled VEHICLE WITH SPACE UTILIZATION, filed Mar. 17, 2008; U.S. Utility patent application Ser. No. 12/050,064, titled VEHICLE WITH SPACE UTILIZATION, filed Mar. 17, 2008; U.S. Utility patent application Ser. No. 12/050,041, titled METHOD AND APPARATUS RELATED TO TRANSPORTABILITY OF A VEHICLE filed Mar. 17, 2008; U.S. Utility patent application Ser. No. 12/092,151, titled UTILITY VEHICLE HAVING MODULAR COMPONENTS, filed Apr. 30, 2008; U.S. Utility patent application Ser. No. 12/092,153, titled VEHICLE, filed Apr. 30, 2008, U.S. Utility patent application Ser. No. 12/092,191, titled VEHICLE, filed Apr. 30, 2008, U.S. Utility patent application Ser. No. 12/135,107, titled VEHICLE, filed Jun. 6, 2008, U.S. Utility patent application Ser. No. 12/134,909, titled SUSPENSION SYSTEMS FOR A VEHICLE, filed Jun. 6, 2008, U.S. Utility patent application Ser. No. 12/218,572, titled FLOORBOARD FOR A VEHICLE, filed Jul. 16, 2008, and U.S. Utility patent application Ser. No. 12/317,298, titled VEHICLE, filed Dec. 22, 2008, the disclosures of which are expressly incorporated by reference herein.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110. As configured in FIG. 1, vehicle 100 is a four wheel, two axle vehicle. As mentioned herein one or more of ground engaging members 102 are operatively coupled to a drivetrain 112 (see FIGS. 7 and 8) to power the movement of vehicle 100, as further described herein.

Returning to FIG. 1, vehicle 100 includes a bed 120 having a cargo carrying surface 122. Cargo carrying surface 122 may be flat, contoured, and/or comprised of several sections. Bed 120 further includes a plurality of mounts 124 for receiving an expansion retainer 824 (see FIG. 32) which may couple various accessories to bed 120. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein. Further reference is made to our pending application Ser. No. 12/135,107 filed Jun. 6, 2008. entitled "VEHICLE"; Ser. No. 12/134,909 filed Jun. 6, 2008, entitled "SUSPENSION SYSTEMS FOR A VEHICLE" and Ser. No. 12/317,298 filed Dec. 22, 2008, entitled "VEHICLE", the disclosures of which are expressly incorporated by reference herein.

Figure 2:
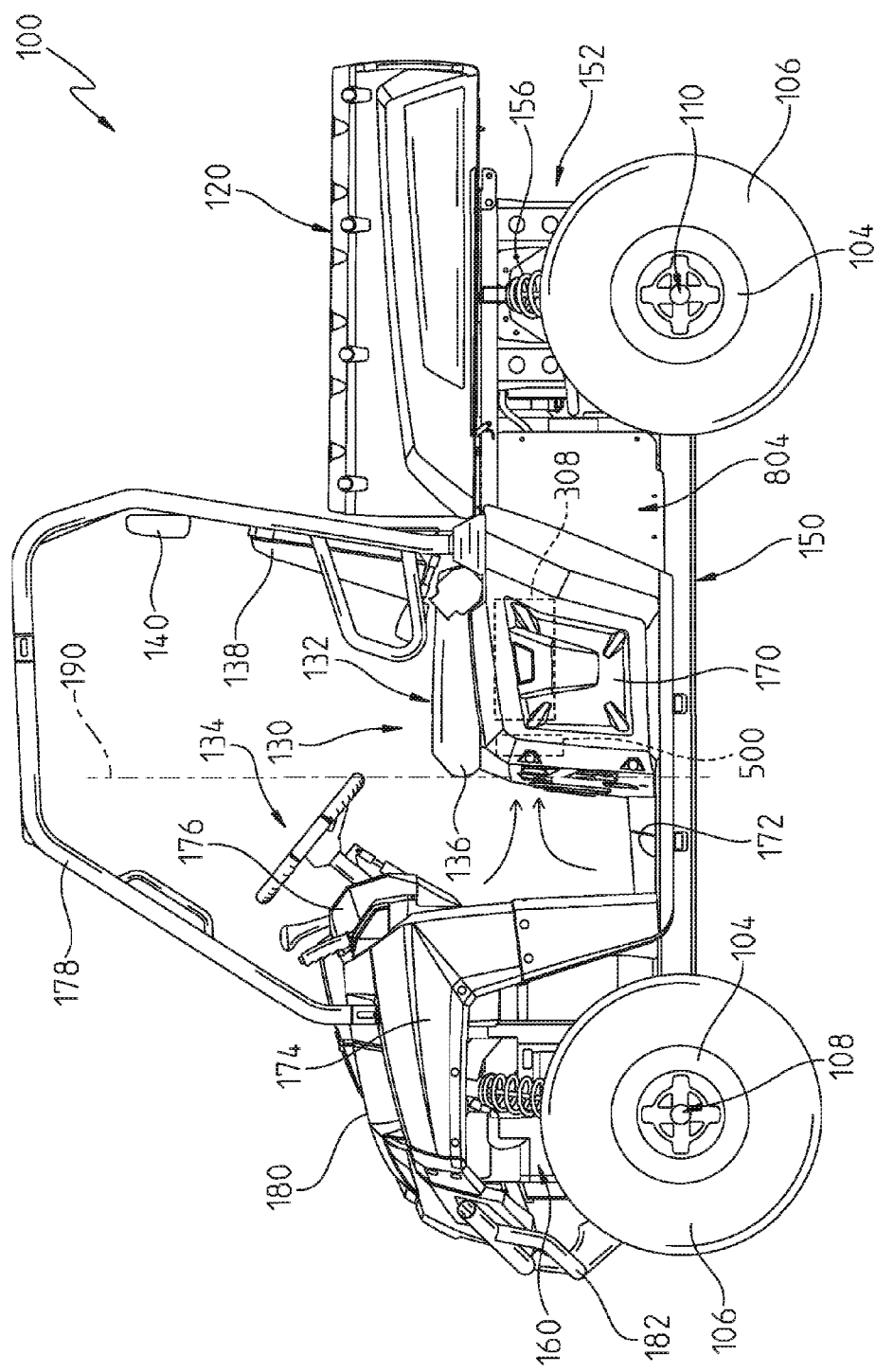
FIG. 2 illustrates a left side view of the exemplary utility vehicle of FIG. 1.
Figure 3:
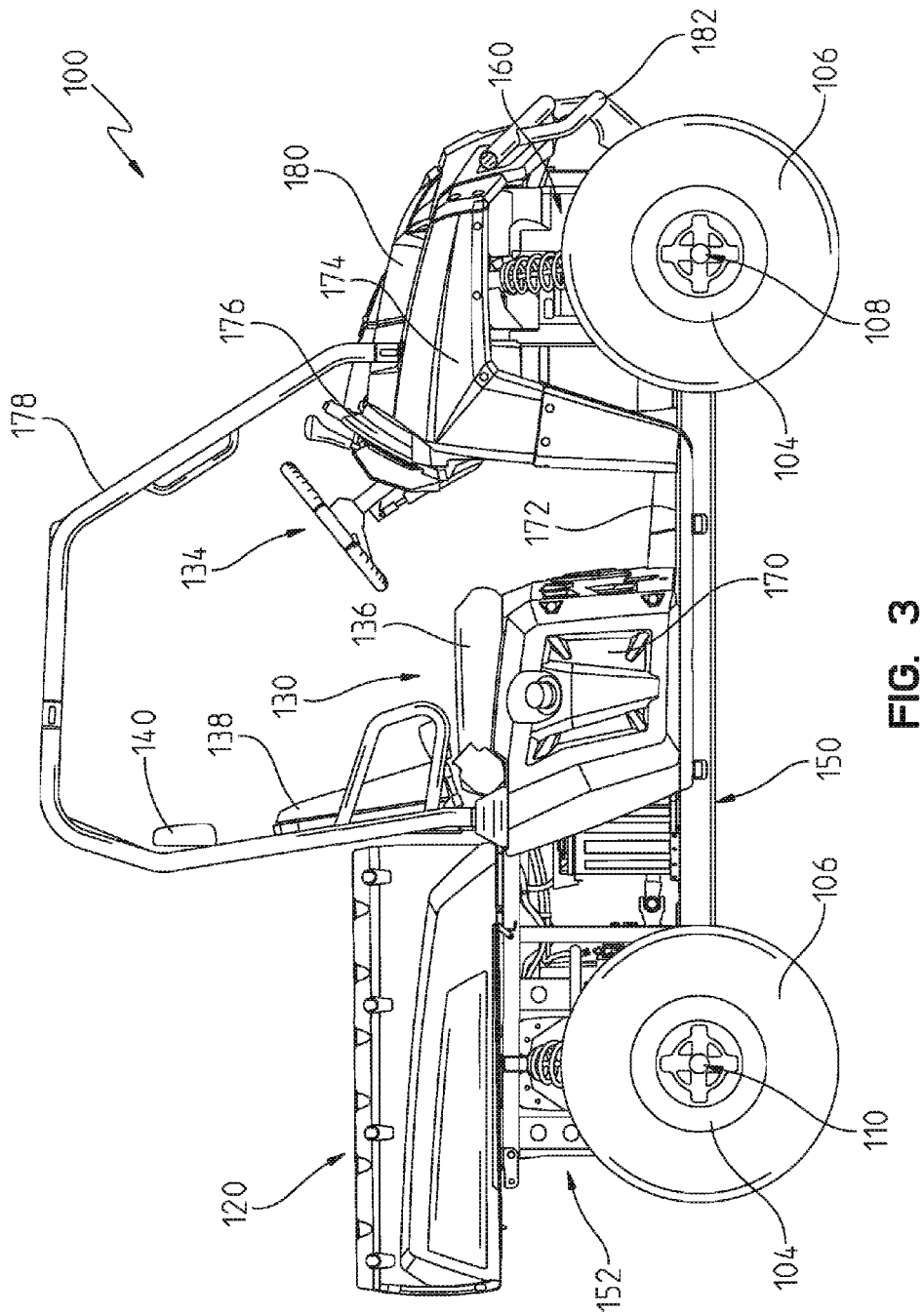
FIG. 3 illustrates a right side view of the exemplary utility vehicle of FIG. 1.

Vehicle 100 includes an operator area 130 including seating 132 for one or more passengers. Operator area 130 further includes a plurality of operator controls 134 by which an operator may provide input into the control of vehicle 100. Controls 134 may include controls for steering, acceleration and braking. As shown in FIGS. 2 and 3, seating 132 includes a seat bottom portion 136 and a seat back portion 138 and head rests 140. Seating 132 in one embodiment is a split bench with the operator side being adjustable along the longitudinal axis of vehicle 100. As shown herein, the operator area 130 includes a single bench seat 132, but it should be appreciated that multiple tandem seats could be incorporated. A front plane 190 of seating 132 is shown in FIG. 2. A vertical centerline longitudinal plane 192 of vehicle 100 is shown in FIG. 4.

Vehicle 100 includes four wheel independent suspensions. Referring to FIG. 1, each of ground engaging members 102 of rear axle 110 is coupled to frame 150 (FIG. 2) through rear suspension 152. Rear suspension 152 includes double A-arms 154 and a shock 156 (FIG. 2). Each of ground engaging members 102 of front axle 108 is coupled to frame 150 through front suspensions 160. Front suspension 160 includes double A-arms 162 and a shock 164 (FIG. 1).

Figure 4:
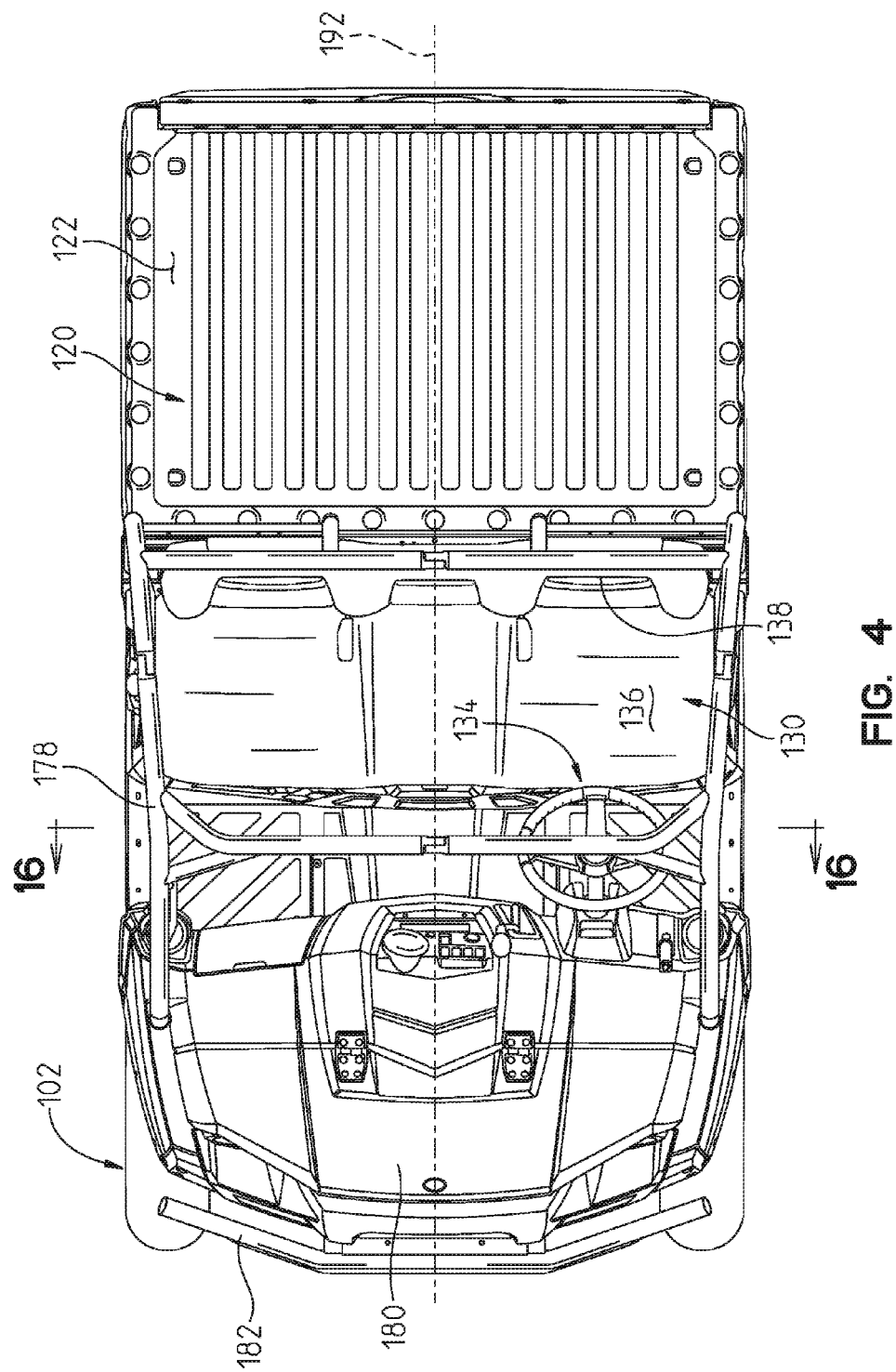
FIG. 4 illustrates a top view of the exemplary utility vehicle of FIG. 1.

In addition to the bed 120, utility vehicle 100 includes a plurality of body components, and as best shown in FIGS. 2-4, namely side panels 170, floor boards 172, wheel wells 174, dash 176, rollover structure 178, hood 180, and bumper 182. All of these items are directly or indirectly attached to and/or supported by the vehicle frame 150.

Figure 5:
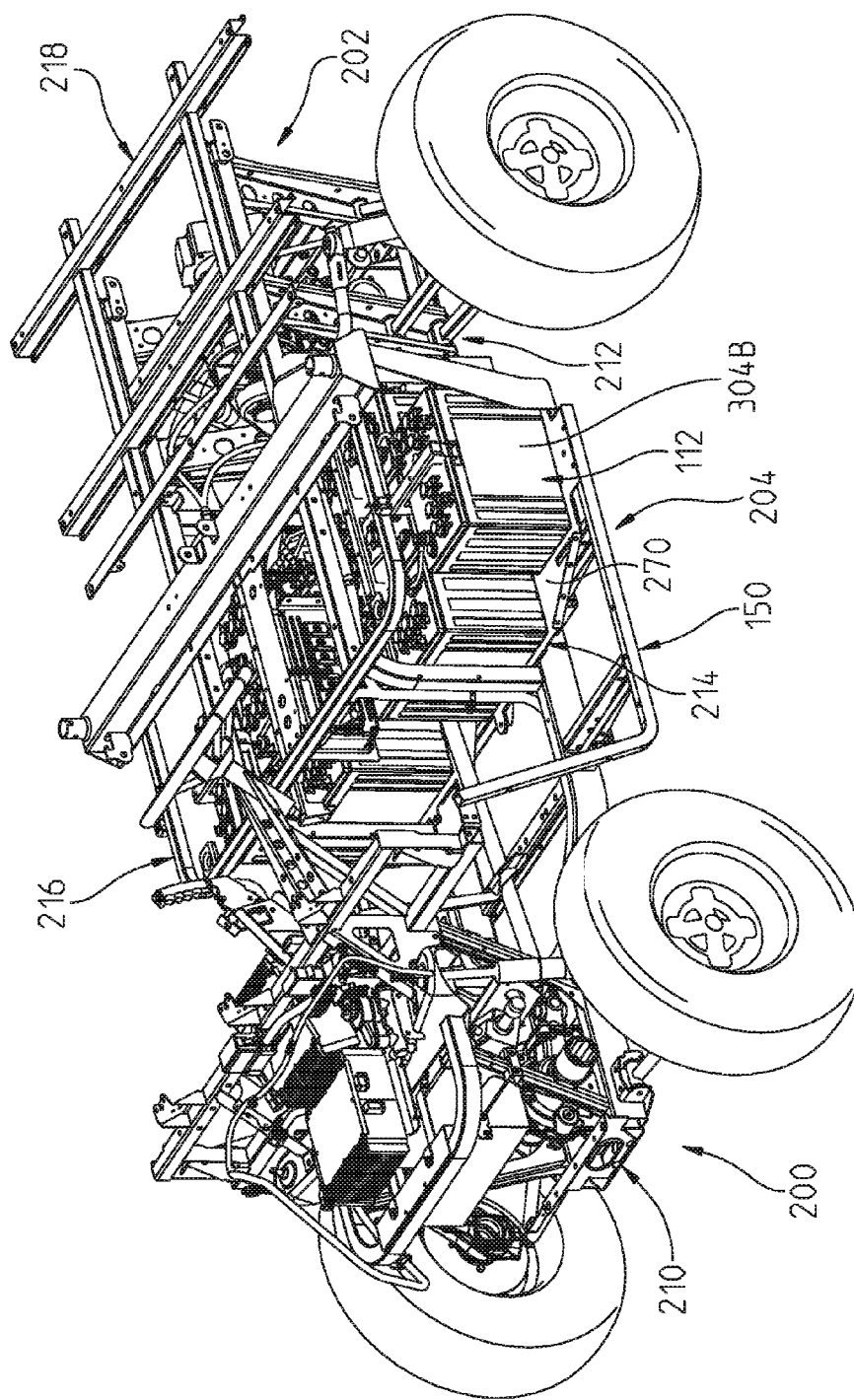
FIG. 5 illustrates a top perspective view of the exemplary utility vehicle of FIG. 1, with the body panels and roll-over structure removed.
Figure 5A:
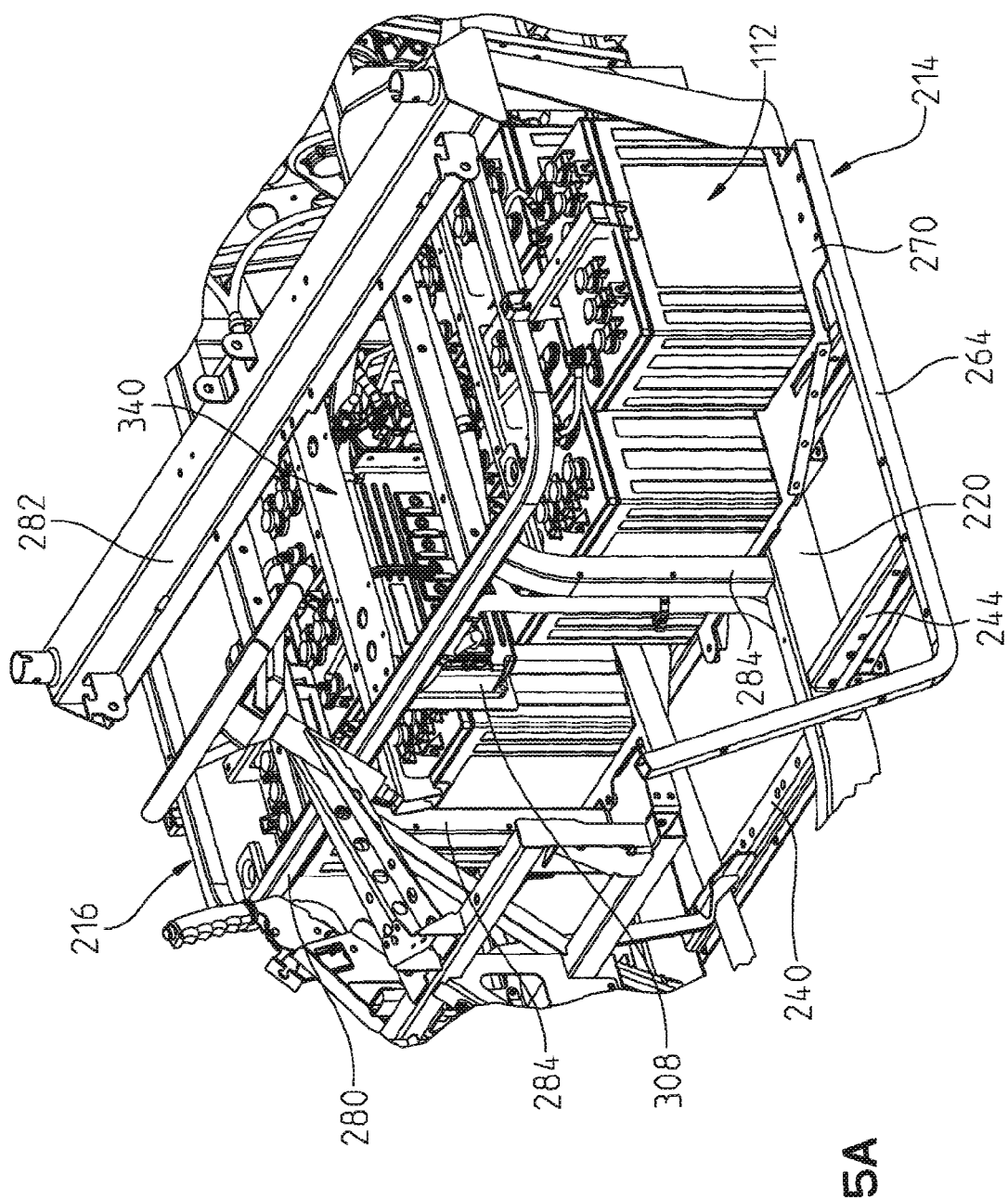
FIG. 5A illustrates an enlarged portion of the central part of vehicle shown in FIG. 5.
Figure 6:
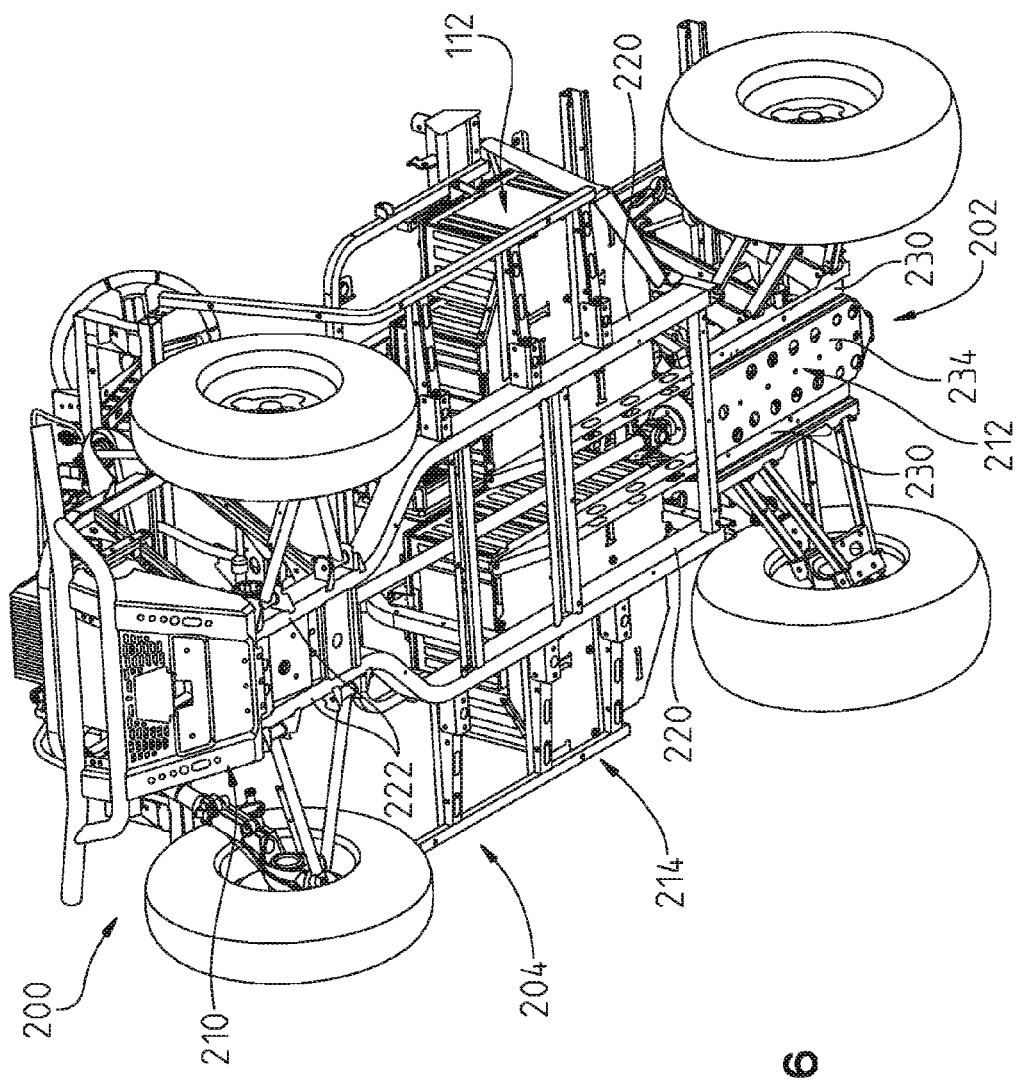
FIG. 6 illustrates a bottom perspective view of the utility vehicle as depicted in FIG. 5.
Figure 6A:
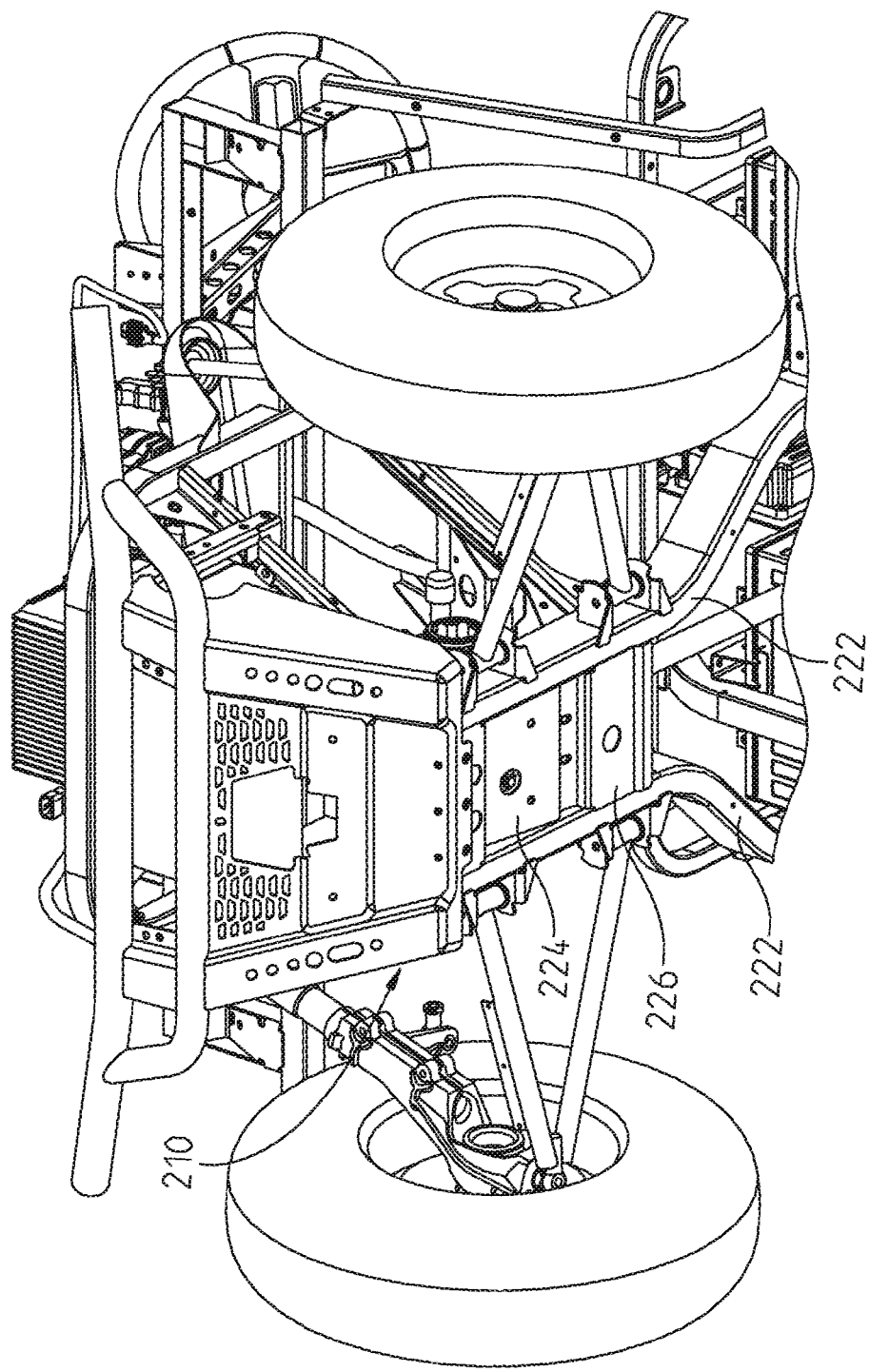
FIG. 6A illustrates an enlarged portion of the vehicle front end shown in FIG. 6.
Figure 6B:
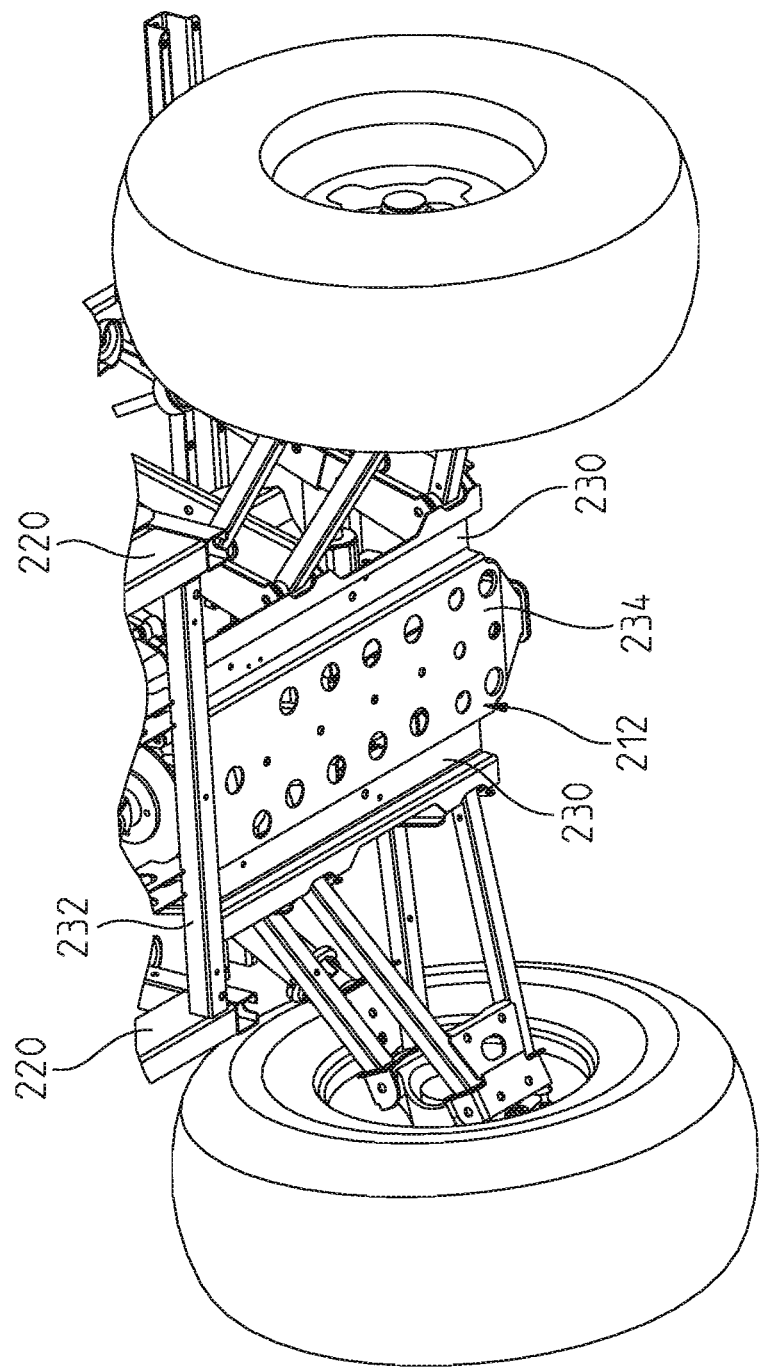
FIG. 6B illustrates an enlarged portion of the vehicle rear end shown in FIG. 6.

With reference now to FIGS. 5, 5A and 6, vehicle 100 is shown with the body accessory parts and rollover structure 178 removed showing basically the frame 150 and drivetrain 112. As shown best in FIG. 5, the vehicle has a front end 200, a rear end 202 and an intermediate portion 204 between the front and rear portion 200, 202. Frame 150 includes corresponding front frame portion 210, rear frame portion 212 and intermediate frame portion 214. The frame portions 210, 212, 214 provide support to drivetrain 112 as further described herein. In addition, frame 150 includes a seat support portion 216 and a bed support portion 218.

With respect to FIGS. 6, and 6A-6C, frame 150 will be described. Frame 150 includes longitudinally extending frame members 220 which extend a substantial length of the vehicle and neck down to form front frame members at 222. As shown best in FIG. 6A, support plates 224 and 226 span the frame members 222 for support as described herein. As shown best in FIG. 6B, rear frame portion 212 is defined by channel members 230 extending from a transverse portion 232 which, in turn, extends between longitudinally extending frame members 220. Plate portion 234 extends across channel members 230 to provide support for a rear portion of the drivetrain 112, as described herein.

Figure 6C:
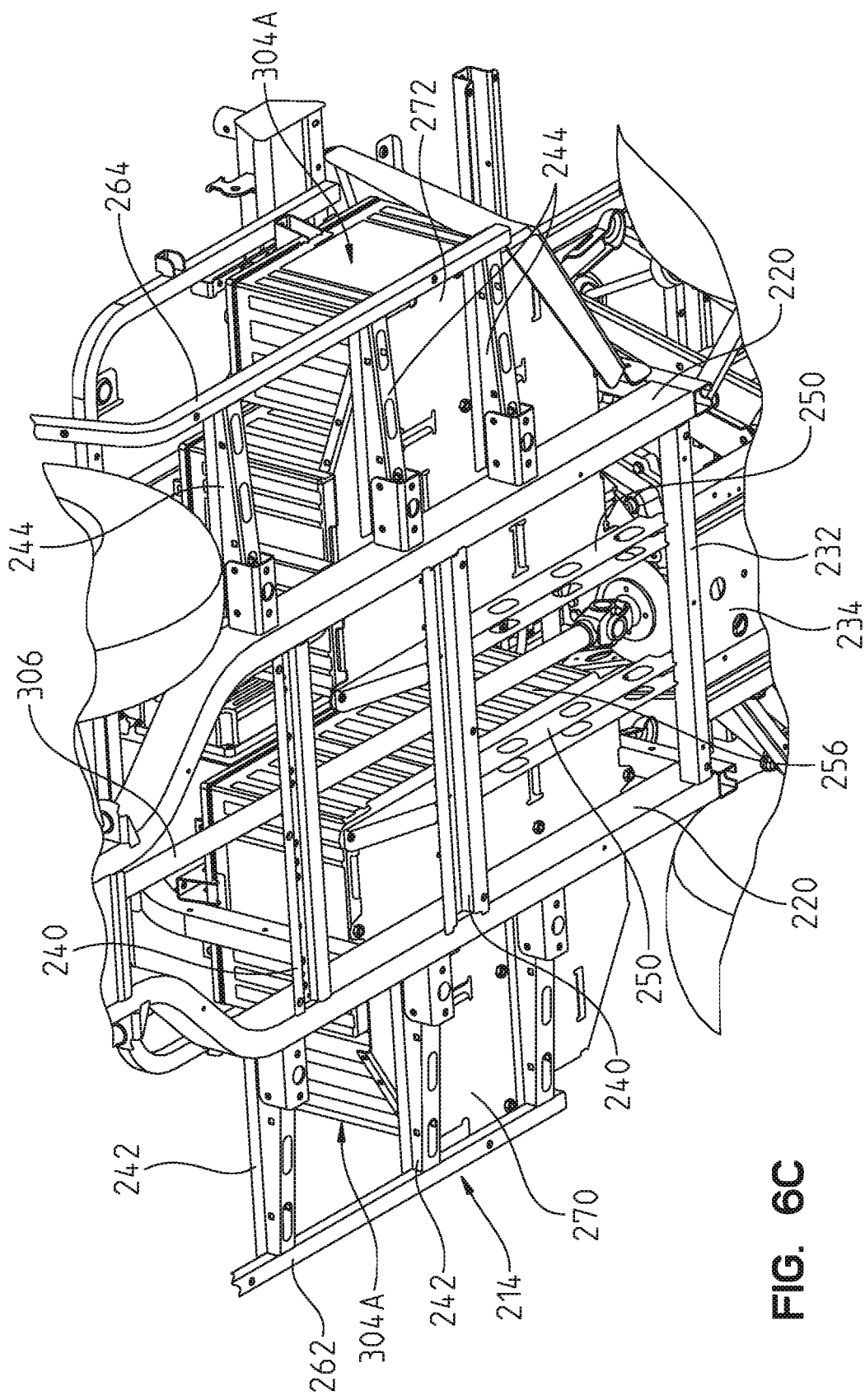
FIG. 6C illustrates an enlarged portion of the vehicle midsection shown in FIG. 6.

As best shown in FIG. 6C, intermediate frame portion 214 is comprised of transverse channels 240 extending between longitudinally extending frame members 220 and transverse channel portions 242 and 244 extending outwardly from longitudinally extending frame members 220. Two longitudinally extending straps 250 extend over one of the transverse channels 240 and over channel 232 defining a longitudinal opening 256 therebetween. The longitudinal opening 256 is positioned generally centrally relative to the lateral width of the vehicle. Frame tube 262 is positioned at the end of transverse channel portions 242 and frame tube 264 is positioned at the end of transverse channel portions 244. A support platform 270 is positioned over channel 250, over at least two of the transverse channel portions 242 and frame tube 262 and a support platform 272 is positioned over the other of the frame members 250 over at least two of the transverse channel portions 244 and over frame tube 264.

With respect again to FIG. 5A, seat support platform 216 is comprised of crossbars 280, 282 which are elevated from the longitudinal extending support members 220 by way of vertical support members 284. As shown, cross bar 280 defines a front end of the seat supporting portion.

Figure 7:
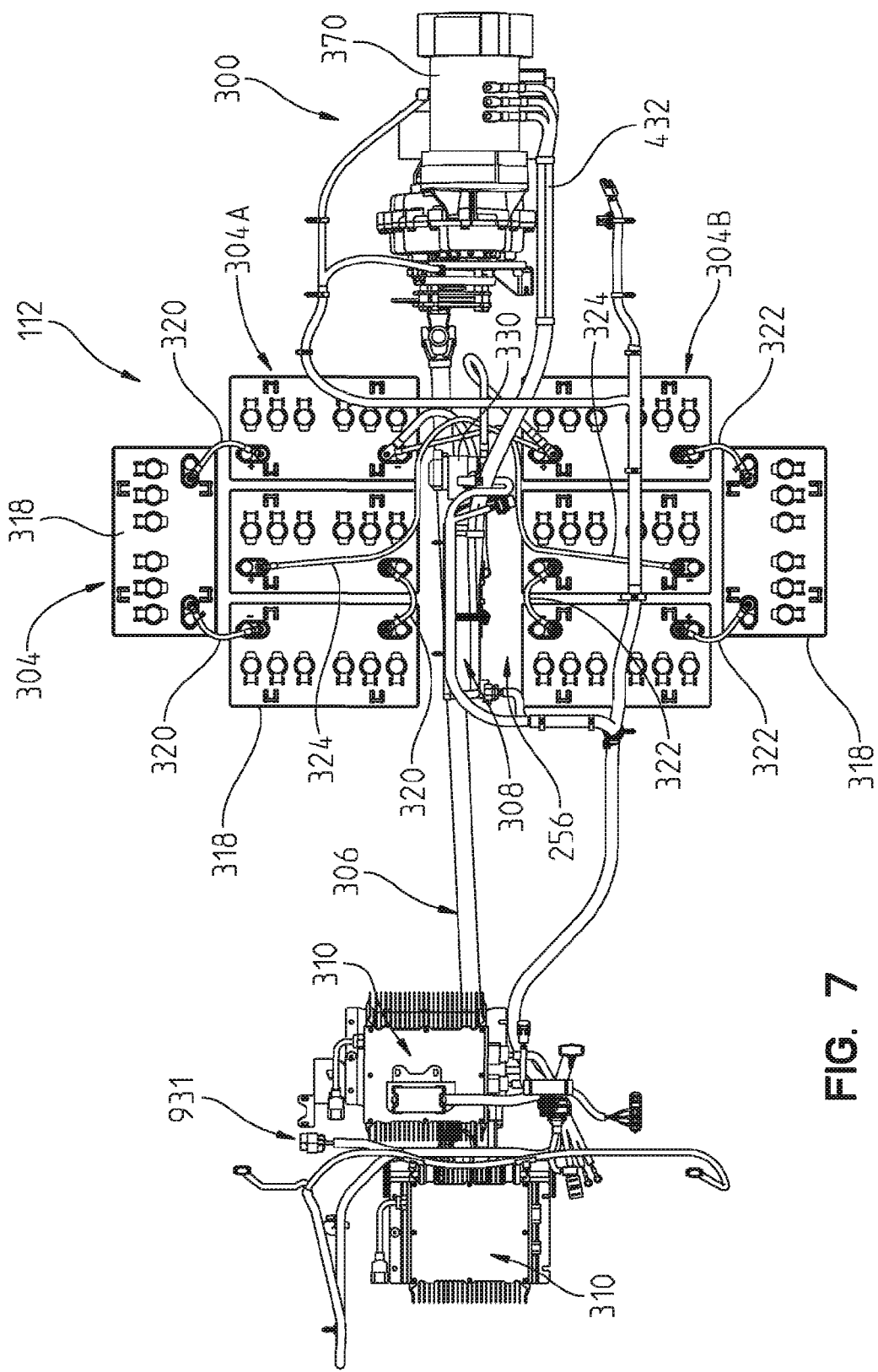
FIG. 7 illustrates a top plan view of the electric drivetrain of the utility vehicle of FIG. 1.

With reference now to FIG. 7, drivetrain 112 is generally comprised of rear drive 300, front drive 302, battery packs 304, a prop shaft 306 interconnecting the rear and front drives 300, 302, and a controller to control the motor speed and other electrical functions. One or more chargers 310 are also provided to recharge the batteries when the vehicle is idle. As also shown, battery packs 304 comprise individual batteries 318 positioned rearward of the front end of the seat supporting portion, and the chargers 310 are positioned forward of the front end of the seat supporting portion.

With respect first to battery packs 304, two groups of batteries 304A and 304B are defined where each battery group 304A, 304B includes a battery 318 of 12V capacity where each of the groups 304A, 304B are wired in series, thereby defining two 48V groups. Each of the groups 304A, 304B are connected through the controller 308 in parallel to define a 48V power source. It should be appreciated that battery group 304B is supported by platform 270 (FIG. 5) whereas battery group 304A is supported by platform 272 (FIG. 6C). With reference to FIGS. 6C and 7, each of the groups of batteries 304A, 304B are also defined so as to flank longitudinal opening 256 to provide room for prop shaft 306 extending therethrough. As shown best in FIG. 7, battery group 304A is serially connected by way of jumper cables 320, batteries in battery group 304B are serially connected by way of jumper cables 322 and battery groups 304A and 304B are connected in parallel by way of battery cables 324. In one embodiment, jumper cables 320 and jumper cables 322 are the same length. As such, only two lengths of battery cable are needed to connect all of the batteries of 304A and 304B together.

Figure 8:
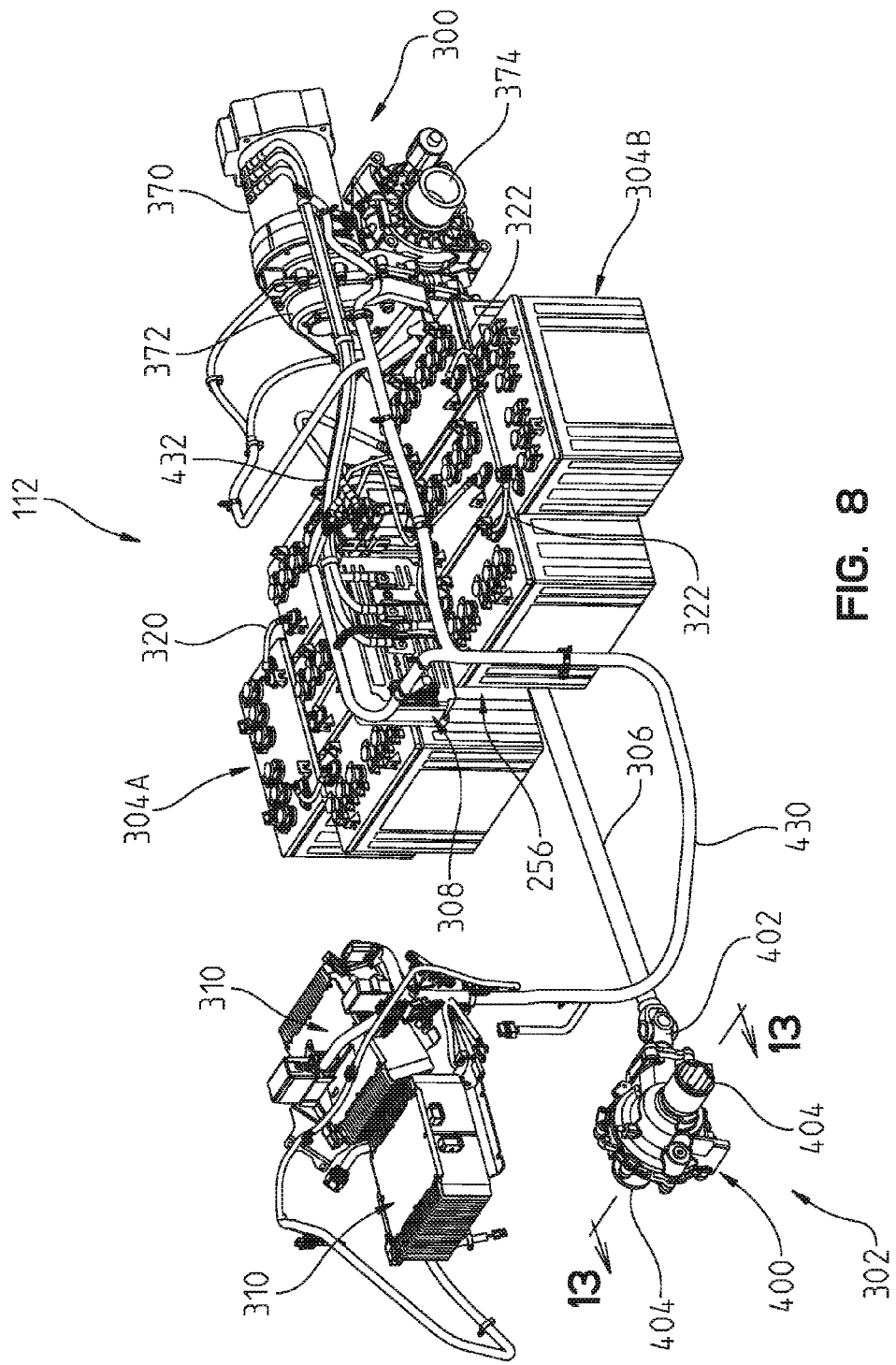
FIG. 8 illustrates a perspective view of the electric drivetrain of the utility vehicle of FIG. 1.
Figure 9:
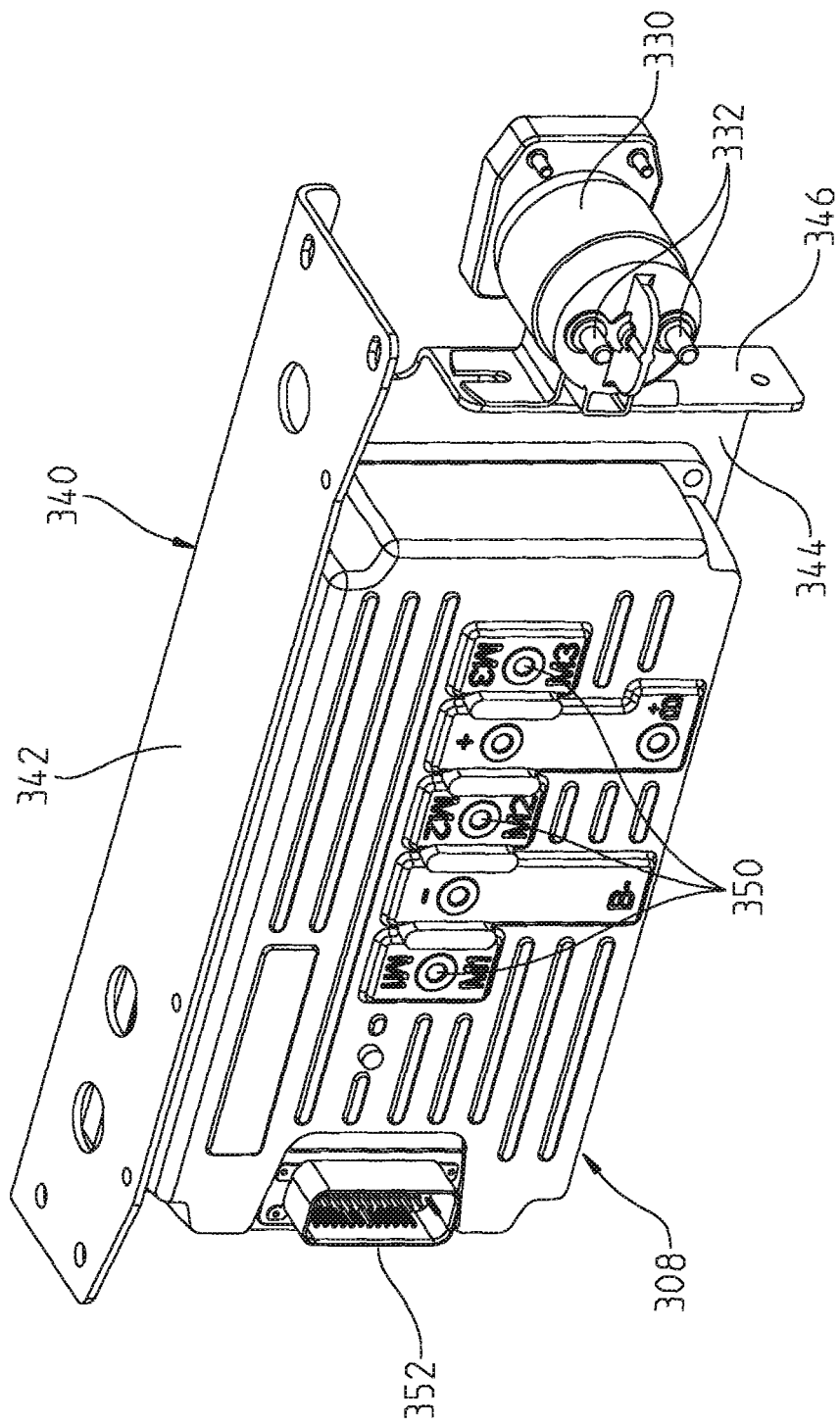
FIG. 9 illustrates a front perspective view of a motor controller of the utility vehicle of FIG. 1.

With reference now to FIGS. 7-9, controller 308 and contactor 330 are shown in greater detail. As shown best in FIG. 9, both the controller and contactor are mounted on a support member 340 having an upper flange 342, a plate portion 344 and an end flange 346. As shown, controller 308 can be mounted to plate portion 344 with contactor 330 mounted to end flange 346. Top flange 342 can be used to mount the controller and contactor intermediate the battery groups 304A, 304B into the longitudinal spacing 256 such that top flange 342 is arranged to span and attach to crossbars 280, 282 (FIG. 5A). As also shown, contactor 330 is oriented along a horizontal axis, with its contacts 332 projecting in the same direction as connections for controller 308. This allows all of the electrical connections to be made from the same plane of the controller 330, as well as allows the movements of the contactor relay to be along a horizontal plane, unaffected by road vibration. As depicted, contactor 330 is a sealed contactor. An exemplary sealed contactor is the Bear Model available from Trombetta located at N88 W13901 Main Street in Menomonee Falls, Wis. 53051.

As mentioned above, the groups of batteries 304A, 304B input to contactor 330 and to controller 308 as a source of power to drivetrain 112. In the embodiment described, controller 308 is manufactured by Sevcon, Inc, of Southborough, Mass. 01772, and is a Series G48 AC motor controller, Model G4865. As shown best in FIG. 9, controller 308 has three AC motor outputs 350 and an I/O connection port at 352. It should be appreciated from viewing FIG. 9, that all of the main electrical connections to the controller 308 and contactor 330 are centrally located, and are made to one face, that is the side face as viewed in FIG. 9. In one embodiment, a heat sink is mounted to controller 308 on the side opposite from outputs 350.

Figure 10A:
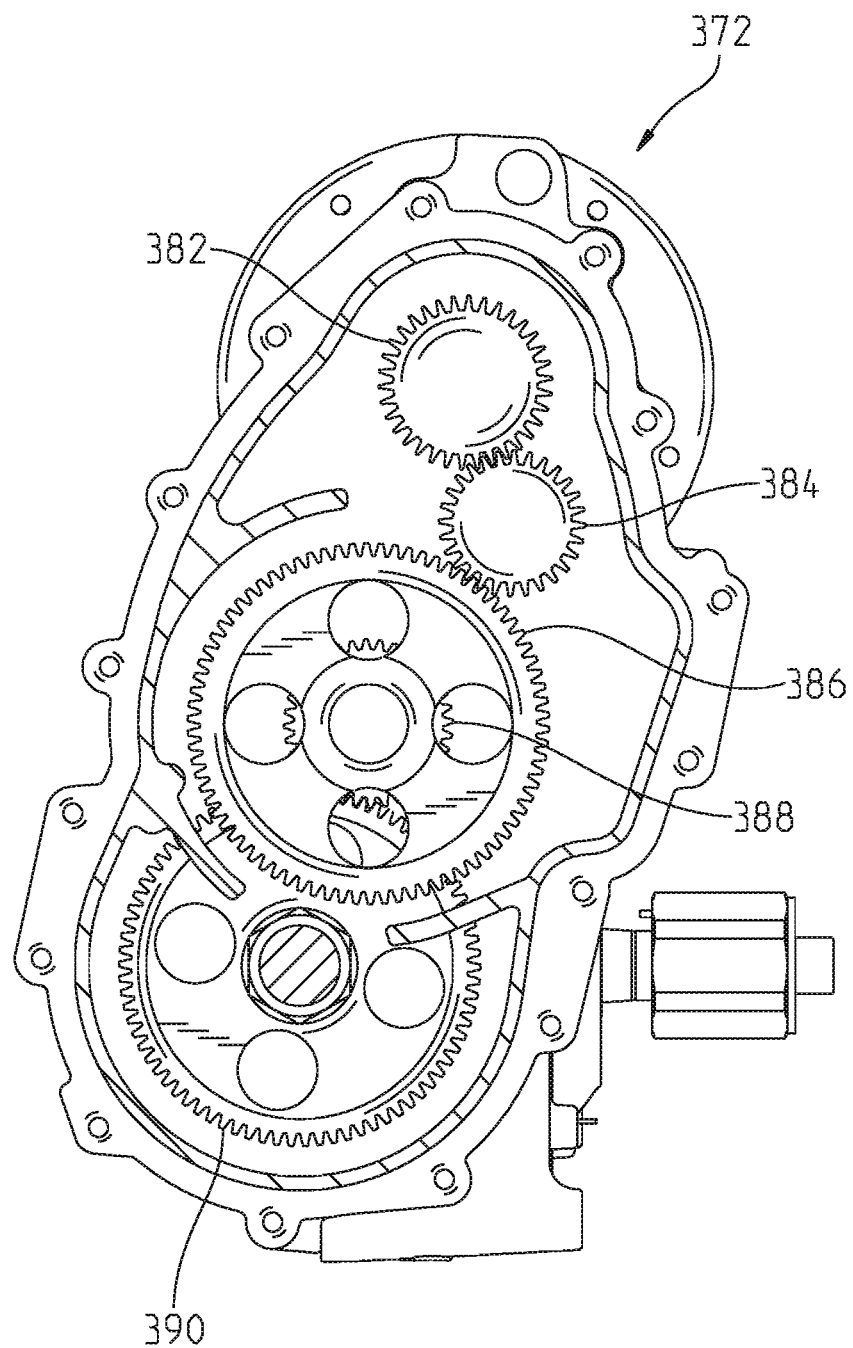
FIG. 10A illustrates a cross-sectional view taken through lines 10A-10A of FIG. 10.
Figure 11:
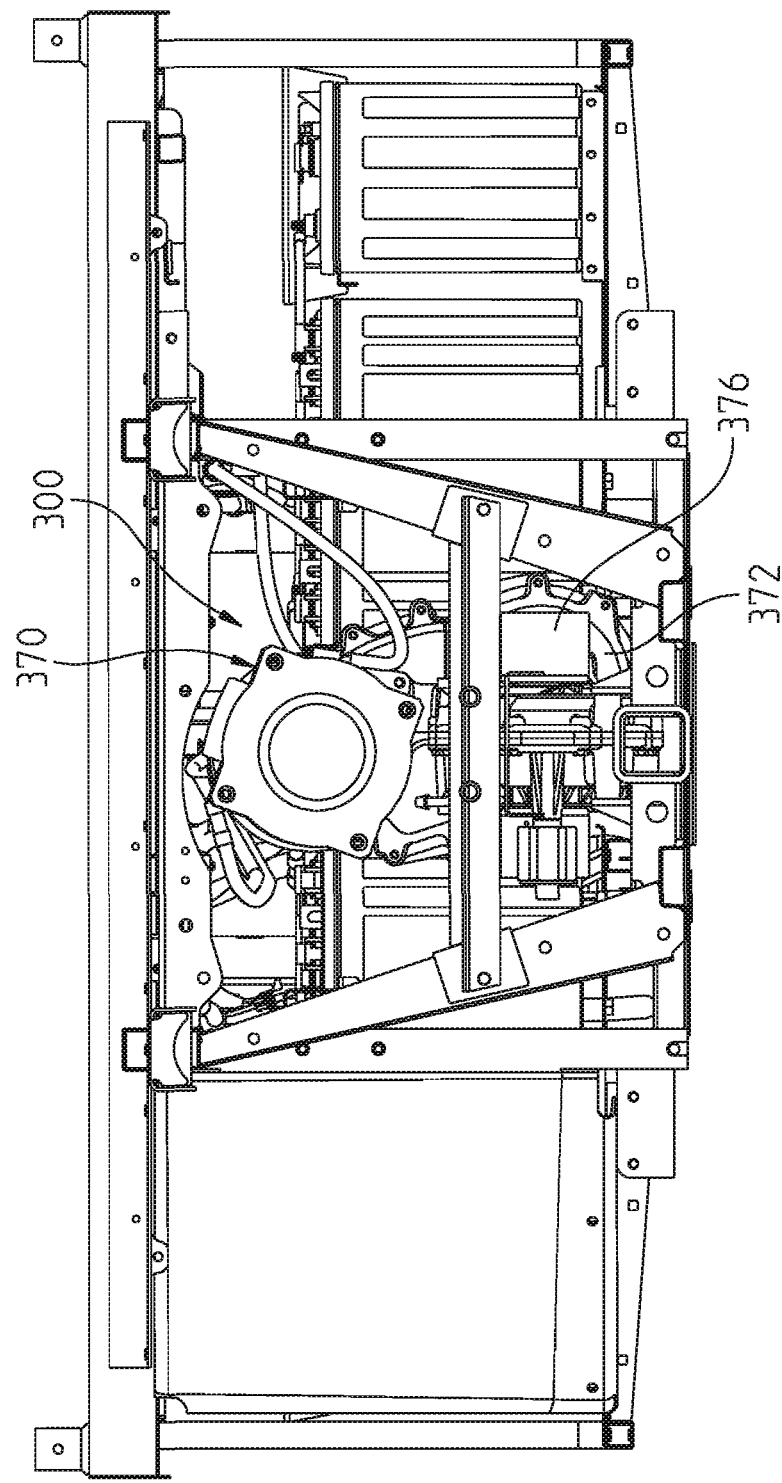
FIG. 11 illustrates a rear view of the rear frame and drivetrain.

With reference now to FIGS. 7, 10 and 11, rear drivetrain portion 300 is generally comprised of AC asynchronous motor 370 (or AC induction), a transaxle 372 which in turn drives differential output 374 of differential 376 and forward drive shaft 378 which drives prop shaft 306 through universal joint 380 (FIG. 10). In the embodiment shown, motor 370 is manufactured by ABM Greiffenberger Antriebstechnik GmbH, of Marktredwitz, Germany model number 112-200-4. As shown best in FIG. 10A, transaxle 372 comprises an input from motor 370 to drive gear 382, which in turn drives idler 384. Idler 384 drives pinion 386 which is connected to reduction gear 388 which drives pinion 390. Pinion 390 drives the differential which drives differential output 374 (FIG. 10), and drives the forward drive shaft 378 (FIG. 10).

Figure 12:
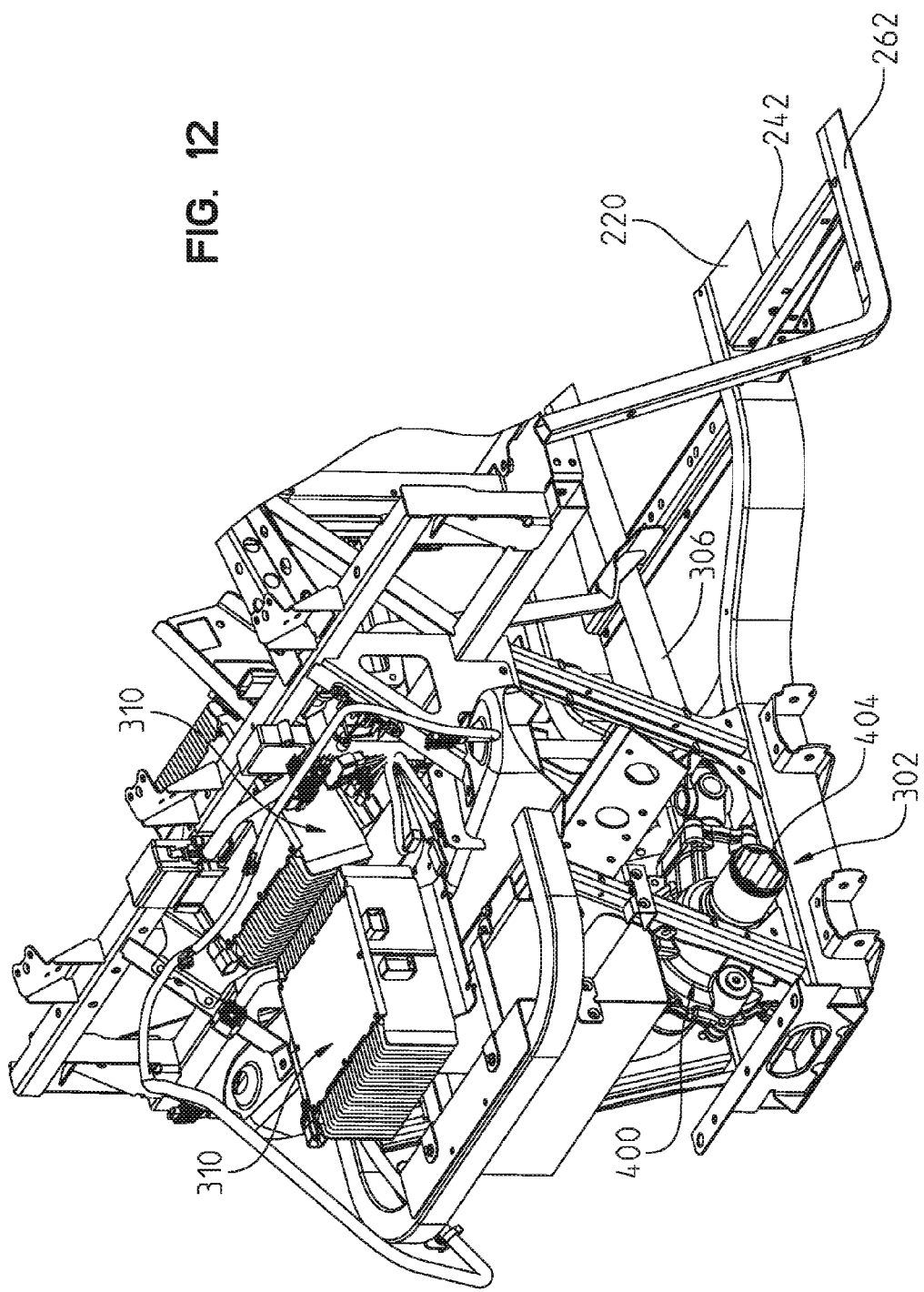
FIG. 12 illustrates a front perspective view of the front frame and front portion of the drivetrain.
Figure 13:
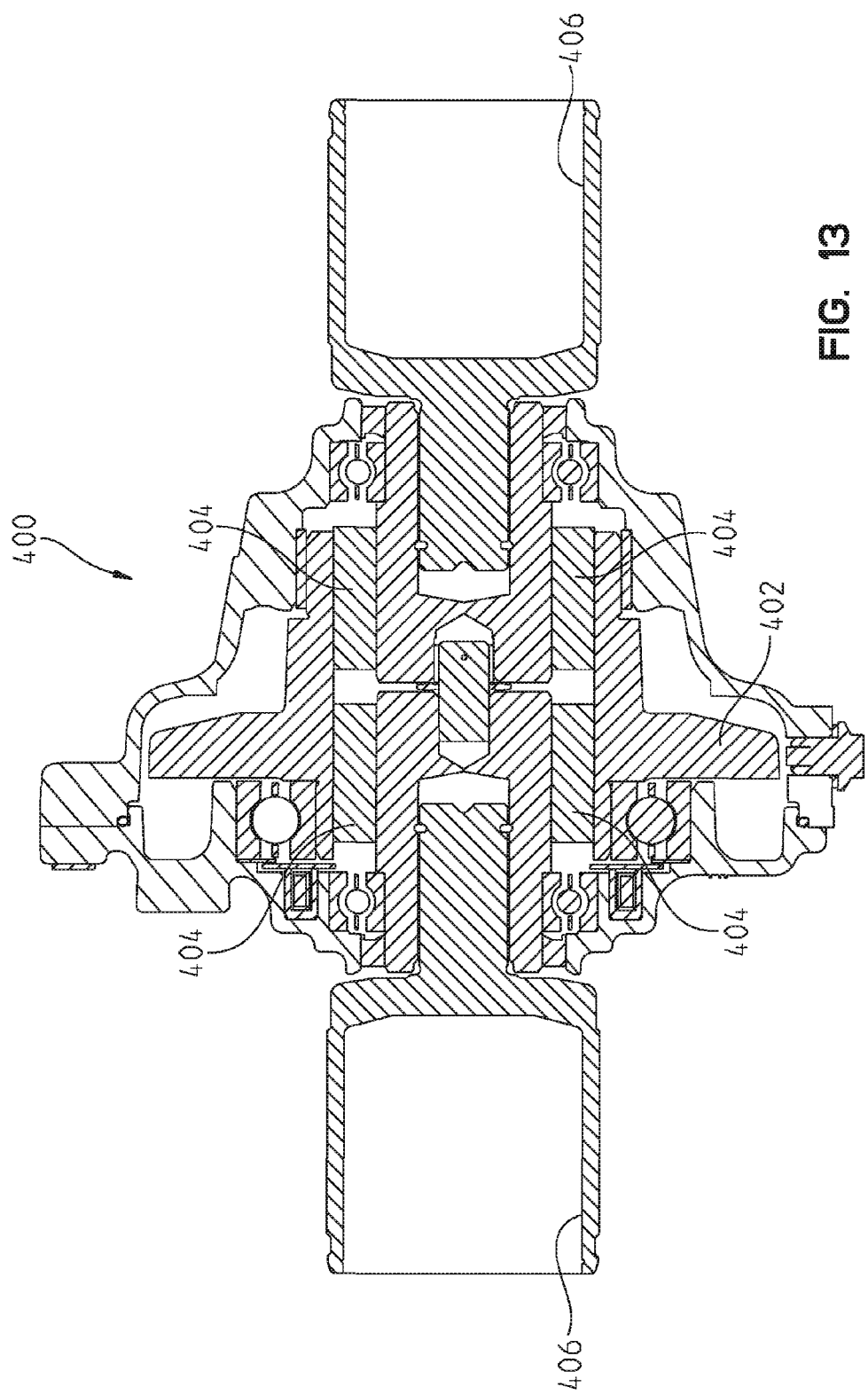
FIG. 13 illustrates a cross-sectional view of the front differential through lines 13-13 of FIG. 8.

With respect now to FIGS. 8, 12 and 13, the front drivetrain portion 302 will be described in greater detail. As shown in FIGS. 8 and 12, front drivetrain portion 302 includes a front differential 400 interconnected to prop shaft 306 by way of a universal joint 402. Differential 400 has two outputs 404 each of which connect to one of the front wheels by way of drive shafts. As shown, differential 400 is an automatic locking front differential manufactured by Hilliard Corporation of Elmira, N.Y., and has an overrunning clutch and as shown in FIG. 13, includes roller bearings 408. Differential 400 also operates under the principle described in U.S. Pat. No. 5,036,939, the subject matter of which is incorporated herein by reference. Another front drivetrain portion including an overrunning clutch is shown in U.S. Pat. No. RE38,012E, the subject matter of which is incorporated herein by reference. In one embodiment, the front drive portion is a Model No. 1332670 available from Polaris Industries Inc. of Medina Minn. In one embodiment, the front drive portion is a Model No. 1332568 which includes active descent control and is available from Polaris Industries Inc. of Medina Minn. As shown best in FIG. 13, differential 400 has a differential gear 402 which is engaged/disengaged by a plurality of roller bearings 404, during wheel slippage, which in turn drives differential outputs 406, to power the front wheels. Differential 400 is designed to engage when the wheel slippage is in the range of 10-30%.

As mentioned above, battery groups 304A, 304B, power contactor 330 and controller 308 (FIG. 7) are all positioned under seat support. The speed of the vehicle 100 is controlled by a signal pickup carried through cable 430 and interconnected to I/O connector port 352 (FIG. 9) which in turn provides AC power to motor 370 via cable 432 (FIGS. 7, 8) interconnected between three phase ports 350 and motor 370. In one embodiment, controller 308 includes doubled headed hex studs as coupling points for the cables. This allows multiple cables to be coupled to a given stud without having to uncouple a previously coupled cable from the given stud. An exemplary double headed hex stud has two threaded ends and hex portion positioned therebetween. A first threaded portion is threaded into the respective port on controller 308 with an eyelet of a first cable receiving the first threaded portion and being captured between the controller 308 and the hex portion. An eyelet of a second cable may then receive the second threaded portion and be captured between the hex portion and a nut retainer threaded onto the second threaded portion. As mentioned above, one or more chargers 310 are positioned in the front portion of the vehicle 100 and recharge battery groups 304A, 304B.

Figure 15:
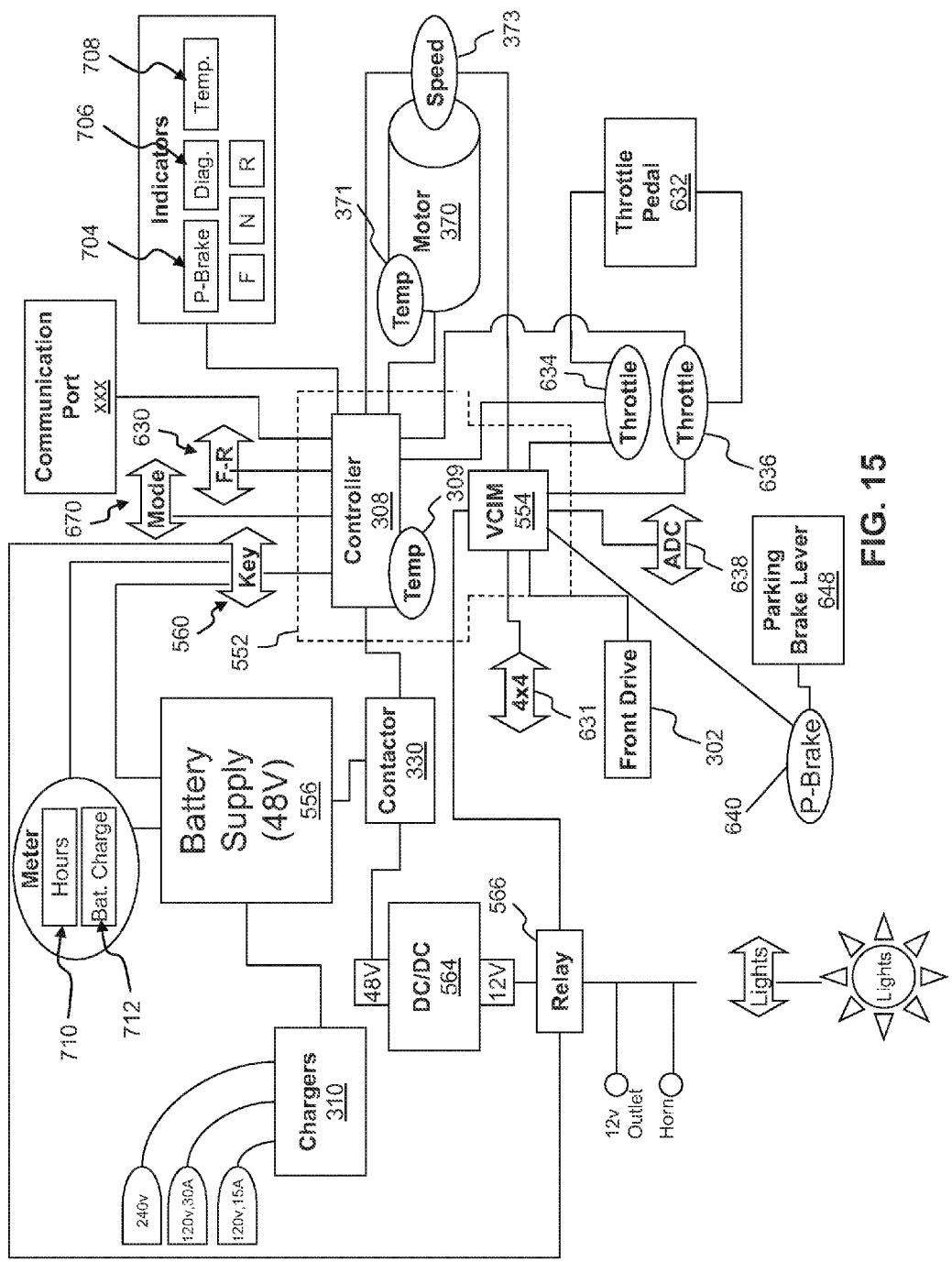
FIG. 15 illustrates an electrical system of the vehicle of FIG. 1.

Referring to FIG. 15, an exemplary electrical system 550 of vehicle 100 is represented. Vehicle 100 includes a controller 552 which controls the operation of vehicle 100. In the illustrated embodiment, controller 552 includes a first controller 308 and a second controller 554. Although vehicle 100 is shown to include multiple controllers, in one embodiment, vehicle 100 may include a single controller. Controller 308 interfaces with the components of vehicle 100 which are operating based on the charge from a battery supply 556. In the illustrated embodiment, the charge from the battery supply is 48V. Battery supply 556 includes the two banks of batteries 304A and 304B as discussed herein. Although, battery supply 556 is described having 48V charge, battery supply 556 may be based on less or more volts. Controller 554 interfaces with the components of vehicle 100 which are operating based on a lesser charger. In the illustrated embodiment, the lesser charge is about 12V charge.

In one embodiment, when a key switch 560 (also see FIG. 16) is switched "OFF", vehicle 100 is electrically dead unless chargers 310 are charging battery supply 556. When an operator turns key switch 560 to "ON", controller 308 receives power from battery supply 556 through key switch 560. This is a low power voltage that initially powers up controller 308. During this time capacitors are charged to limit in-rush current through contactor 330. Once contactor 330 is switched on, power from battery supply 556 (at 48V) is provided to controller 308 to power motor 370. Further, contactor 330 powers DC-to-DC converter 564. DC-to-DC converter 564 provides a lower voltage (12V) to power many of the components of vehicle 100. Since controller 308 powers motor 370, vehicle 100 is still drivable in a two-wheel mode even if the 12V system of vehicle 100 is malfunctioning. In one embodiment, wherein the battery charger and the DC-to-DC converter are housed together, only a single connection needs to be disconnected to disconnect the 12 V system of the vehicle (and the charger) from the battery source.

As illustrated in FIG. 15, DC-to-DC converter 564 and the illustrated components of vehicle 100 operating on the 12V system are separated by a relay 566. In one embodiment, relay 566 is a 48V coil relay. Relay 566 is coupled to key switch 560 and connects DC-to-DC converter 564 to the illustrated 12V components of vehicle 100 at key "ON" and uncouples the same at key "OFF." The 12V components of vehicle 100 include lights 567, a 12V outlet 568, horn 569, and other suitable components.

In one embodiment, at key "OFF", power is no longer provided to controller 308 which results in contactor 330 opening. Further, power is no longer provided to relay 566 thereby cutting power to the 12V components of vehicle 100. At this point vehicle 100 may be towed regardless of the position of switch 630 as long as parking brake 642 is not set.

Figure 21:
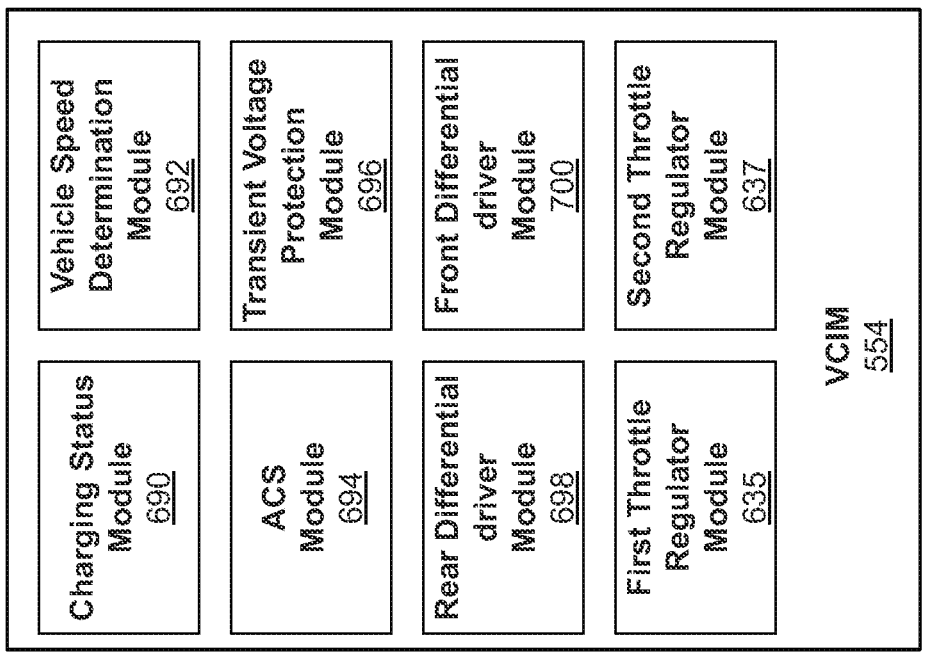
FIG. 21 is a representative view of the second controller of FIG. 15.

Another component powered by relay 566 is second controller 554. Referring to FIG. 21, second controller 554 includes a charging status module 690, a vehicle speed determination module 692, an alternator controlled switch module 694, a transient voltage protection module 696, a rear differential driver module 698, a front differential driver module 700, a first throttle regulator module 635, and a second throttle regulator module 637. Although described as separate modules the above may be part of a single software program or multiple software programs, or firmware.

Charging status module 690 drives charging indicator light 702 on dash 650 (see FIG. 16). In one embodiment, charging indicator light 702 is a multi-color LED. Charging status module 690 through indicator light 702 provides an indication of charge status and error codes. Charging status module 690 illuminates charging indicator light 702 with a first color when battery supply 556 is charging, a second color when vehicle 100 is operating in a reduced power mode (either due to elevated temperature of controller 308 or due to a low AC voltage based on the charge status of battery supply 556), and a third color to indicate chargers 310 error. In one example, the first color is green, the second color is amber, and the third color is red. In one embodiment, in addition to displaying a green color, charging status module 690 also distinguishes between the charging statuses of battery supply 556. Charging indicator light 702 is solid when charging is complete. Charging indicator light 702 exhibits short flashes when the charging of battery supply 556 is less than about 80 percent complete. Charging indicator light 702 exhibits long flashes when the charging of battery supply 556 is more than about 80 percent. In one embodiment, in addition to displaying a red color, charging status module 690 provides an indication of the charger error. Charging indicator light 702 blinks a first number of times for a first error and a second number of times for a second error. An operator may note the number of blicks and reference a Troubleshooting section of the owner's manual to determine the problem with chargers 310. A separate indicator light is provided on dash 650 for motor over temperature.

Vehicle speed determination module 692 receives pulses from speed sensor 373 and converts these to a vehicle speed. In one embodiment, speed sensor 373 is a non-contact sensor, such as a hall effect sensor positioned in the gearcase 372 to monitor the speed of one of the intermediate gears, such as gears 384, 386, and 388. The determined vehicle speed is used by other portions of controller 552 to control the operation of vehicle 100.

Alternator controlled switch module 694 provides an output signal when vehicle 100 is moving. The determination of when vehicle 100 is moving is based on the speed determination of vehicle speed determination module 692. The signal provided by alternator controlled switch module 694 is used by various components of vehicle 100. For example, the signal from alternator controlled switch module 694 controls the counting of hour meter 710.

Transient voltage protection module 696 protects the indicator lamps of dash 650 from transient voltage spikes. The indicator lights of dash 650 include charging indicator light 702, a parking brake indicator light 704, a diagnostics display 706, an over temperature indicator light 708, an hour meter 710, and a battery charge indicator 712. An exemplary dash 650 is shown in FIG. 16. In one embodiment, transient voltage protection module 696 incorporates transient voltage snubber diodes across the indicator panel lamp circuits to protect them from voltage spikes.

Rear differential driver module 698 operates to control when rear differential 376 may be locked and unlocked. In one embodiment, rear differential driver module 698 provides a pulse width modulated signal to reduce current draw and heat in rear differential 376. The engagement ("locking") of rear differential 376 and disengagement ("unlocking") is permitted only when the vehicle speed determined by vehicle speed determination module 692 is below a preset speed. In one embodiment, the preset speed is 20 miles per hour. In one embodiment, the preset speed is 15 miles per hour.

Front differential driver module 700 operates to control when front drive 302 is active. The engagement of front drive 302 and disengagement of front drive 302 is permitted only when the vehicle speed determined by vehicle speed determination module 692 is below a preset speed. In one embodiment, the preset speed is 20 miles per hour. In one embodiment, the preset speed is 15 miles per hour.

First throttle regulator module 635 and second throttle regulator module 637 provide power to separate sensors 634 and 636, respectively. The operation of sensors 634 and 636 is explained herein.

Returning to FIG. 15, controller 552 controls the operation of motor 370, rear drive 300, and front drive 302. A direction of operation of motor 370 is selected by the operator through a switch 630 (also shown in FIG. 16A). Switch 630 has three settings: forward, neutral, and reverse. As illustrated in FIG. 15, indicator lamps ("F", "N", and "R") are provided on dash 650 and the appropriate one illuminates based on the position of switch 630. In one embodiment, controller 308 does not initiate power to motor 370 unless switch 630 is initially set in neutral. Thereafter, switch 630 may be moved to either forward or reverse. With switch 630 set in one of forward or reverse, controller 552 determines a speed of motor 370, and hence of vehicle 100, based on the position of a foot throttle pedal 632 (also shown in FIG. 16) and based on one or more settings of vehicle 100.

A position of throttle pedal 632 is monitored by a first sensor 634 and a second sensor 636. Each of sensors may be non-contact sensors, such as hall effect type sensors. Other exemplary sensors include potentiometers. By having multiple sensors, controller 552 is able to detect a potential failure situation with one of the sensors. In one embodiment, throttle pedal 632 and sensors 634 and 636 are provided as part of Model No. MT 6000 pedal assembly available from Kongsberg located at 300 South Cochran in Willis, Tex. 77378.

In one embodiment, each of sensors 634 and 636 output a voltage based on the position of throttle pedal 632. In one embodiment, the voltage output by first sensor 634 increases as throttle pedal 632 is depressed and the voltage output by second sensor 636 decreases as throttle pedal 632 is depressed. In one embodiment, the voltage output of the first sensor 634 and the second sensor 636 should both increase with pedal depression, but at different rates. In the following discussion a ratio of the voltage of sensor 634 and the voltage of sensor 636 should be generally constant regardless of pedal position. In one embodiment, the ratio of the voltage of sensor 634 to the voltage of sensor 636 is about 2. Controller 552 distinguishes between a safety mode of operation and a normal mode of operation based on the voltage readings of first sensor 634 and second sensor 636. In a safety mode of operation, a speed of vehicle 100 is limited so that an operator may still move vehicle 100. In one embodiment, the speed of vehicle 100 is limited to about 12 miles per hour in the safety mode of operation.

In one embodiment, second controller 554 includes a first regulated voltage supply 635 (see FIG. 21) which provides power to first sensor 634 and a second regulated voltage supply 637 (see FIG. 21) which provides power to second sensor 636. First regulated voltage supply 635 and second regulated voltage supply 637 are isolated from each other and from the remaining circuitry of second controller 554. By using redundant regulated voltage supplies, one of first regulated voltage supply 635 and second regulated voltage supply 637 may fail and vehicle 100 will still be operable in the safety mode.

An exemplary representation of the selection of a safety mode of operation and normal mode of operation based on the voltage of first sensor 634 and second sensor 636 is shown in Table 1.

TABLE 1

| Sensor 634 "input 1" (1.1-4.2 V) | Sensor 636 "input 2" (0.55-2.1 V) | error | drive mode | control voltage |
|---|---|---|---|---|
| out of range | out of range | yes | none | none |
| <0.86 | in range | yes | safety mode | 2 * input2 |
| >4.79 | in range | yes | safety mode | 2 * input2 |
| in range | <0.36 | yes | safety mode | input1 |
| in range | >2.48 | yes | safety mode | input1 |
| in range, input1 > 2.05 * input2 | | yes | safety mode | input1 |
| in range, input1 < 1.95 * input2 | | yes | safety mode | 2 * input2 |
| in range, on ratio | | no | normal mode | min(input1, 2 * input2) |

In addition to the voltage values provided by first sensor 634 and second sensor 636, controller 552 checks a status of a sensor 640 associated with the parking brake 642 (see FIG. 10). As shown in FIG. 10, a disk 644 of parking brake 642 is coupled to forward drive shaft 378 while a caliper 646 of parking brake 642 is coupled to gear box 372. Caliper 646 engages disk 644 when a parking brake input lever 648 (see FIG. 16) provided in a dash 650 of operator area 130 of vehicle 100 is pulled in direction 649. Parking brake input lever is spaced apart from throttle pedal 632 and brake pedal 633. Sensor 640 monitors a position of parking brake input lever 648. In one embodiment, sensor 640 is a micro-switch. Other exemplary sensors include non-contact hall effect sensors, capacitive type sensors, inductive type sensors, and magnetic micro switch/magnetic reed sensors. As illustrated parking brake 642 is a mechanically actuated brake having electrical sensors monitoring the status of parking brake 642. In one embodiment, parking brake 642 may be electronically controlled. Brake pedal 633 is operatively coupled to disk brakes associated with one or more of the ground engaging members 102. In one embodiment, the engine braking discussed herein is independent of the operator actuating brake pedal 633. In one embodiment, the amount of engine braking for each drive mode may be tailored to whether the operator is actuating brake pedal 633 and, in one embodiment, to the degree that the operator is actuating brake pedal 633. In one embodiment, disk brakes are provided for each ground engaging member.

Figure 20:
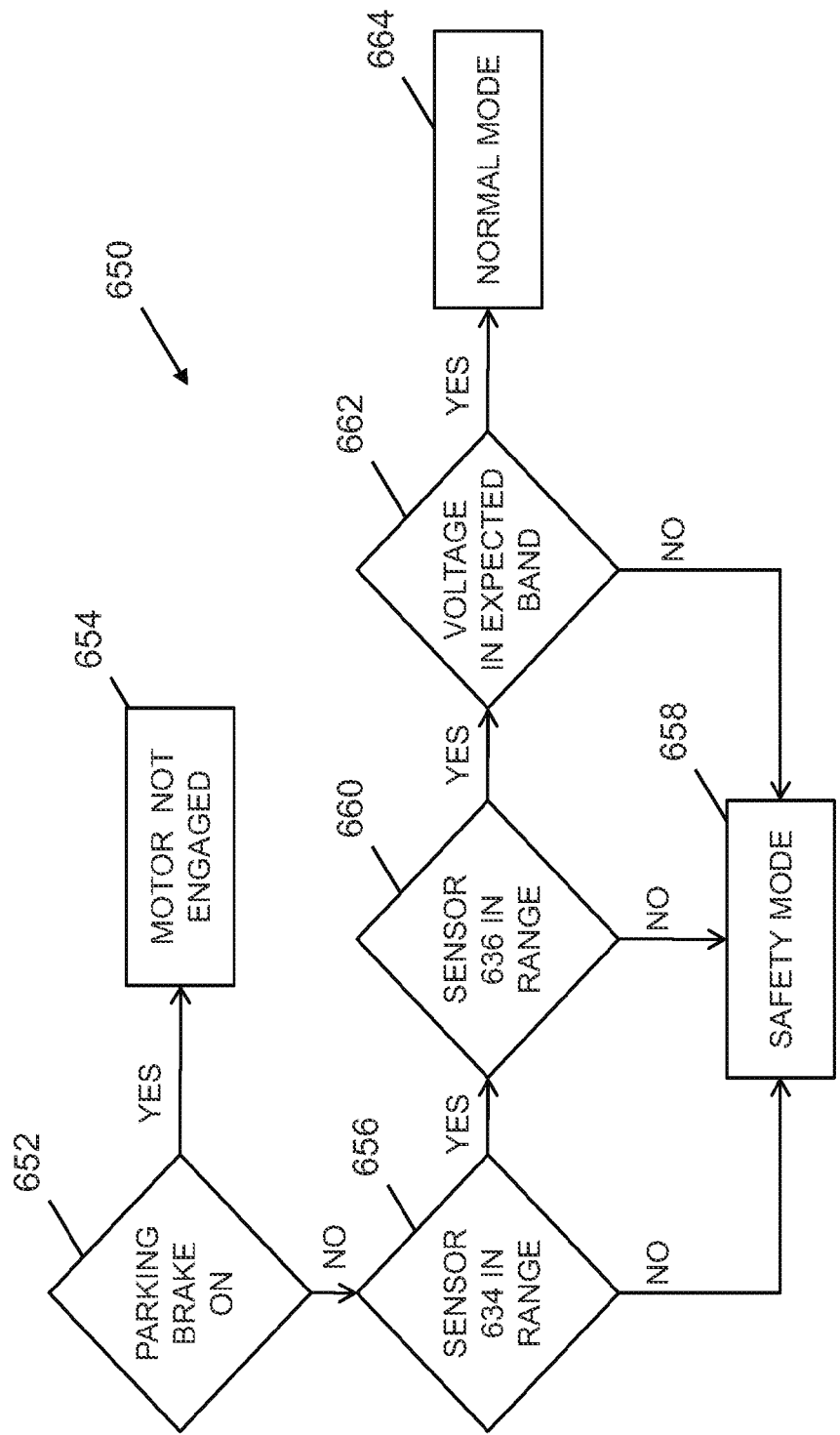
FIG. 20 illustrates a processing sequence for controlling a speed of the vehicle of FIG. 1.

Referring to FIG. 20, a processing sequence 650 for controlling motor 370 based on the position of throttle pedal 632 is shown. The status of parking brake 642 is checked, as represented by block 652. If sensor 640 indicates that parking brake 642 is set then motor 370 is not engaged, as represented by block 654. If sensor 640 indicates that parking brake 642 is not set then the operation of motor 370 is based on the position of throttle pedal 632. Controller 552 checks to see if first sensor 634 is operating in range, as represented by block 656. If first sensor 634 is outside of an expected voltage range, safety mode is entered, as represented by block 658. Further, the control voltage used by controller 552 is set to twice the value of the voltage of second sensor 636. If first sensor 634 is in range, controller 552 checks to see if second sensor 636 is operating in range, as represented by block 660. If second sensor 636 is outside of an expected voltage range, safety mode is entered, as represented by block 658. Further, the control voltage used by controller 552 is set to the value of the voltage of first sensor 634. If both first sensor 634 and second sensor 636 are in range, controller 552 checks to see if the relative values of first sensor 634 and second sensor 636 are in an expected band, as represented by block 662. If first sensor 634 and second sensor 636 are outside of the expected band the safety mode is entered, as represented by block 658. Further, the control voltage used by controller 552 is set to one of twice the value of the voltage of second sensor 636 and the voltage of 634 depending on the values of first sensor 634 and second sensor 636. If first sensor 634 is in the expected band, the normal mode is entered, as represented by block 664.

In the normal mode, controller 552 controls motor 370 based on the value of the control voltage. An exemplary control of the motor 370 is shown in Table II

TABLE II

| control voltage | action |
|---|---|
| <1.54 V | off, FS1 open |
| 1.54 to 3.65 V | FS1 closed, torque proportional to curved response between endpoints |
| >3.65 V | FS1 closed, max torque |

If the control voltage is less than a first threshold value, controller 552 does not operate motor 370 to move vehicle 100. If the control voltage is in at or above the first threshold value and below a second value, controller 552 sets an indicator ("FS1") of foot pedal position to closed (a virtual indicator of foot pedal depression) and operates motor 370 according to a preset response curve. If the control voltage is above the second value, controller 552 sets an indicator of foot pedal position to closed (a virtual indicator of foot pedal depression) and operates motor 370 at a maximum torque of the preset response curve.

In one embodiment, controller 552 may include a plurality of preset response curves. In one embodiment, controller 552 may include up to three preset response curves which are selectable through a mode input switch 670 (see FIG. 15 and FIG. 16A). Mode input switch 670 includes three settings, a first corresponding to a first preset response curve 671 (see FIG. 22A), a second corresponding to a second preset response curve 672 (see FIG. 22A), and a third corresponding to a third preset response curve 673 (see FIG. 22A). If it is desired to only have a single preset response curve selected by the user, all three settings may have the same associated response curve.

In one embodiment, the three mode settings are a high mode (increased speed), an efficiency mode (increased range), and a low mode (increased towing). Exemplary response curves also include novice mode (limits top speed) and a company mode (defined by purchaser of vehicle for all company vehicles). As discussed herein with reference to FIGS. 33 and 34, various preset response curves may be loaded into the memory of controller 552 and set to correspond to a setting of mode input switch 670.

In one embodiment, the mode settings vary an upper vehicle speed limit, an upper motor output torque limit, the upper motor torque limit as a function of rpm, and an amount of regenerative braking. As explained herein, in one embodiment, the regenerative braking varies based on the mode selected with mode switch 670. In high mode or efficiency mode, little or no regenerative braking is implemented to limit top speed. Further, little or no regenerative braking is implemented during pedal-up wherein the operator releases the throttle foot pedal. This improves the drivability of vehicle 100 by allowing vehicle 100 to coast rather than "hunting" between regenerative braking and acceleration to maintain a desired speed. In most cases it is also results in more efficient operation, and reduced motor and controller temperatures. In low mode, additional regenerative braking may be applied to provide descent control, whereby the amount of regenerative braking is modulated to prevent the vehicle from exceeding the top speed in this mode. Regenerative braking will also be higher in the pedal up position to provide a strong engine-braking feel. In one embodiment, regenerative braking is higher at the beginning of throttle pedal application and reduces therefrom. This results in the first fraction of pedal application corresponding to a transition from braking to coasting, and the remainder of pedal application applies progressively higher accelerating torque.

In one embodiment, the amount of regenerative braking in addition with being drive mode specific distinguishes between when the foot pedal is depressed and not depressed. When the foot pedal is depressed, the amount of regenerative braking is proportional to the deceleration rate of the electric motor 370. When the foot pedal is not depressed (pedal up), the amount of regenerative braking varies based on the motor torque limits of the drive mode and an rpm setpoint of motor 370. Above the rpm setpoint more braking is provided. Below the setpoint less braking is provided to allow vehicle 100 to generally coast to a stop.

The output torque of electric motor 370 is proportional to the drive current supplied to the motor 370. As such, the upper motor output torque limit specifies an upper limit of the drive current that may be applied to the electric motor 370. As explained herein, in some drive modes the upper limit is 100% of the rated drive current for the electric motor while in some drive modes the upper limit is less than 100% of the rated drive current. The drive current may be limited to increase the vehicle operation range for a charge of the battery supply 556.

In addition, to the upper motor output torque limit controller 552 may further limit the upper level of the drive current to increase vehicle performance for one or more drive modes. In one embodiment, controller 552 limits the drive current based in part on an output rpm of the electric motor 370. In one embodiment, controller 552 limits the drive current in a non-linear fashion. In one embodiment, controller 552 limits the drive current in a non-linear fashion based on an output rpm of the electric motor 370. In one example, the non-linear fashion is characterized by a plurality of discrete linear relationships each including a range of rpm values. In one example, eight discrete linear relationships are provided, each of the eight discrete linear relationships sharing an endpoint with at least one other of the eight linear relationships.

In one embodiment, controller 552 limits the upper level of the drive current of electric motor 370 as a function of output rpm of the electric motor 370 by reference to a slip curve for a given drive mode. In one embodiment, at various drive current and rpm combinations, electric motor 370 may intermittently pause during operation. The slip curve functions to avoid the intermittent pausing of the electric motor 370. The slip curve provides an angle number for electric motor 370 as a function of electric motor rpm. The angle number is a measure of the slip between the rotor and stator of electric motor 370. The adjustment of the angle number corresponds to an adjustment of the drive current of the motor. Referring to Table III, three exemplary modes are presented.

TABLE III

Figure 36:
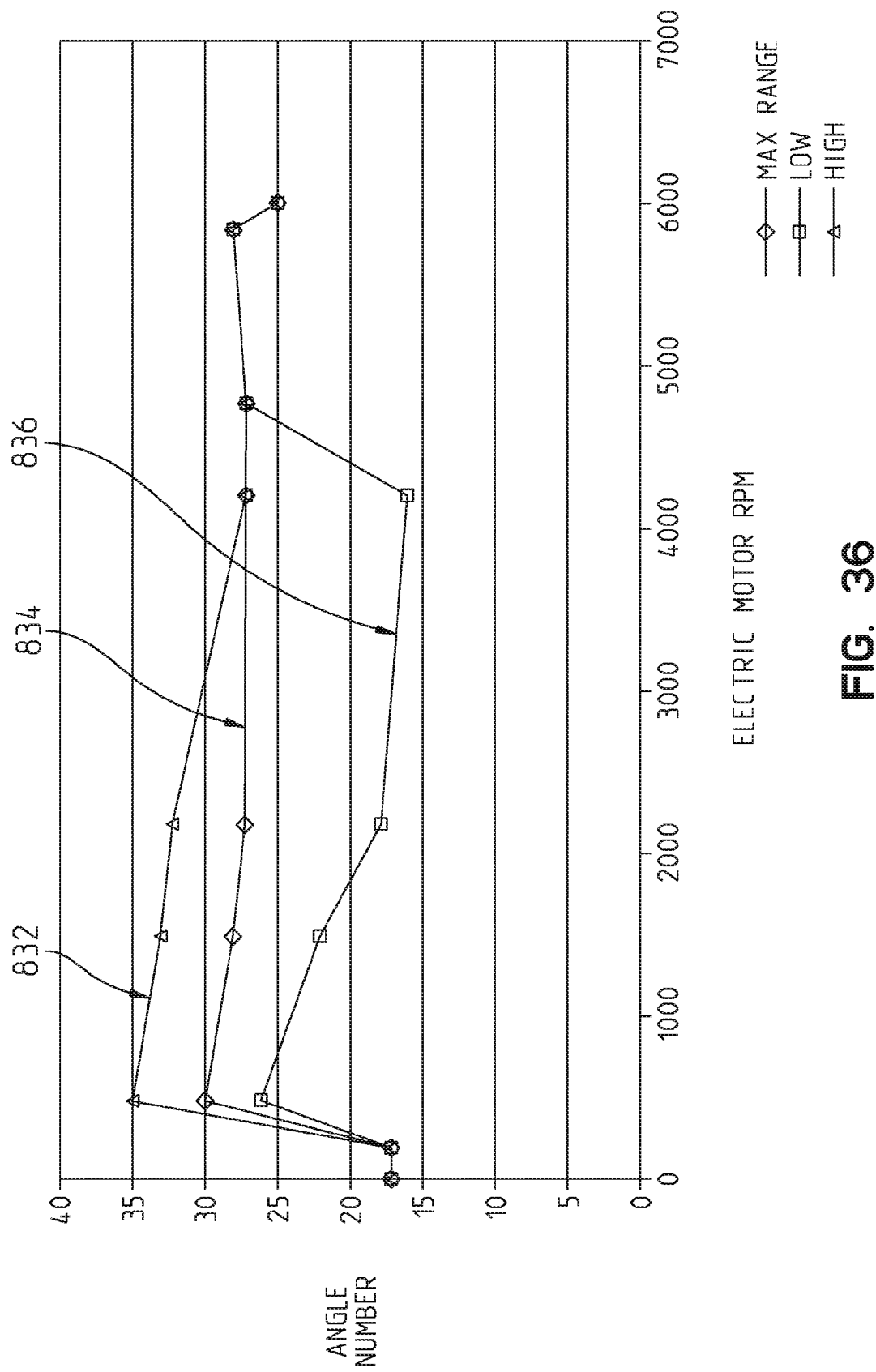
FIG. 36 illustrates exemplary slip curves for the controller of the vehicle of FIG. 1.

| Mode | Maximum Speed | Torque (% of maximum) | Regenerative Braking (% available) (foot off of pedal 632) | Slip curve (see FIG. 36) | Application |
|---|---|---|---|---|---|
| High | 25 MPH (40 km/h) | 85% | 30% | Curve 832 | Trail riding |
| Efficiency | 15 MPH (24 km/h) | 60% | 20% | Curve 834 | Whenever possible, to maximum driving range of battery pack |
| Low | 12 MPH (19 km/h) | 100% | 60% | Curve 836 | Towing, hauling loads, driving on steep hills or aggressive terrain |

In the Efficiency mode, the torque output from the electric motor 370 is more limited than in the High mode. This results in a decrease of heat generated by electric motor 370 and an increase in the range of electric vehicle 100. In one embodiment, the range of electric vehicle 100 in the Efficiency mode is about twice the range of the electric vehicle 100 in the High mode. Exemplary slip curves for each of the High mode, the Efficiency mode, and the Low mode are provided in FIG. 36 and referenced in Table III.

Figure 37:
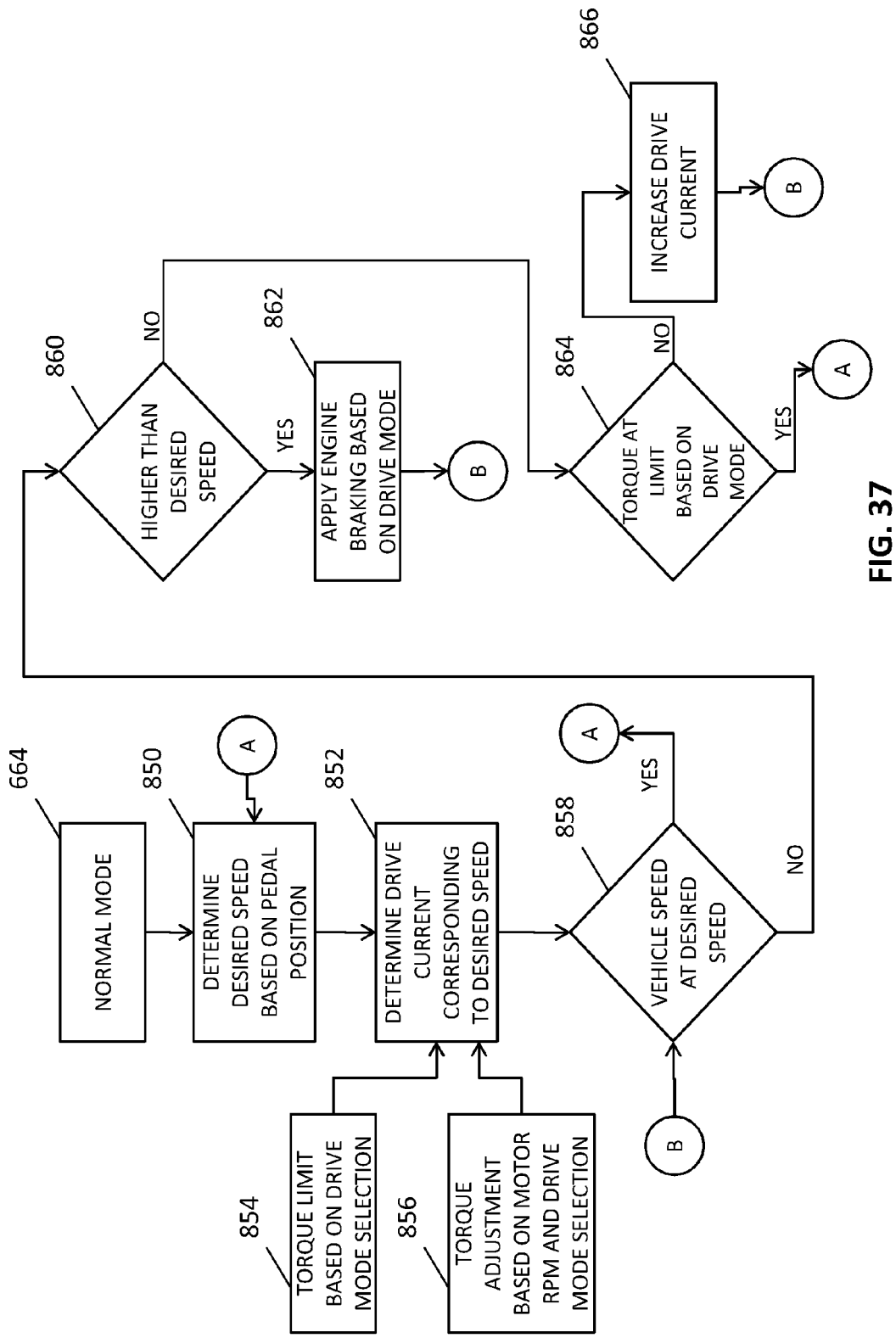
FIG. 37 illustrates a processing sequence for the controller of the vehicle of FIG. 1.

Referring to FIG. 37, an exemplary processing sequence for controller 552 is shown. Controller 552 determines that vehicle 100 is operating in a normal mode as opposed to a safety mode, as represented by block 664. Controller 552 based on the voltage inputs by first sensor 634 and second sensor 636 determines the desired speed of vehicle 100 as described herein, as represented by block 850. Controller 552 then determines the drive current to supply to the electric motor 370 to achieve the desired speed, as represented by block 852. Based on the drive mode selected, the responsiveness of vehicle 100 to achieve the desired speed may vary. As mentioned herein, two limitations on the drive current for a given drive mode include the upper torque limit for electric motor 370, as represented by block 854, and the upper torque limit adjustment based on motor rpm, as represented by block 856.

Controller 552 monitors an indication of the speed of vehicle 100 to determine if it is operating at the desired speed, as represented by block 858. If so, control is returned to block 850. If not, controller determines if the vehicle speed is higher than the desired speed, as represented by block 860. One example of wherein the vehicle speed may be higher than the desired speed is when the vehicle is traveling on a downward slope. If the vehicle speed is higher than the desired speed, engine braking is applied by controller 552 to slow the vehicle, as represented by block 862. Control is then returned to block 858.

If the vehicle speed is lower than the desired speed, controller 552 determines if the motor output torque is at the upper limit for the current drive mode, as represented by block 864. One example of wherein the vehicle speed may be lower than the desired speed is when the vehicle is traveling on an upward slope. If the upper torque limit has not been reached, controller 552 may increase the drive current for electric motor 370, as represented by block 866.

In one embodiment, at various motor drive current and motor output rpm combinations, electric motor 370 may intermittently pause during operation. In one embodiment, controller 552 in order to achieve a desired speed may operate to increase the drive current of electric motor 370 until the desired speed is reached. The controller 552 may have an upper limit on the drive current which is drive mode specific. In one example, controller 552 may monitor electric motor 370 to determine if the motor pauses during operation. If not, controller 552 will continue to increase the drive current for electric motor 370 until the desired speed is reached or an upper limit is reached. If a motor pause is detected, controller 552 may alter an angle number of motor 370 which is a measure of the slip between the rotor and stator of electric motor 370. The adjustment of the angle number corresponds to an adjustment of the drive current of the motor.

Figure 16A:
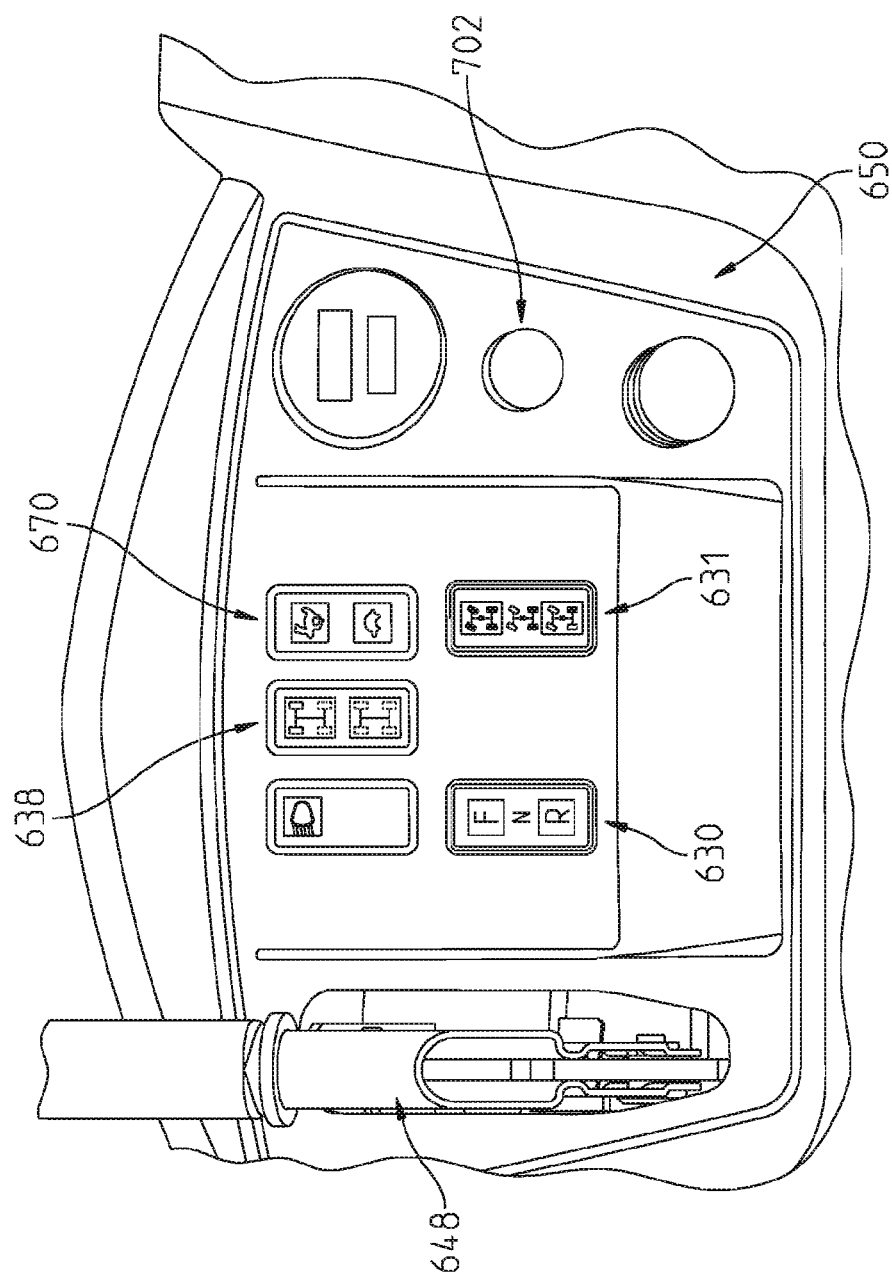
FIG. 16A is a detail view of a portion of FIG. 16.
Figure 22:
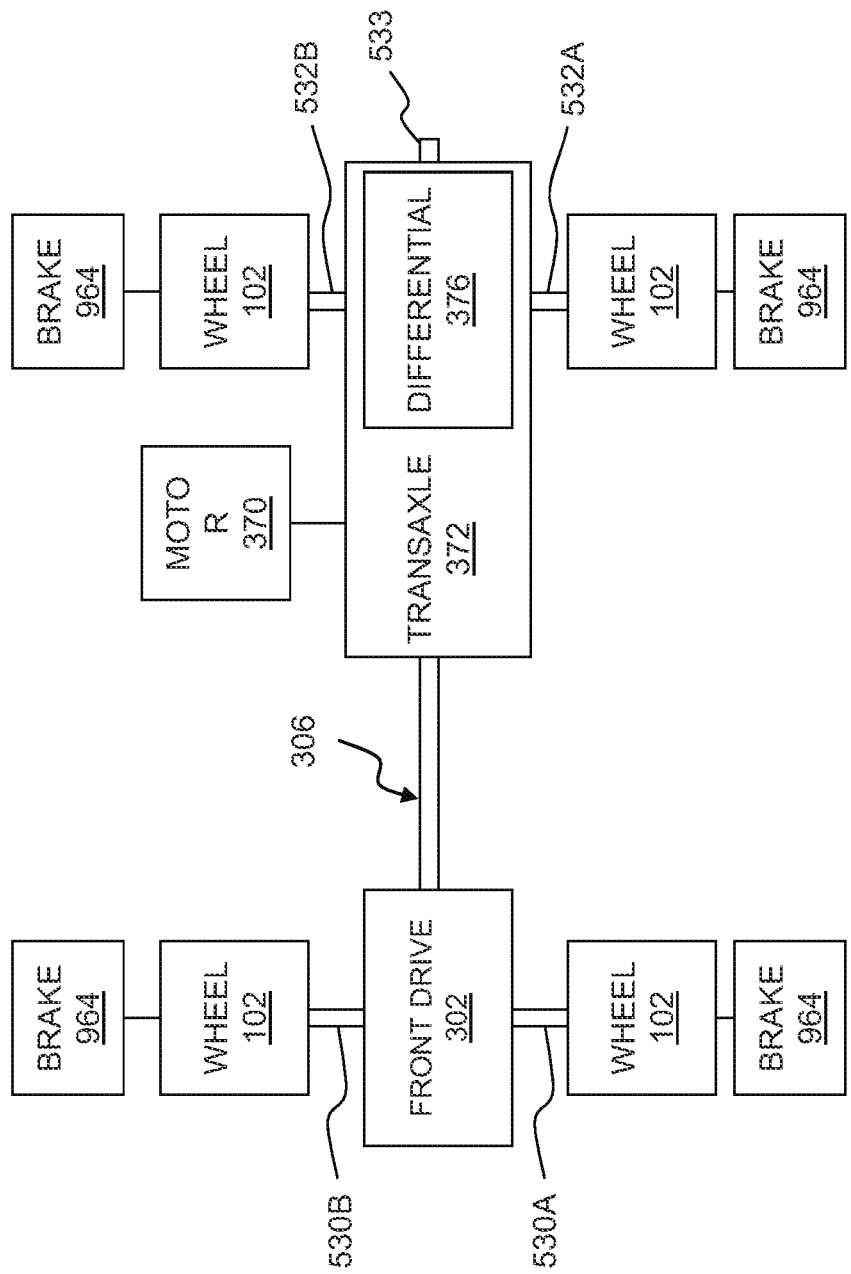
FIG. 22 is a representative view of the drivetrain of the vehicle of FIG. 1.
Figure 22A:
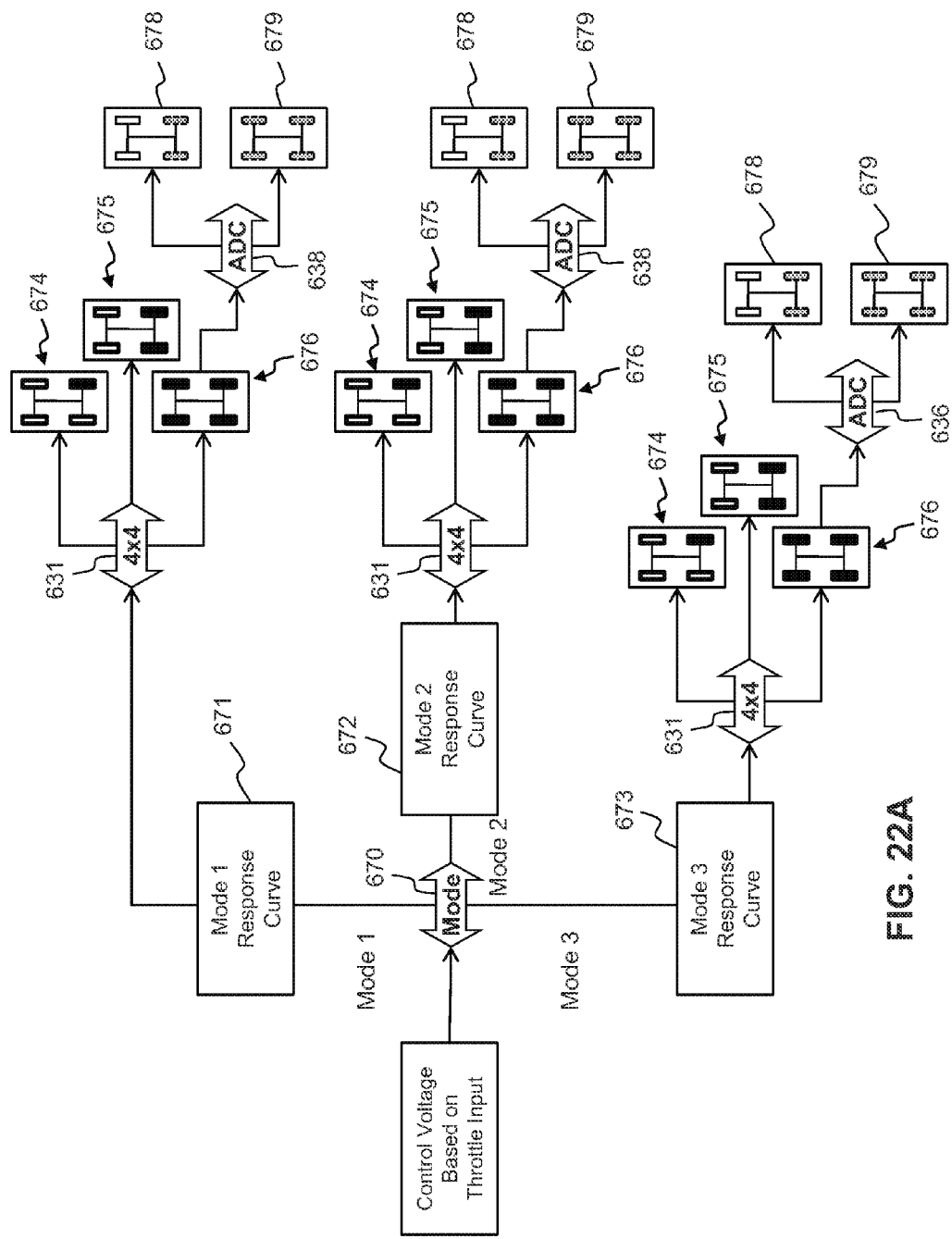
FIG. 22A is a representation of a plurality of potential modes of the vehicle.

In addition to switch 630, vehicle 100 includes a drive configuration switch 631 (see FIGS. 15, 16A, and 22A). Switch 631 permits an operator to select between a first drive configuration mode, a second drive configuration mode, and a third drive configuration mode. Each of the drive configuration modes distribute the torque being provided by motor 370 to one or more of ground engaging members 102. The amount of torque is not adjusted, just the distribution to the various ground engaging members 102. In an exemplary first drive configuration mode 674, only one ground engaging members 102 is coupled to motor 370, one of the rear wheels through differential 376 (differential 376 is unlocked). In an exemplary second drive configuration mode 675, only two ground engaging members 102 are coupled to motor 370, the two rear wheels through differential 376 (differential 376 is locked). In an exemplary third drive configuration mode, all four ground engaging member 102 are coupled to motor 370, the two rear wheels through differential 376 and the two front wheels through front drive 302. In one embodiment of the third drive configuration mode, front drive 302 couples both of ground engaging members 102 to motor 370 all of the time. In one embodiment of the third drive configuration mode, front drive 302 couples at least one the ground engaging members 102 of the front axle to motor 370 when at least one of ground engaging members 102 of the rear axle loses traction. In one example, torque is provided to the ground engaging members 102 having the less resistance relative to the ground. In this embodiment, front drive 302 includes overrunning clutches. An exemplary front drive unit including overrunning clutches is Model No. 1332670 available from Polaris Industries Inc of Medina, Minn.

Figures 22B, 22C:
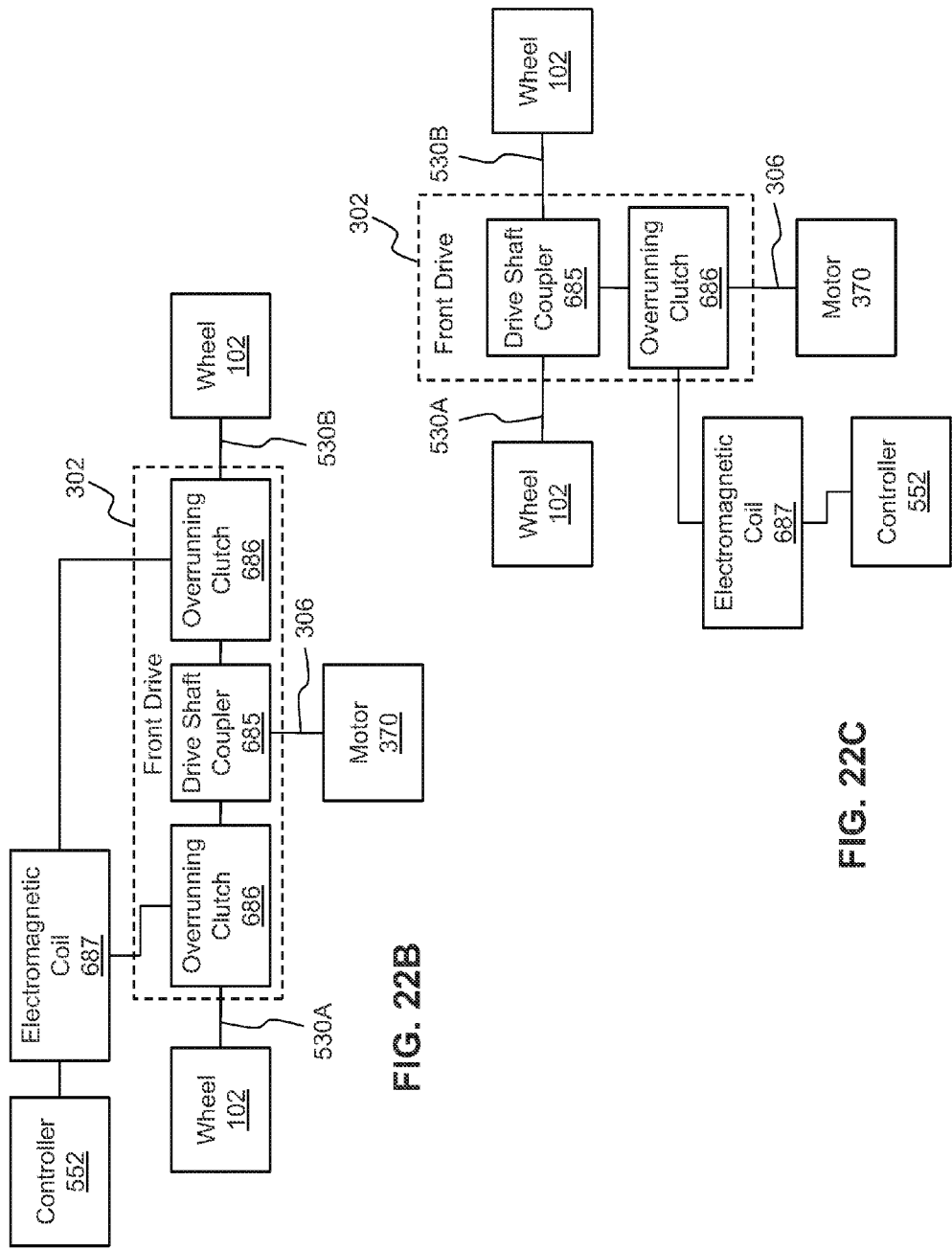
FIG. 22B is a representation of a first exemplary front drive.
FIG. 22C is a representation of a second exemplary front drive.

Referring to FIG. 22B, one exemplary arrangement of front drive 302 is shown. A coupler 685 couples prop shaft 306 to front drive 302. Overrunning clutches 686 are provided which couple output shaft 530A and output shaft 530B to prop shaft 306, respectively. Controller 552 activates overrunning clutches 686 (for mode 676) by way of electromagnetic coils 687. Referring to FIG. 22C, another exemplary arrangement of front drive 302 is shown wherein a single overrunning clutch 686 is provided instead of two.

Returning to FIG. 22, transaxle 372 contains rear differential 376 and is coupled to front drive 302 through prop shaft 306. Drive shaft 306, like other drive shafts mentioned herein, may include multiple components and are not limited to straight shafts. Front drive 302 includes two output shafts 530A and 530B, each coupling a respective ground engaging member 102 of the front axle to front drive 302. Rear differential 376 includes two output shafts 532A and 532B, each coupling a respective ground engaging member 102 of the rear axle to differential 376. In embodiment, differential 376 also includes an output shaft 533. In one embodiment, output shaft 533 may couple motor 370 to a third differential, either as part of a modular sub-section, such as disclosed in U.S. patent application Ser. No. 12/092,153, titled VEHICLE, filed Aug. 30, 2008, the disclosure of which is expressly incorporated by reference herein, or as part of a pull behind unit, such as disclosed in U.S. patent application Ser. No. 12/189,995, titled PULL BEHIND UNIT FOR USE WITH A SELF-PROPELLED VEHICLE, filed Aug. 12, 2008, the disclosure of which is expressly incorporated by reference herein.

Returning to FIG. 22A, in addition to the different drive configuration modes selectable through mode switch 631, in one embodiment various braking configuration modes which rely on front drive 302 may be selectable through a switch 638 on dash 650 (see FIGS. 15, 16A, and 22A). In one embodiment, front drive 302 is Model No. 1332568 available from Polaris Industries Inc. of Medina, Minn. which includes active descent control ("ADC"). ADC provides on-demand torque transfer to the front wheels through ground engaging members 102 (as described in the third drive configuration mode) and is also capable of providing motor braking torque. An exemplary front drive which may accommodate the functionality of the third drive configuration mode and motor braking torque is disclosed in U.S. Pat. No. RE38,012E, the disclosure of which is expressly incorporated herein by reference. As vehicle 100 descends a grade, vehicle 100 may want to travel faster than the speed set by the torque supplied by motor 370. As such, the output shafts 530 will rotate faster than prop shaft 306. When this happens, front drive 302 couples output shafts 530 to prop shaft 306. On an internal combustion engine, this coupling results in the resistance of the engine providing braking power to the front axle to assist in slowing vehicle 100. In the present embodiment, the driving voltage supplied by controller 308 to motor 370 is changed to increase resistance to the rotation of prop shaft 306. This increased resistance provides motor braking. In one embodiment, vehicle 100 includes regenerative braking whereby motor 370 functions as a generator to charge battery supply 556. In this situation, during descents the motor 370 applies a braking torque which opposes the motor rotational direction. The braking torque both provides motor braking through the ground engaging members 102 of front drive 302 and charges battery supply 556.

In one embodiment, ADC is selectable by the user through switch 638 (see FIGS. 15, 16A, and 22A) on dash 650. ADC switch 638 includes two settings. A first setting 678 corresponds to the engine braking portion of front drive 302 being disabled. In this embodiment, front drive 302 transfers torque to one or both of ground engaging members 102 of the front axle when the ground engaging members 102 of the rear axle loses traction, but does not provide engine braking torque. A second setting 679 corresponds to the engine braking portion of front drive 302 being enabled. In this embodiment, front drive 302 transfers torque to one or both of ground engaging members 102 of the front axle when the ground engaging members 102 of the rear axle loses traction, and provides engine braking torque when vehicle 100 is descending a slope. In one embodiment, controller 552 allows mode 679 to be selected when the speed of vehicle 100 is less than a preset speed. An exemplary speed is about 15 mph.

Regarding rear differential 376, in one embodiment rear differential 376 is a locked differential wherein power is provided to both of the wheels of the rear axle through output shafts 532A and 532B. In one embodiment, rear differential 376 is a lockable/unlockable differential relative to output shafts 532A and 532B. When rear differential 376 is in a locked configuration power is provided to both wheels of the rear axle through output shafts 532A and 532A. When rear differential 376 is in an unlocked configuration, power is provided to one of the wheels of the rear axle, such as the wheel having the less resistance relative to the ground, through output shafts 532A and 532B. In one embodiment, rear differential 376 is a lockable/unlockable differential relative to output shaft 533. In a first configuration, rear differential 376 is locked relative to output shaft 533 (power is not provided to output shaft 533). In a second configuration, rear differential 376 is unlocked relative to output shaft 533 (power is not provided to output shaft 533). In one embodiment, rear differential 376 does not include output shaft 533. In this case, rear differential 376 may be either a locked differential relative to output shafts 532A and 532B or a lockable/unlockable differential relative to output shafts 532A and 532B.

By having motor 370 selectively power rear differential 376 and front drive 302, the towing capability of vehicle 100 is enhanced relative to electric vehicles having a separate motor for the front axle and the rear axle. By having motor 370 selectively power both differential 376 and front drive 302, all of the torque of motor 370 may be directed to rear differential 376 unless differential 376 is sensed to be losing traction. This is advantageous in towing situations because often the rear axle has better contact with the ground than the front axle when towing. As such, by having all of the power of motor 370 available to differential 376 the towing capability of vehicle 100 is increased.

As mentioned herein, in one embodiment, vehicle 100 includes regenerative braking. During regenerative braking, the motor 370 applies a braking torque which opposes the motor rotational direction. The torque produced by this reversal slows vehicle 100.

In one embodiment, the regenerative braking varies based on the mode switch 670, In high mode or efficiency mode, little or no regenerative braking is implemented to limit top speed. Further, little or no regenerative braking is implemented during pedal-up wherein the operator releases the throttle foot pedal. This improves the drivability of vehicle 100 by allowing vehicle 100 to coast rather than "hunting" between regenerative braking and acceleration to maintain a desired speed. In most cases it is also results in more efficient operation, and reduced motor and controller temperatures. In low mode, additional regenerative braking may be applied to provide descent control, whereby the amount of regenerative braking is modulated to prevent the vehicle from exceeding the top speed in this mode. Regenerative braking will also be higher in the pedal up position to provide a strong engine-braking feel. In one embodiment, regenerative braking is higher at the beginning of throttle pedal application and reduces therefrom. This results in the first fraction of pedal application corresponding to a transition from braking to coasting, and the remainder of pedal application applies progressively higher accelerating torque.

Figure 14:
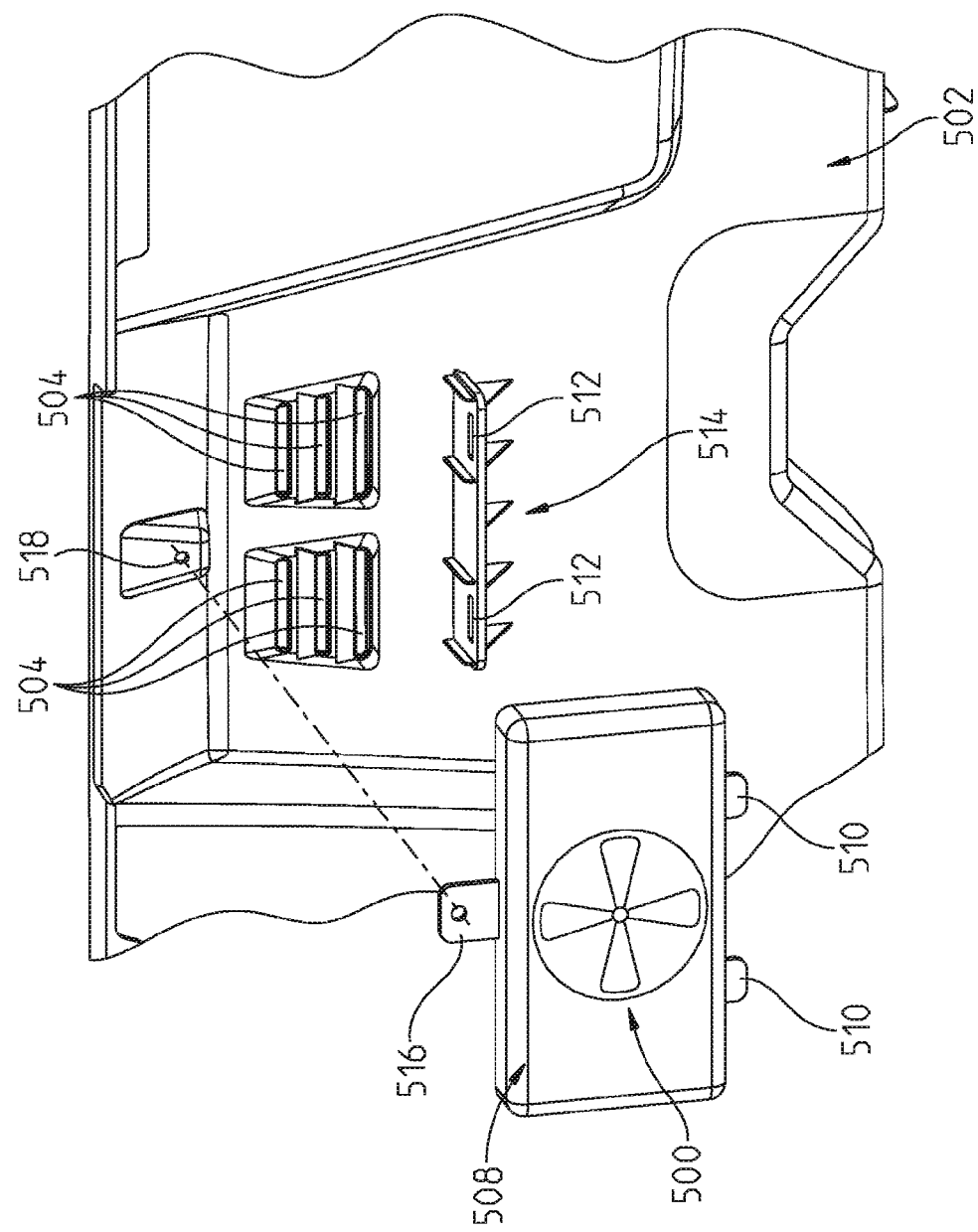
FIG. 14 illustrates a fan unit and a body panel of the vehicle of FIG. 1.

Referring to FIG. 2, a fan unit 500 is provided in front of controller 308. As shown in FIG. 14, fan unit 500 is coupled to a body panel 502 which is positioned in operator area 130 below single bench seat 132. Body panel 502 includes vent openings 504 through which air is drawn from operator area 130 into a housing 508 of fan unit 500. A lower portion of housing 508 includes tabs 510 which are received in openings 512 of a support 514 of body panel 502. An upper portion of housing 508 includes a tab 516 which is coupled to a support 518 of body panel 502 through a coupler. Exemplary couplers include a screw, cooperating snap features on tab 516 and body panel 502, or other suitable couplers.

Referring to FIG. 2, air from operator area 130 is drawn into fan unit 500 through vent openings 504 and passes over controller 308 and contactor 330 to provide cooling air across controller 308 and contactor 330. In one embodiment, fan unit 500 is in line with controller 308 and contactor 330.

Referring to FIG. 14B, in one embodiment, fan unit 500 is positioned within a cooling tunnel 680. In one embodiment, cooling tunnel 680 includes a first side wall 682 and a second side wall 684 which generally close off the area around controller 308 and motor 370 from the outside. In one embodiment, a top wall (not shown) is included. The lower portions of frame 150 serve as a bottom wall. Air is drawn into cooling tunnel 680 by fan unit 500 through vent openings 504 in transaxle 502. Due to cooling tunnel 680 the air passes by controller 308 and motor 370 and out of an air outlet 686. In one embodiment, air outlet 686 is an open rear side of cooling tunnel 680. In one embodiment, air outlet 686 are vent openings in a rear wall (not shown) of cooling tunnel 680. In one embodiment, cooling tunnel 680 extends only to the area surrounding controller 308 and not the area surrounding motor 370. Another arrangement of components within cooling tunnel 680 is shown in FIG. 14C. In the embodiment illustrated in FIG. 14C, controller 308 is positioned forward of fan unit 500. Fan unit 500 therefore draws air past controller 308 from vent openings 504.

Referring to FIG. 14D, in one embodiment fan unit 500 is coupled to key switch 560. When key switch 560 is switched to "ON", fan unit 500 is active. When key switch 560 is switched to "OFF", fan unit 500 is inactive. As such, fan unit 500 is always on when vehicle 100 is active.

Referring to FIG. 14E, in one embodiment fan unit 500 is coupled to a user actuated fan switch 561 which is provided as part of dash 650. When user actuated fan switch 561 is switched to "ON", fan unit 500 is active. When user actuated fan switch 561 is switched to "OFF", fan unit 500 is inactive. As such, fan unit 500 is on demand. An operator may activate fan unit 500 when increased performance from vehicle 100 is desired in extreme conditions. Fan unit 500 cools controller 308 and, in some embodiments, motor 370. This allows controller 308 and motor 370 to draw more current resulting in more power. Also, this permits the operator to maintain a "silent operation" of vehicle 100, if desired.

Referring to FIG. 14F, in one embodiment fan unit 500 is coupled to controller 552. The controller 552 includes software to monitor a temperature of controller 308 based on a temperature sensor 309 associated with controller 308 and a temperature of motor 370 based on a temperature sensor 371 associated with motor 370. In one embodiment, the temperature sensor is a thermistor. When the monitored temperature of either controller 308 or temperature sensor 371 exceeds a threshold amount, controller 552 activates fan unit 500 to cool controller 308 and motor 370. In one embodiment, the software of controller 552, rather than basing the operation of fan unit 500 on a monitored temperature, controls fan unit 500 based on a speed of vehicle 100. A speed sensor 373 is associated with motor 370 to provide input to controller 552. Once a speed of vehicle 100 exceeds a threshold value, controller 552 activates fan unit 500. This arrangement activates fan unit 500 at higher speeds. In one embodiment, the software of controller 552 controls the operation of fan unit 500 based on both a monitored temperature of controller 308 or motor 370 and a monitored speed of vehicle 100. In one embodiment, fan unit 500 is kept on after a key "OFF" if the temperature of controller 308 or motor 370 is above a threshold amount.

Referring to FIG. 14G, in one embodiment fan unit 500 is coupled to chargers 310. When chargers 310 is charging battery supply 556, fan unit 500 is active. When chargers 310 is not charging battery supply 556, fan unit 500 is inactive. In one embodiment, battery supply 556 includes flooded lead acid batteries which give off hydrogen gas during charging. Fan unit 500 operates to dissipate the concentration of hydrogen gas around battery supply 556 during the charging. In one embodiment, a separate fan unit is provided for use during charging. This fan unit would be positioned proximate the battery supply 556 and powered by a separate connection to chargers 310.

As mentioned herein, battery supply 556 is charged through chargers 310. In one embodiment, multiple chargers are provided. In one embodiment, one of the chargers 310 is packaged with DC-to-DC converter 564. An exemplary charger and DC-to-DC converter combination is the QuiQ-DCI available from Delta Q located in Burnaby, British Columbia, in Canada.

Figure 17:
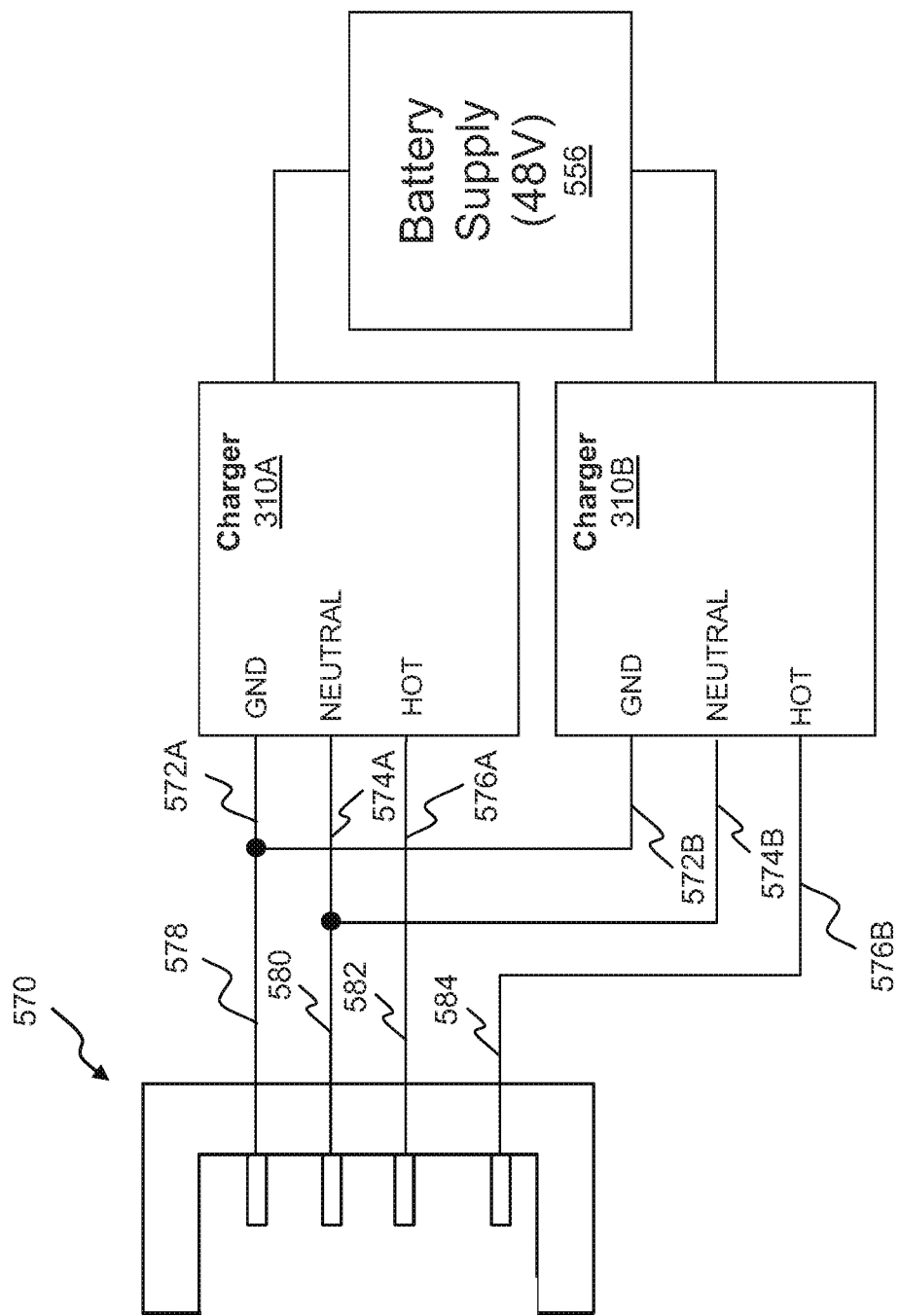
FIG. 17 illustrates a charger arrangement of the vehicle of FIG. 1.

Referring to FIG. 17, an embodiment including two chargers, charger 310A and charger 310B, is represented. Charger 310A and charger 310B are coupled to battery supply 556. In one embodiment, charger 310A and charger 310B are coupled to battery supply 556 in parallel. In one embodiment, only one of charger 310A and charger 310B is programmed to provide an equalizing charge to battery supply 556. This may be specified in the charging profiles of the respective chargers 310.

Charger 310A and charger 310B are coupled to a connector 570 which is in turn connected to one of a plurality of different charging cords. Each of charger 310A and charger 310B includes a ground input 572, a neutral input 574, and a hot input 576. The ground input 572A of charger 310A and the ground input 572B of charger 310B are tied together as ground input 578 of connector 570. The neutral input 574A of charger 310A and the neutral input 574B of charger 310B are tied together as neutral input 580 of connector 570. Hot input 576A of charger 310A corresponds to a first hot input 582 of connector 570. Hot input 576B of charger 310B corresponds to a second hot input 584 of connector 570.

Figure 18A:
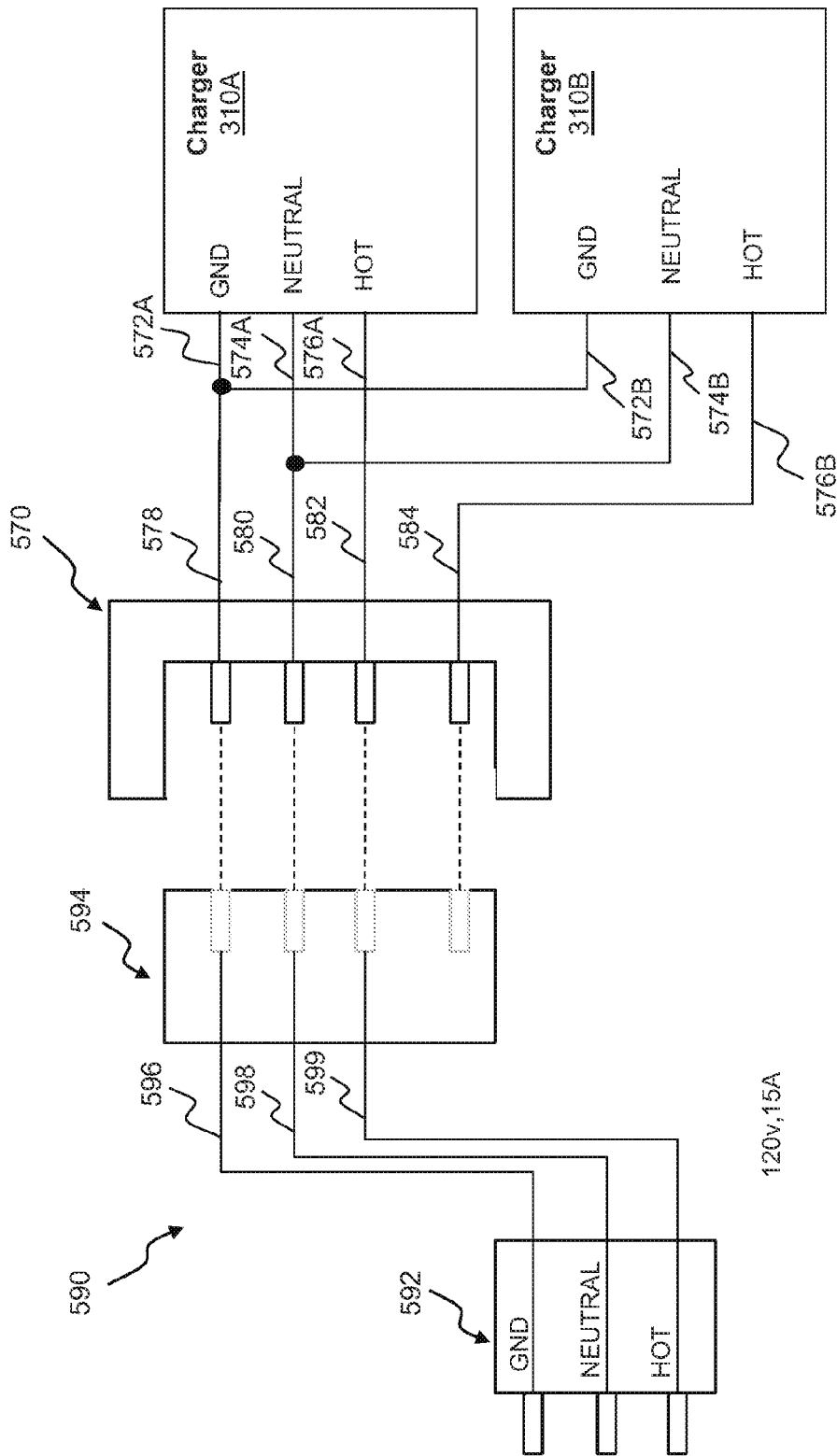
FIG. 18A illustrates a first charging cable being coupled to a connector of the charging arrangement of FIG. 17.

Referring to FIG. 18A, connector 570 is shown with a first charging cable 590. Charging cable 590 includes a first connector 592 which is configured to interface with a standard 120 v, 15 A outlet or extension cord and a second connector 594 which is configured to interface with connector 570. Connector 570 and second connector 594 include mating portions which couple a ground line 596 of first charging cable 590 to ground input 578 of connector 570, couple a neutral line 598 of first charging cable 590 to neutral input 580 of connector 570, and couple a hot line 599 of first charging cable 590 to first hot input 582 of connector 570. No connection is made to second hot input 584 of connector 570. As such, only charger 310A operates to charge battery supply 556 when first charging cable 590 is connected to connector 570.

Figure 19:
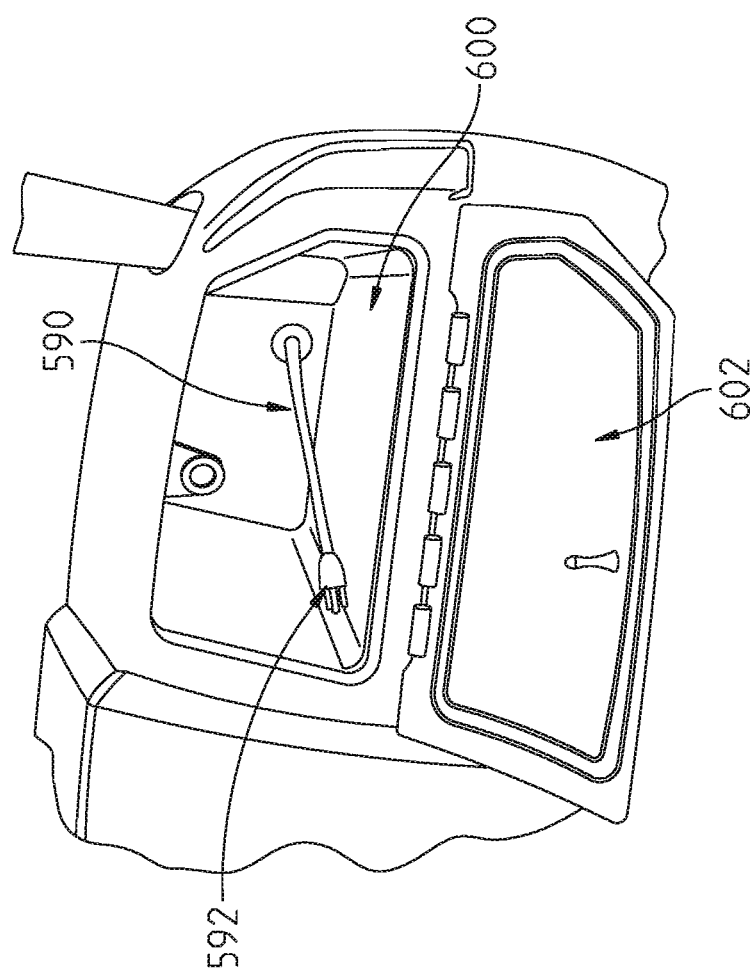
FIG. 19 illustrates a storage compartment of the vehicle of FIG. 1 wherein a connection to the first charging cable of FIG. 18A is to be made.

Referring to FIG. 19, first charging cable 590 and first connector 592 are shown. As shown in FIG. 19, first connector 592 is accessible through a storage compartment 600 of operator area 130. Storage compartment 600 includes a door 602 which is rotatable to open and close storage compartment 600 relative to the remainder of operator area 130. With having first charging cable 590 carried by vehicle 100, an operator simply needs an extension cord to connect first connector 592 of first charging cable 590 to a standard wall outlet.

Figure 18B:
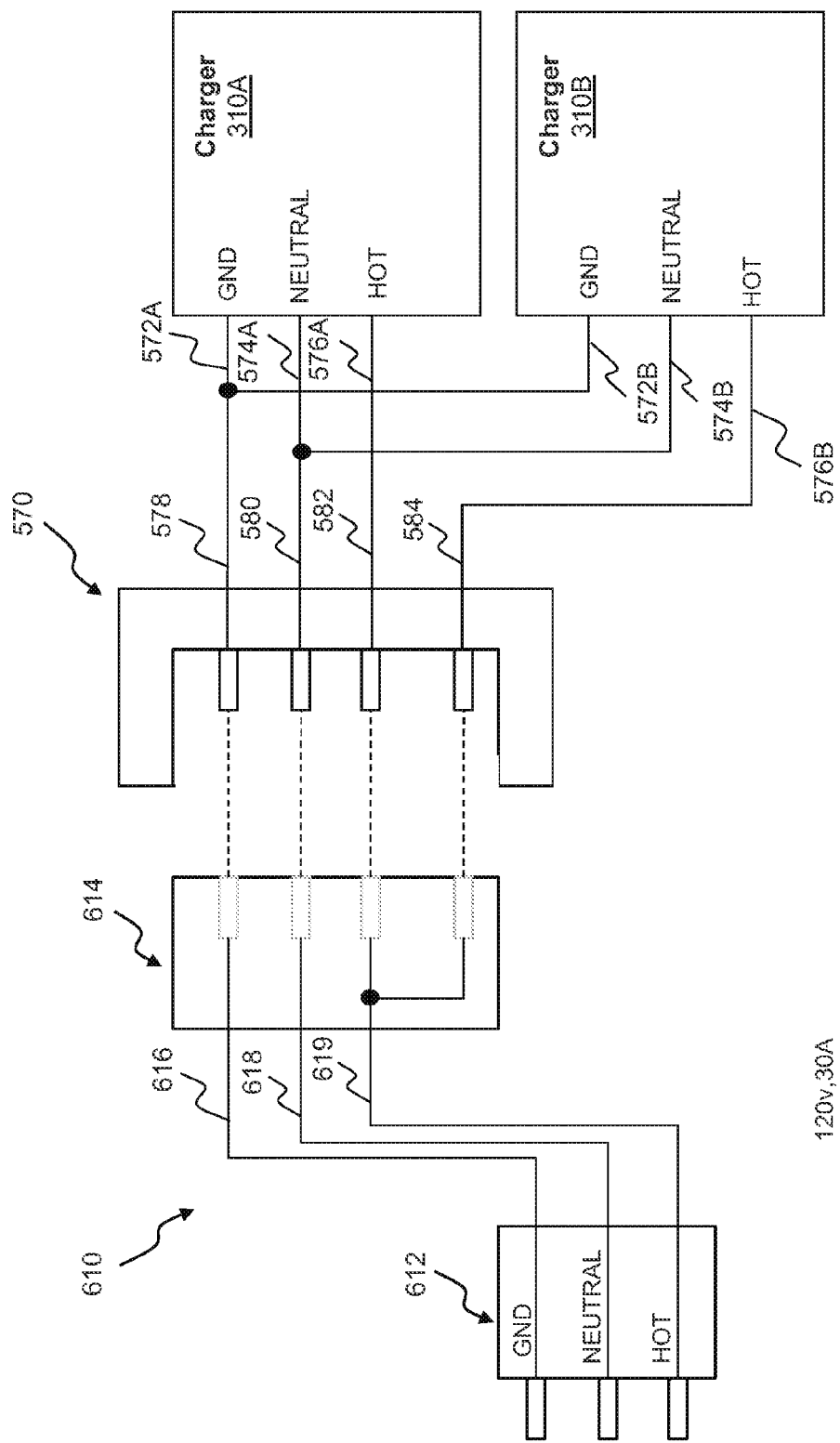
FIG. 18B illustrates a second charging cable being coupled to a connector of the charging arrangement of FIG. 17.

Referring to FIG. 18B, connector 570 is shown with a second charging cable 610. Charging cable 610 includes a first connector 612 which is configured to interface with a standard 120 v, 30 A outlet or extension cord and a second connector 614 which is configured to interface with connector 570. Connector 570 and second connector 614 include mating portions which couple a ground line 616 of second charging cable 610 to ground input 578 of connector 570, couple a neutral line 618 of second charging cable 610 to neutral input 580 of connector 570, and couple a hot line 619 of second charging cable 610 to both first hot input 582 of connector 570 and second hot input 584 of connector 570. As such, both charger 310A and charger 310B operate to charge battery supply 556 when second charging cable 610 is connected to connector 570. Like first charging cable 590, second charging cable 610 may be positioned such that first connector 612 is accessible through storage compartment 600.

Figure 18C:
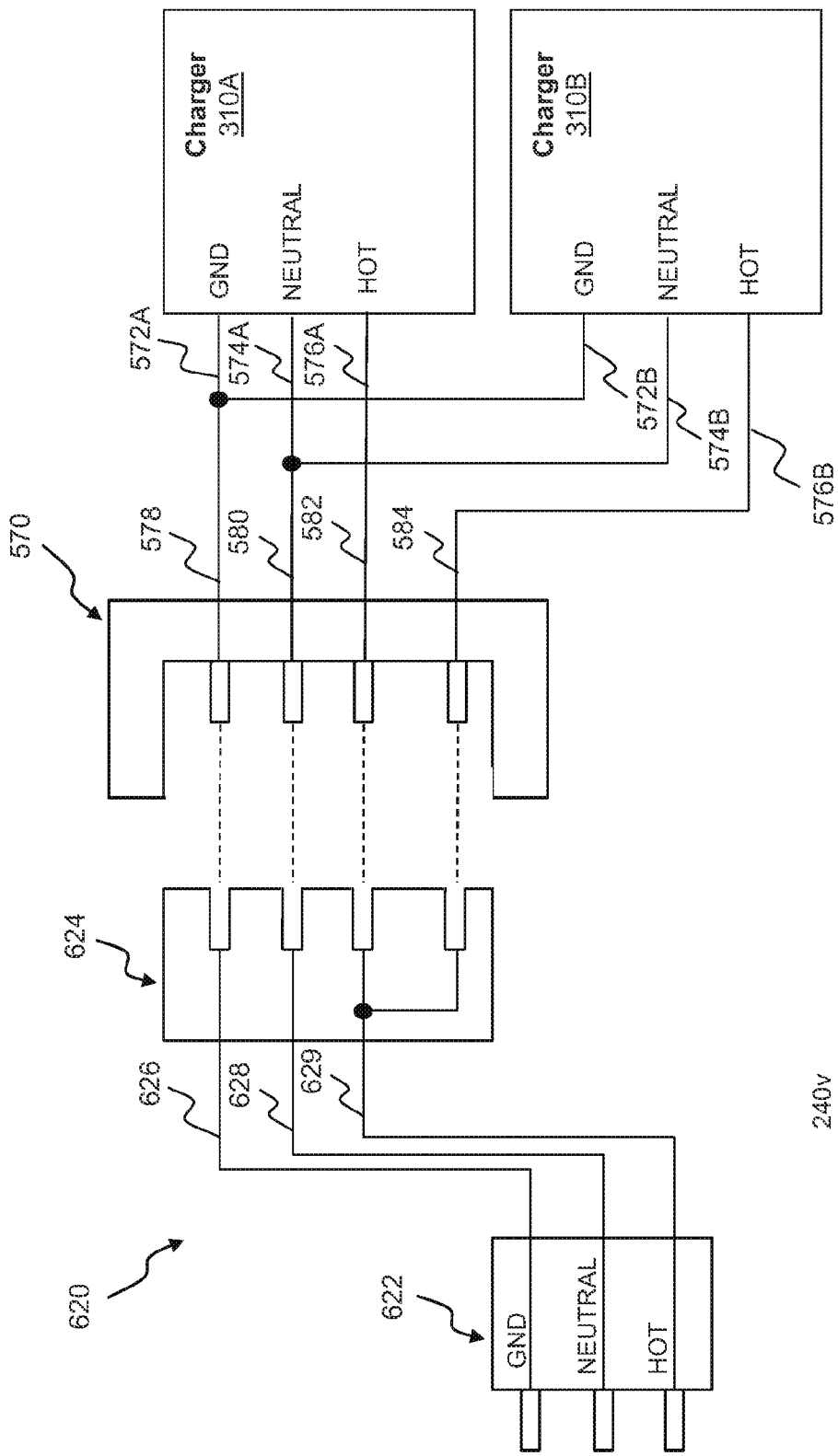
FIG. 18C illustrates a third charging cable being coupled to a connector of the charging arrangement of FIG. 17.

Referring to FIG. 18C, connector 570 is shown with a third charging cable 620. Charging cable 620 includes a first connector 622 which is configured to interface with a standard 240 v outlet or extension cord and a second connector 624 which is configured to interface with connector 570. Connector 570 and second connector 624 include mating portions which couple a ground line 626 of third charging cable 620 to ground input 578 of connector 570, couple a neutral line 628 of third charging cable 620 to neutral input 580 of connector 570, and couple a hot line 629 of third charging cable 620 to both first hot input 582 of connector 570 and second hot input 584 of connector 570. As such, both charger 310A and charger 310B operate to charge battery supply 556 when third charging cable 620 is connected to connector 570. Like first charging cable 590, third charging cable 620 may be positioned such that first connector 622 is accessible through storage compartment 600.

Figure 18D:
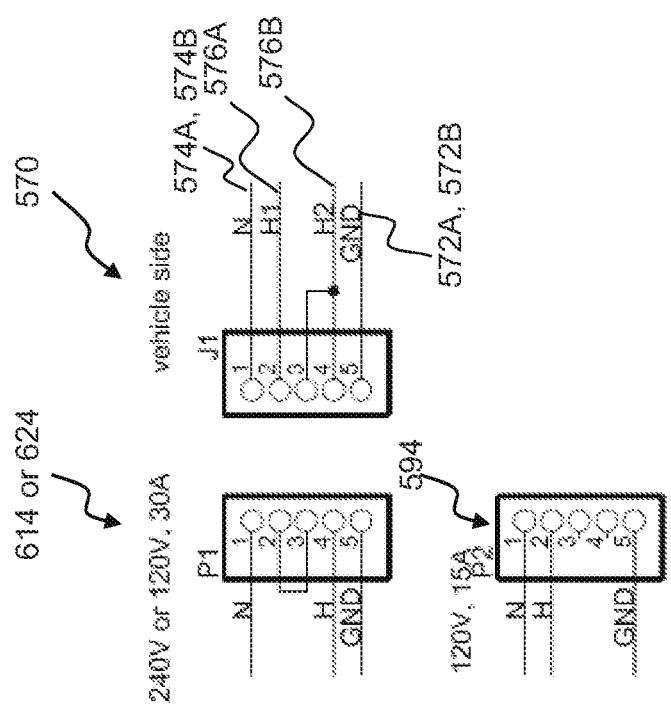
FIG. 18D illustrates a five pin connector of the charging arrangement of FIG. 17 and a connector for the charging cables of FIGS. 18A-C.

Referring to FIG. 18D, in another embodiment connector 570, second connector 594, second connector 614, and second connector 624 are each five pin connectors. The connections made internal to each connector are illustrated in FIG. 18D.

In another embodiment, charger 310A and charger 310B each include a standard connector for a 120V, 15 A power source. In this situation an operator would plug each charger into a separate wall outlet. Thus, requiring two cords to be provided for full charging. Of course, a single charger could be used by only connecting one of the chargers to a wall outlet.

In another embodiment, a cord is provided which splits into two connectors, one for charger 310A and one for charger 310B. A different cord may be provided for each of 120V, 15 A; 120V, 30 A; and 240V.

In addition to battery supply 556, vehicle 100 may include an accessory battery 720, represented in FIG. 23. In one embodiment, accessory battery 720 is supported by front frame portion 210 of frame 150. Accessory battery 720 is provided to power an accessory 722. An exemplary accessory is a winch. An exemplary winch is the integrated 4500 pound winch (part no. 2877042) available from Polaris Industries located in Medina, Minn. By having accessory battery 720, the charge of battery supply 556 is not used to operate accessory 722. In one embodiment, the accessory battery 720 is supported by the vehicle 100 independent of the accessory 722.

In one embodiment, accessory battery 720 is charged by battery supply 556 through DC-to-DC converter 564. In one embodiment, accessory battery 720 is charged with a separate DC-to-DC converter 724. As shown in FIG. 23, in one embodiment, accessory battery 720 is selectively charged by either DC-to-DC converter 564 or dc-to-dc converter 724 based on a position of a relay 726. In one embodiment, relay 726 is a single pole, double throw relay. The operation of relay 726 is controlled by controller 554.

Referring to FIG. 24, a processing sequence 726 of controller 554 is shown. Based on the output of alternator controlled switch module 694 a determination is made whether vehicle 100 is moving or not, as represented by block 728. If vehicle 100 is moving, relay 726 is controlled to connect DC-to-DC converter 724 to accessory battery 720, as represented by block 730. If vehicle 100 is not moving, relay 726 is controlled to connect DC-to-DC converter 564 to accessory battery 720, as represented by block 732. In one embodiment, DC-to-DC converter 564 provides a lower voltage than DC-to-DC converter 724. In one example, DC-to-DC converter 564 provides 13.2 V while DC-to-DC converter 724 provides 14.2 V. When vehicle 100 is in a key "OFF" configuration, accessory battery 720 is not being charged.

Figure 25:
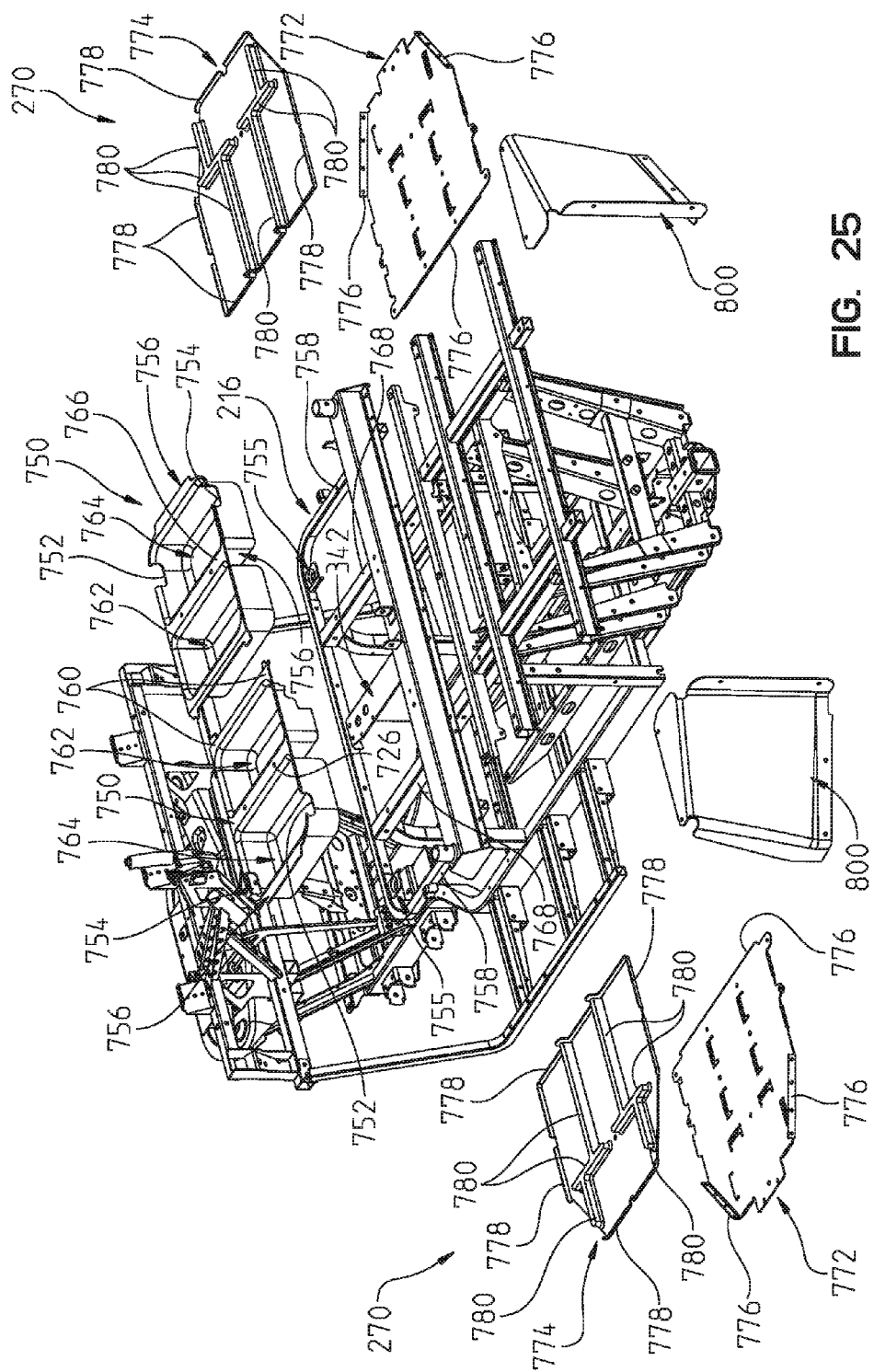
FIGS. 25-28 illustrates under seat storage trays, battery trays, and mud guards of the vehicle of FIG. 1.
Figure 26:
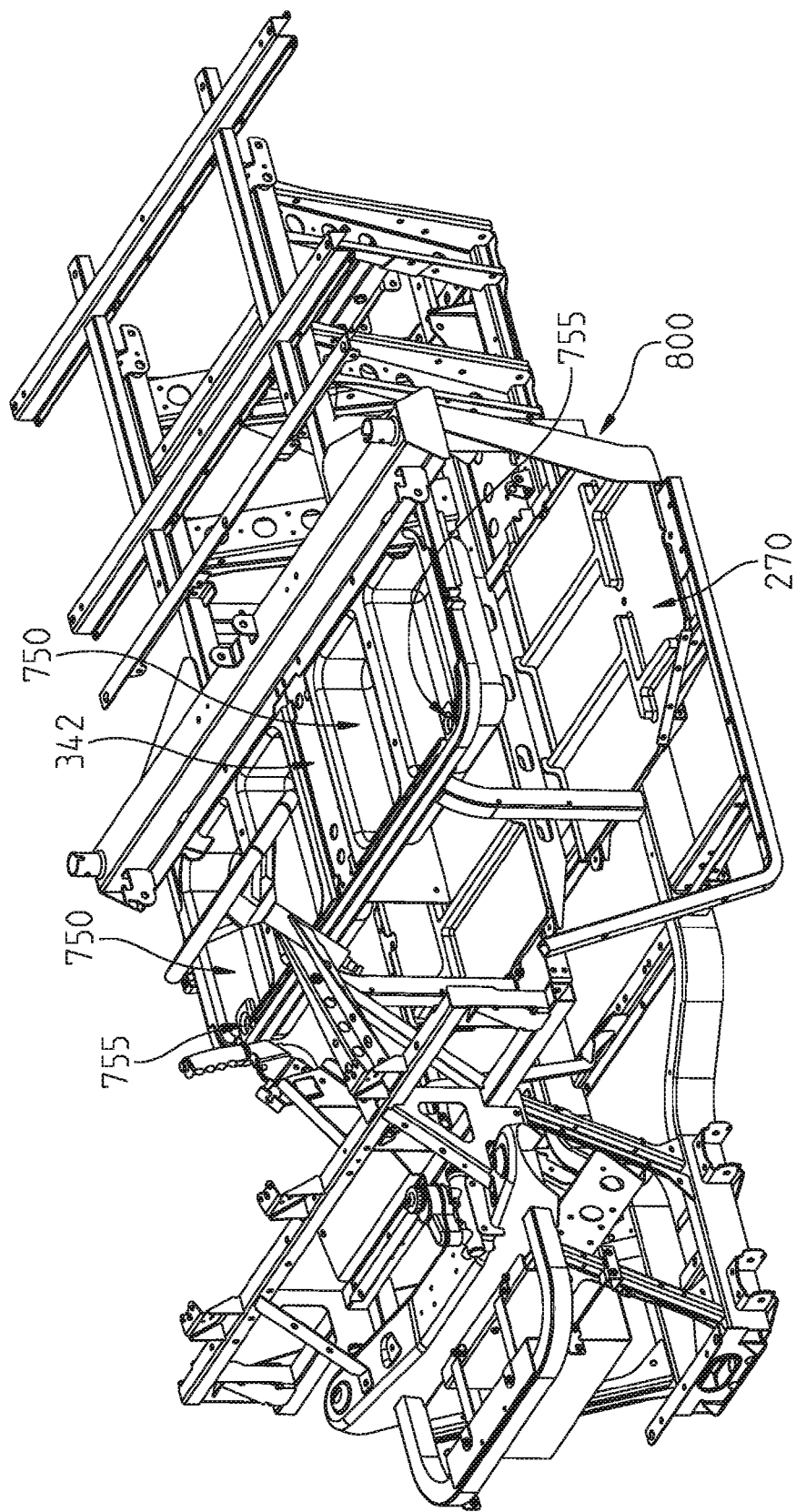

Referring to FIG. 25, storage trays 750 are shown. Referring to FIG. 26, Storage trays 750 are supported on seat support portion 216 of frame 150. Storage trays 750 are positioned above battery packs 304 and below seating 132. Returning to FIG. 25, storage trays 750 may be used on both a driver side of vehicle 100 and a passenger side of vehicle 100. The storage trays 750 positioned on the driver's side of vehicle 100 may be rotated about a vertical axis 180 degrees to be used on the passenger's side of vehicle 100.

Storage trays 750 include first cutout 752 and a second cutout 754. Cutouts 752 and second cutout 754 permit storage trays 750 to be positioned as shown in FIG. 26 without interfering with seat brackets 755 which couple to seating 132. Storage trays 750 includes a first ledge 756 which rests on portion 758 of seat support portion 216 and a second ledge 760 which rests on upper flange 342 of support member 340. Second ledge 760 is formed of spaced apart tabs.

Figure 28:
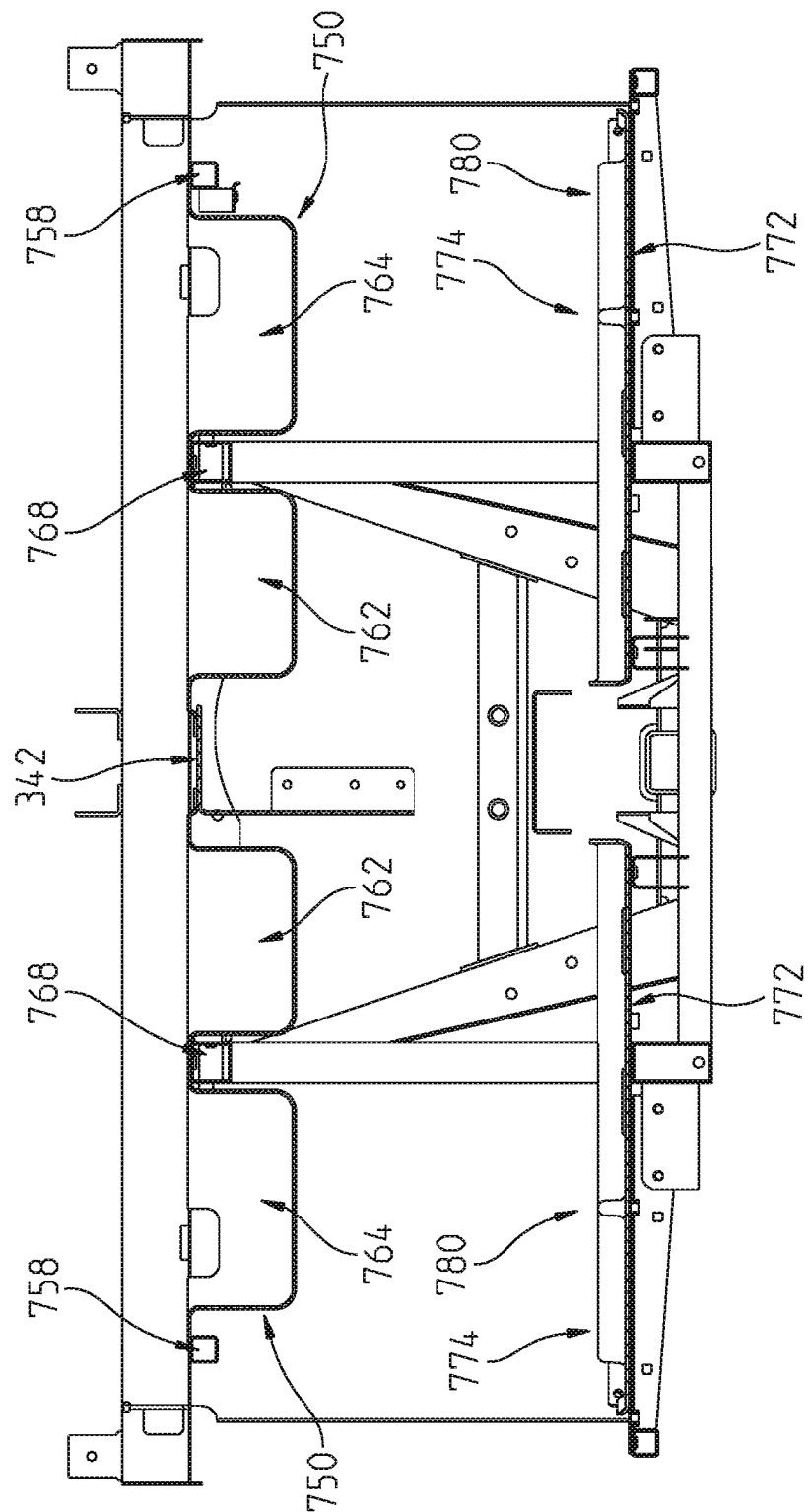

Storage trays 750 are divided into multiple storage compartments 762 and 764. Storage compartments 762 and 764 are laterally spaced apart and are connected by a bridge portion 766. Bridge portion 766 of storage trays 750 rests on supports 768 of seat support portion 216 as shown in FIG. 28.

In one embodiment, storage trays 750 are drop in trays that are supported by seat support portion 216. Trays 750 may be removed to allow access to batteries 318. In one embodiment, storage trays 750 may be removably coupled to seat support portion 216. In one embodiment, storage trays 750 are made of plastic.

Referring to FIG. 25, battery supports 270 are shown. Battery supports 270 include a lower support tray 772 and an upper support tray 774. In one embodiment, lower support tray 772 is made of metal and upper support tray 774 is made of a non-corrosive material, such as plastic. Lower support tray 772 is coupled to frame 150 and includes upstanding walls 776 which locate upper support tray 774. In a similar fashion upper support tray 774 includes upstanding walls 778 which locate batteries 318. In addition to upstanding walls 778, upper support tray 774 includes dividers 780 which also locate batteries 318.

Figure 29:
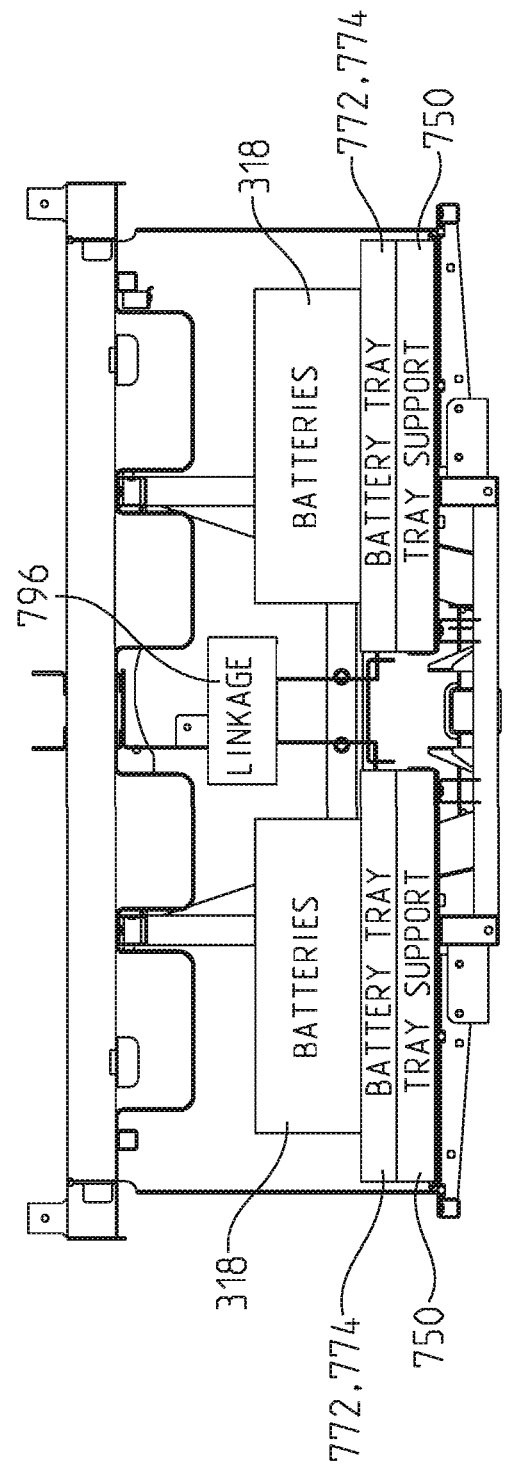
FIGS. 29 and 30 illustrate a linked system for storing the batteries of the vehicle of FIG. 1 wherein the movement of one set of batteries is responsive to the movement of another set of batteries.
Figure 30:
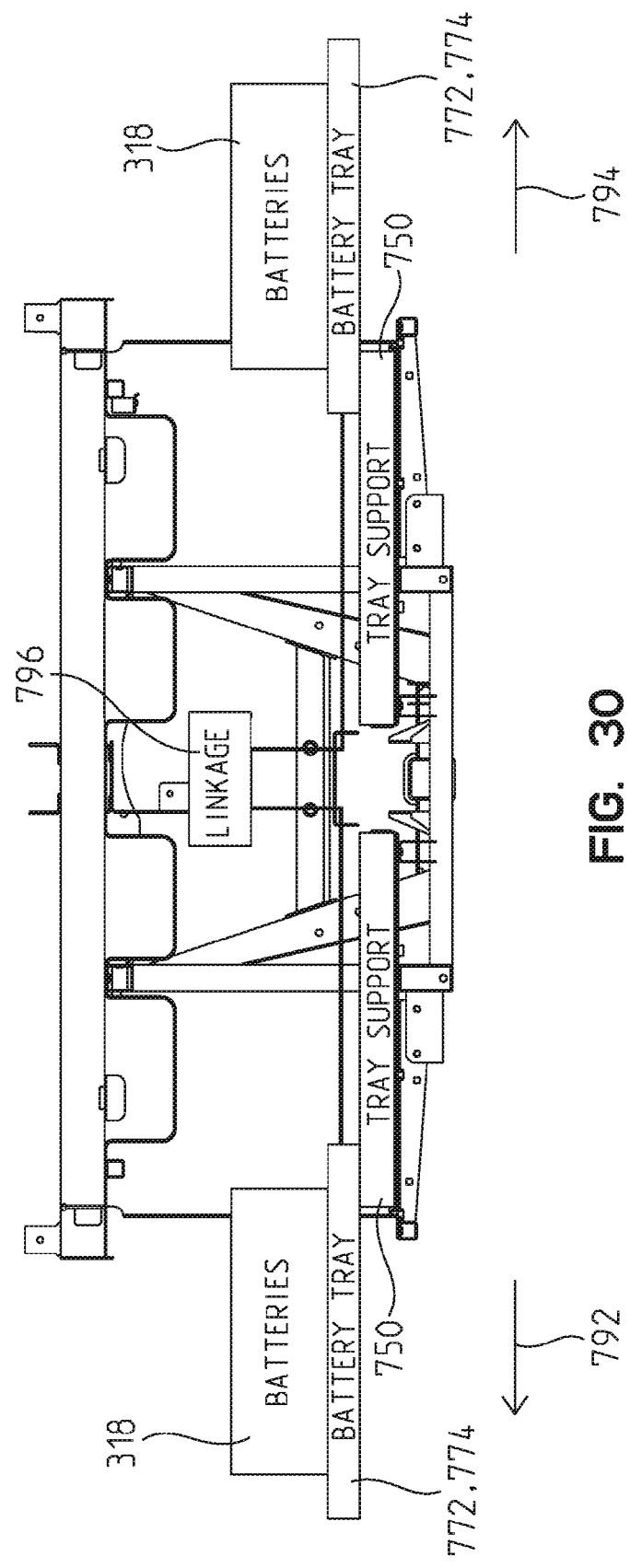

Referring to FIG. 29, in one embodiment, lower support tray 772 and upper support tray 774 are supported on tray supports 790. In one embodiment, tray supports 790 and lower support tray 772 cooperate to permit the lower support tray 772 to move in directions 792 and 794. In one embodiment, tray supports 790 and lower support tray 772 are rail members which permit the movement of lower support tray 772 in directions 792 and 794 relative to tray supports 790 as shown in FIG. 30. In one embodiment, the two lower support tray 772 are coupled together through a linkage 796. When accessory 722 on the driver side moves in direction 797, linkage 796 causes lower support tray 772 on the passenger side to move in directions 794. In this manner, vehicle 100 remains balanced while batteries 318 are accessible without removing seating 132. Of course, the exterior panels or doors of vehicle 100 need to be removed or opened prior to the movement of lower support tray 772.

Figure 27:
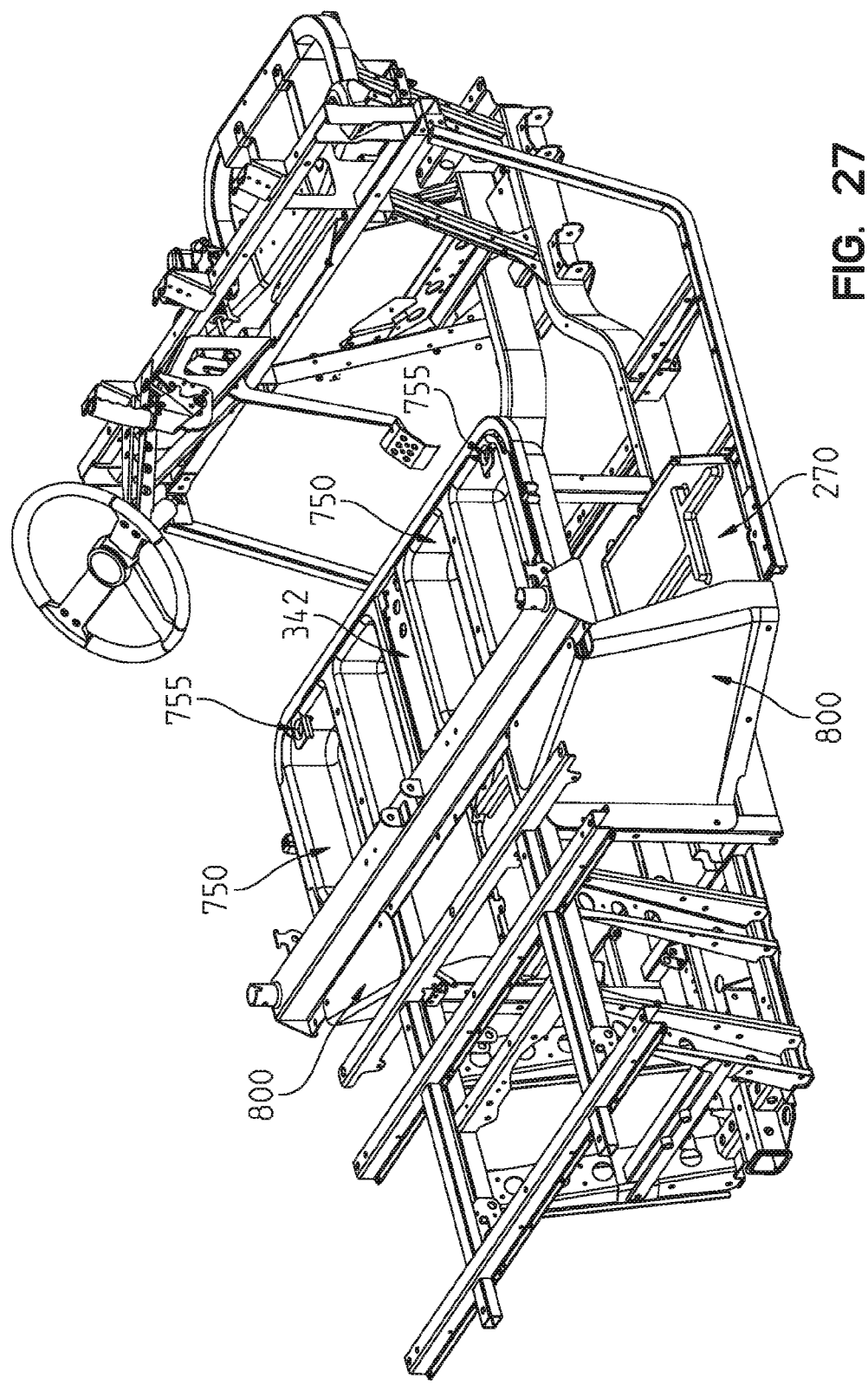

Referring to FIG. 1 and FIG. 3, batteries 318 are generally protected from mud and other debris by body panel 502 and side panels 170. Referring to FIG. 25, rear guards 800 are provided which couple to frame 150 in the position shown in FIG. 27. This helps to protect batteries 318 from mud and debris from rear wheels 102. In addition, vehicle 100 may include additional guards 804 (see FIG. 2) which would extend rearward from rear guards 800. A guard 804 is provided on both sides of vehicle 100. Rear guards 800 and guards 804 may define the cooling tunnel 682 of FIG. 14B.

Figure 31:
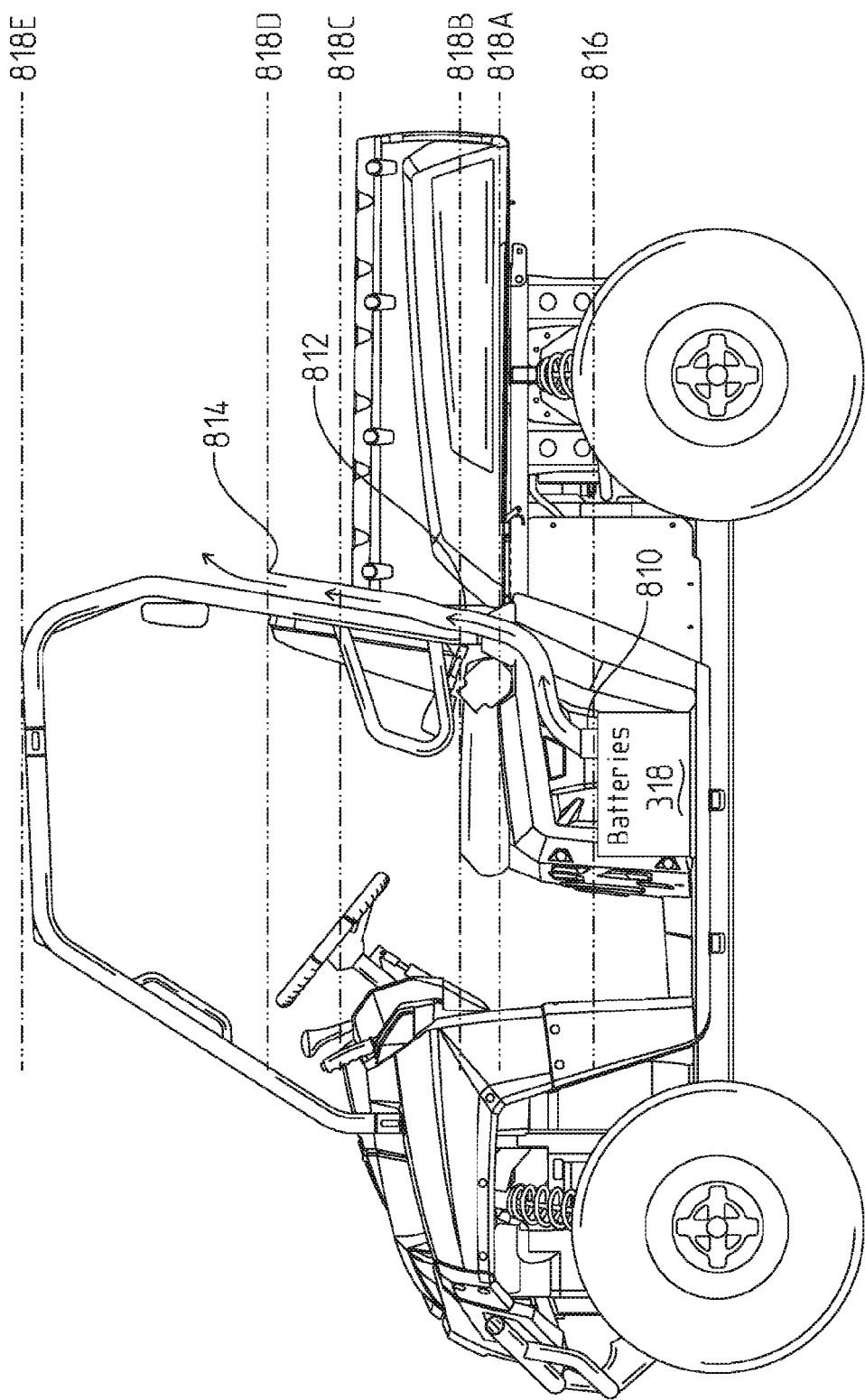
FIG. 31 illustrates a conduit for raising the venting level of the batteries of of the vehicle of FIG. 1.

Although side panels 170, body panel 502, rear guards 800, and guards 804 protect batteries 318 from mud and debris, they do not provide a water tight enclosure. In one embodiment, batteries 318 are flooded lead acid batteries having open vents 810 (one represented in FIG. 31) on top. Gas, such as hydrogen is emitted through vents 810 during charging and discharging. Also, fluids, such as water, may enter vents 810. Referring to FIG. 31. in one embodiment, a conduit 812 is coupled to vents 810. Conduit 812 has an open end 814 through which any fluid from vents 810 is exhausted. Conduit 812 also prevents liquid, such as water reaching vents 810 unless it enters end 814. As such, conduit 812 effectively raises a water line 816 of vehicle above the location of vents 810. In one embodiment, the water line is raised to a height 818A equal to the bottom of seating 132. In one embodiment, the water line is raised to a height 818B equal to the top of seating 132. In one embodiment, the water line is raised to a height 818C equal to the top of dash 650. In one embodiment, the water line is raised to a height 818D equal to the top of seat back portion 138. In one embodiment, the water line is raised to a height 818E equal to the top of rollover structure 178. In one embodiment, motor 370 is a sealed motor, such that the water line of vehicle 100 may be above motor 370.

Figure 32:
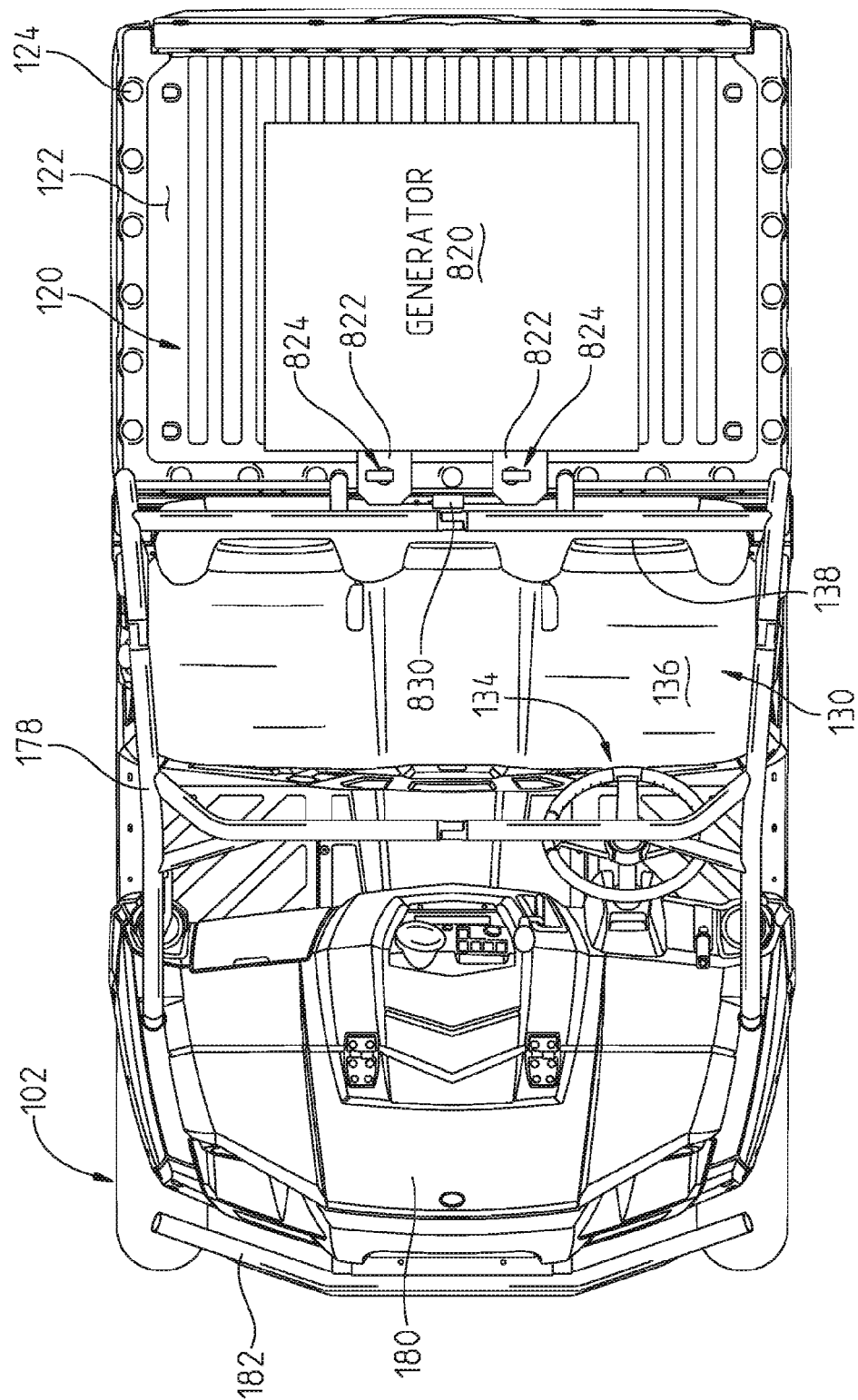
FIG. 32 illustrates the mounting of a generator in the bed of the vehicle of FIG. 1.

Referring to FIG. 32, a generator 820 may be mounted in bed 120. In one embodiment, the generator 820 includes an internal combustion engine. In one embodiment, generator 820 is strapped to bed 120. In one embodiment, generator 820 includes brackets 822 which support expansion retainers 824 that interact with mounts 124 in bed 120 to couple generator 820 to bed 120. Exemplary retainers are disclosed in U.S. Pat. No. 7,055,454, assigned to the assignee of the present application, the disclosure of which is expressly incorporated by reference herein. An electrical cable 830 is provided which may be operatively coupled to generator 820 and chargers 310. In one embodiment, electrical cable 830 is retained to have a first end extending up from between operator area 130 and bed 120. In one embodiment, electrical cable 830 extends through bed 120 proximate the location of the hinge on bed 120 when bed 120 is a dump bed. This allows the bed 120 to be raised without disconnecting electrical cable 830.

Figure 33:
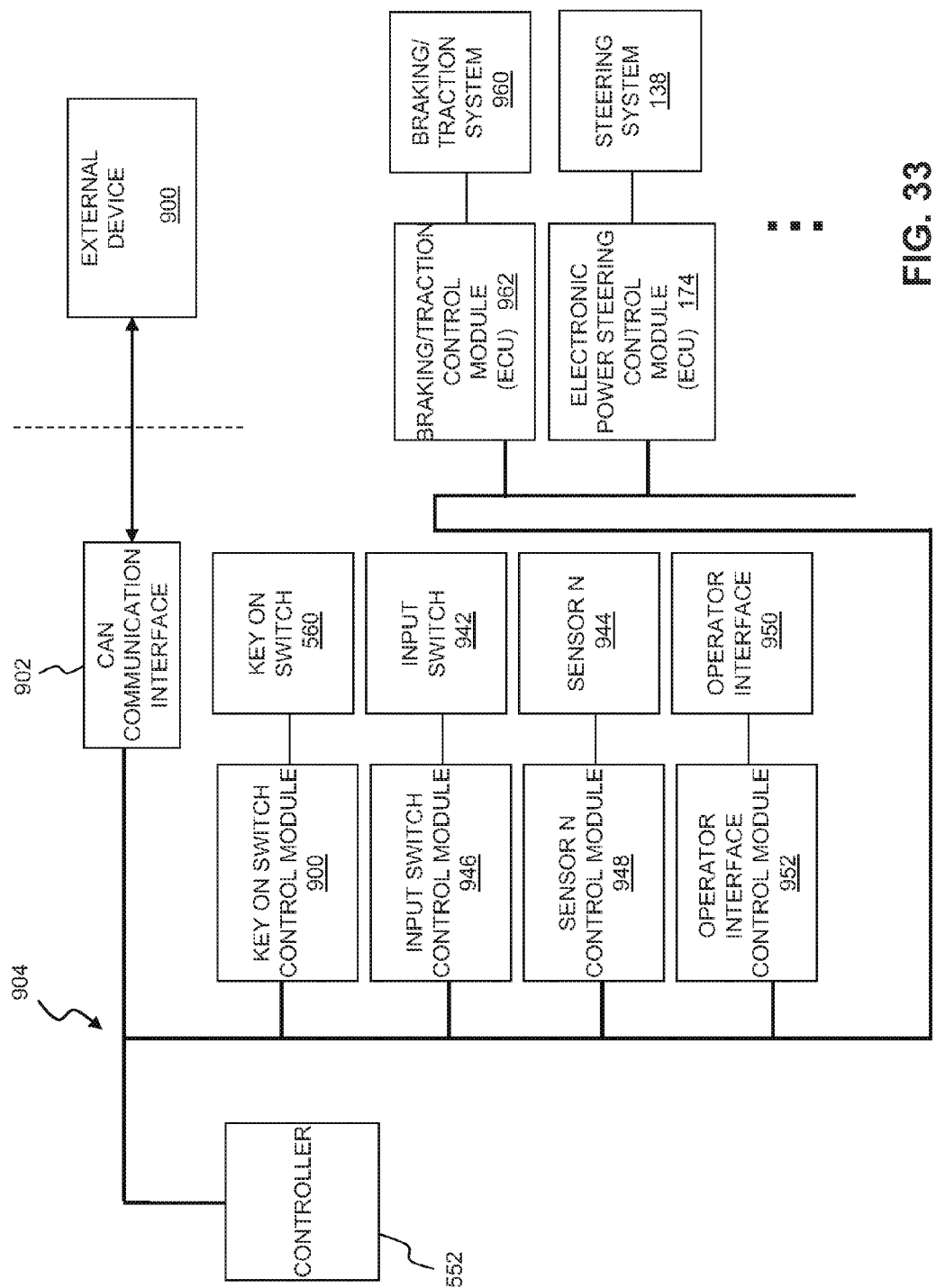
FIG. 33 illustrates the connection of an external controller to the vehicle of FIG. 1.
Figure 34:
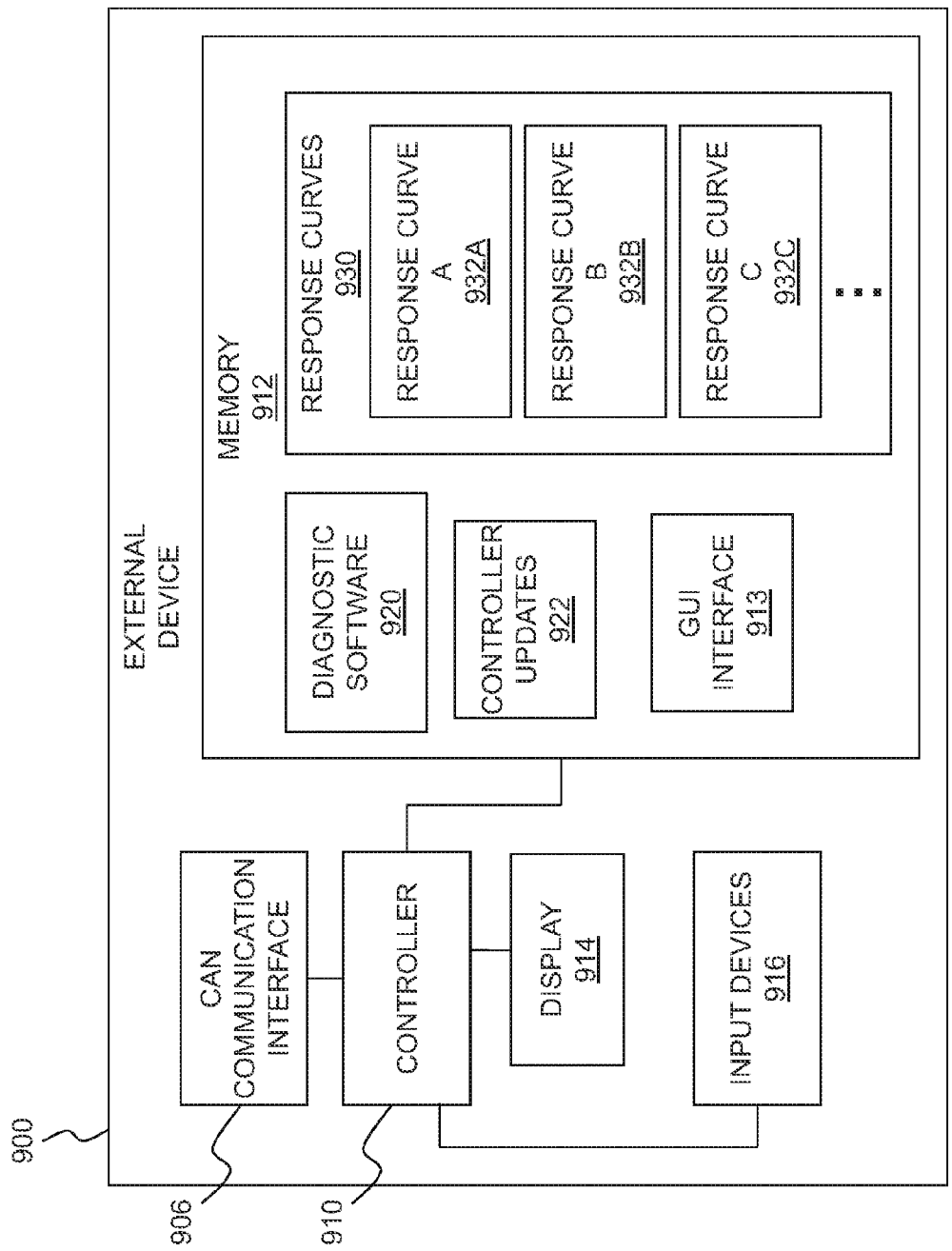
FIG. 34 illustrates response curve files stored in the external controller of FIG. 33 for transfer to the vehicle of FIG. 1

Referring to FIG. 33, an external device 900 may be coupled to a communication interface 902. In one embodiment, communication interface 902 is a port, such as connector 931 in FIG. 7, for hard wired connection to external device 900. An exemplary hard wired connection is through a SMARTLINK brand cable. In the illustrated embodiment, communication interface 902 is configured to interact on a CAN network 904. The CAN network also includes controller 552. As is known, modules coupled to network 904 are able to send and receive messages to other modules also connected to network 904. Referring to FIG. 34, external device 900 also includes a CAN communication interface and when coupled to communication interface 902 can communicate on network 904. By providing communication interface 902 on vehicle 100, a user, such as a dealer, may interface with many individual vehicles 100 regardless of the type of controller 552 used on each vehicle. Although a CAN network is illustrated, in other embodiments any suitable hard wired or wireless network may be implemented to permit the communication between external device 900 and controller 552 and between the components of vehicle 100.

External device 900 includes a controller 910 which has access to a memory 912. Exemplary external devices include general purpose computers, handheld computing devices, laptop computer, and other suitable devices. Memory 912 includes software which presents a graphical user interface 913 on a display 914 of external device 900. The operator of external device 900 may provide input through graphical user interface 913 to controller 910 with input devices 916.

External device 900 also includes diagnostic software 920 through which an operator of external device 900 may retrieve error codes and other information from controller 552 of vehicle 100. Based on this information, the operator may diagnosis the status of vehicle 100. In one embodiment, the motor drive current is able to be monitored in real time by external device 900. In one embodiment, the angle number setpoint of the slip between the rotor and stator of the motor may be monitored by external device in real time. In addition, external device 900 also includes controller updates 922. Controller updates 922 are updates to the processing logic of controller 552.

In addition, external device 900 also include a collection of responses curves 930 in memory 912. Exemplary response curves 932A, 932B, and 932C are represented. In one embodiment, the response curves are provided in a database. One or more of the response curves 932 maybe copied to controller 552 of vehicle 100. In one embodiment, an owner of vehicle 100 may purchase response curve 932A from a dealer and then the dealer will copy response curve 932A to controller 552 of vehicle 100. As mentioned herein, response curves 932 provide the torque profile of vehicle 100 based on the position of throttle pedal 632. The individual response curves 932 provide profiles which vary the tradeoff between power performance of vehicle 100 and range of vehicle 100. The responses curves may include slip curves and other parameters which alter the performance of vehicle 100.

Returning to FIG. 33, in addition to controller 552 it is contemplated to include various other components of vehicle 100 on network 904. By way of example, key switch 560 may be coupled to network 904 through a key on switch control module 940. The control module 940 handles the communication with the CAN network 904. In one embodiment, key switch 560 is replaced with an RFID tag or other token which is presented to vehicle 100. Further, the remaining input switches (generically represented by input switch 942) and sensors (generically represented by sensor 944) may be coupled to network 904 through respective control modules, respectively (generically represented by control modules 946 and 948).

Figure 35:
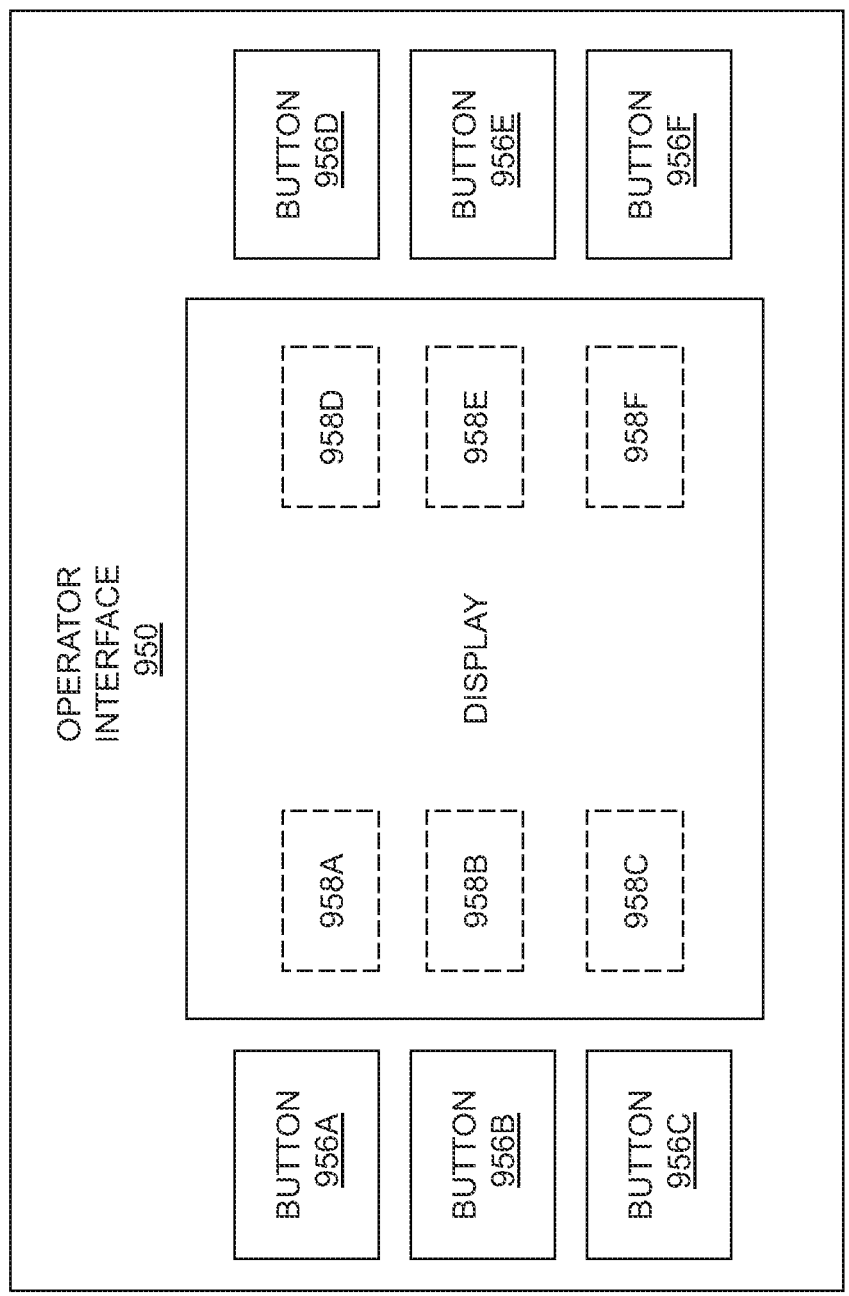
FIG. 35 illustrates an exemplary operator interface of the vehicle of FIG. 1.

In one embodiment, vehicle 100 includes an operator interface 950 which is coupled to network 904 through a control module 952. Referring to FIG. 35, in one embodiment, operator interface 950 includes a display 954 and a plurality of input buttons 956A-F. Input buttons 956 are soft keys that correspond to functions displayed on display 954 in regions 958A-F. Controller 552 is able to interact with the operator of vehicle 100 through operator interface 950. In one embodiment, operator interface 950 displays error codes, vehicle speed information, vehicle range information, battery status information, controller temperature information, mode selection information, and other information.

Returning to FIG. 33, in one embodiment a braking/traction control system 960 is coupled to network 904 through a control module 962. In one embodiment, brakes 964 (see FIG. 22) are anti-lock brakes which are controlled by braking/traction control system 960. In one embodiment, an electronic power steering system 970 is coupled to network 904 through control module 972. An exemplary power steering system is disclosed in U.S. patent application Ser. No. 12/134,909, filed Jun. 6, 2008, titled SUSPENSION SYSTEMS FOR A VEHICLE, the disclosure of which is expressly incorporated by reference herein.

Exemplary vehicle components and controls associated with an exemplary CAN network are disclosed in U.S. patent application Ser. No. 11/218,163, filed Sep. 1, 2005, titled CONTROLLER AREA NETWORK BASED SELF-CONFIGURING VEHICLE MANAGEMENT SYSTEM AND METHOD and U.S. patent application Ser. No. 12/475,531, filed May 31, 2008, titled VEHICLE SECURITY SYSTEM, the disclosures of which are expressly incorporated by reference herein.

While this invention has been described as having an exemplary design, the present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

The invention claimed is:

1. A method of selecting a wheel drive mode of an electric vehicle from a plurality of possible wheel drive modes, each wheel drive mode selecting at least one of a plurality of ground engaging members to be operatively coupled to an electric motor of the electric vehicle, the method comprising the steps of:

providing a first input in an operator area of the electric vehicle, the operator area having seating, the first input having a first setting corresponding to a first wheel drive mode, a second setting corresponding to a second wheel drive mode, and a third setting corresponding to a third wheel drive mode, wherein in the first wheel drive mode less than all of the ground engaging members positioned rearward of the front plane of the seating are operatively coupled to the electric motor, in the second wheel drive mode at least a portion of the ground engaging members positioned rearward of the front plane of the seating are operatively coupled to the electric motor, the portion of the ground engaging members including ground engaging members positioned on both sides of a vertical centerline plane of the electric vehicle, all of the at least two ground engaging members being positioned rearward of the front plane of the seating, and in the third wheel drive mode a first number of ground engaging members are operatively coupled to the electric motor, the first number being less than a total number of ground engaging members and in response to a loss of traction of at least one of the first number of ground engaging members a second number of ground engaging members are operatively coupled to the electric motor, the second number being greater than the first number; and providing a second input in the operator area of the electric vehicle, the second input having a first setting corresponding to a selection of engine braking when the third setting of the first input is selected, wherein the engine braking is provided by altering a driving voltage of the electric motor of the electric vehicle.

2. The method of claim 1, wherein a torque output of the electric motor is independent of the wheel drive mode selected and a torque distribution is dependent on the wheel drive mode selected.

3. The method of claim 1, further comprising the steps of:
providing a third input in the operator area of the electric vehicle, the third input having a plurality of settings each corresponding to a respective drive mode, wherein each drive mode includes a respective response curve which correlates an operator input to an electric motor output.

4. The method of claim 3, wherein each drive mode includes a respective response curve which correlates an operator input to an electric motor output.

5. The method of claim 3, wherein each drive mode controls an input current to the electric motor.

6. The method of claim 3, wherein each drive mode controls a condition which controls when in the third wheel drive mode the second number of ground engaging members are powered.

7. The method of claim 3, wherein a first setting of the third input corresponds to a high speed mode, a second setting of the third input corresponds to a low speed mode, and a third setting of the third input corresponds to an efficiency mode.

8. The method of claim 3, wherein a first setting of the third input corresponds to at least one of a novice mode and a company mode.

9. The method of claim 3, wherein a first setting of the third input corresponds to a company mode.

* * * * *